United States Patent
Ueno et al.

(10) Patent No.: US 10,184,856 B2
(45) Date of Patent: Jan. 22, 2019

(54) MOBILE DEVICE

(71) Applicant: KYOCERA Corporation, Kyoto-shi, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Shinya Saito, Kawasaki (JP); Makoto Honjo, Yokohama (JP); Manabu Sakuma, Yokohama (JP); Yudai Nagata, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 212 days.

(21) Appl. No.: 15/152,495

(22) Filed: May 11, 2016

(65) Prior Publication Data

US 2016/0334294 A1    Nov. 17, 2016

(30) Foreign Application Priority Data

May 12, 2015  (JP) ................ 2015-097773
May 12, 2015  (JP) ................ 2015-097774
May 12, 2015  (JP) ................ 2015-097775

(51) Int. Cl.
| | | |
|---|---|---|
| *G01L 19/08* | (2006.01) | |
| *H04B 1/3827* | (2015.01) | |
| *G01B 21/18* | (2006.01) | |
| *G06F 1/16* | (2006.01) | |
| *G06F 3/044* | (2006.01) | |

(52) U.S. Cl.
CPC ............ *G01L 19/086* (2013.01); *G01B 21/18* (2013.01); *G06F 1/1633* (2013.01); *G06F 3/044* (2013.01); *H04B 1/3827* (2013.01)

(58) Field of Classification Search
CPC ...... G06F 3/044; G06F 1/3206; G06F 3/0488; G01L 19/0092; G01L 19/149; G01L 9/12; G01N 27/223
(Continued)

(56) References Cited

U.S. PATENT DOCUMENTS

| | | | | |
|---|---|---|---|---|
| 6,583,722 B2* | 6/2003 | Jeutter | ............. | A61F 13/42 |
| | | | | 340/572.2 |
| 7,479,949 B2* | 1/2009 | Jobs | ............. | G06F 3/0488 |
| | | | | 345/169 |

(Continued)

FOREIGN PATENT DOCUMENTS

| | | |
|---|---|---|
| JP | 2003-143460 A | 5/2003 |
| JP | 2005-230340 A | 9/2005 |

(Continued)

OTHER PUBLICATIONS

Office Action in JP Application No. 2015-097774, dated Feb. 28, 2017, for which an explanation of relevance is attached.

(Continued)

*Primary Examiner* — Elias Desta
(74) *Attorney, Agent, or Firm* — Hauptman Ham, LLP

(57) ABSTRACT

A mobile device according to one of a plurality of aspects comprises an atmospheric pressure sensor configured to measure a value of atmospheric pressure, a touch screen, and at least one controller configured to conjecture that the mobile device is immersed in water when the value of the atmospheric pressure satisfies a condition. The at least one controller is configured to conjecture whether the mobile device that has been immersed in water is out of the water on the basis of a detection result obtained by the touch screen. The mobile device is able to determine whether the mobile device is immersed in water and whether the mobile device is out of the water, while keeping the electric power (Continued)

consumption low, due to using the touch screen only when determining whether the mobile device is out of the water.

11 Claims, 29 Drawing Sheets

(58) Field of Classification Search
USPC .......................................................... 702/138
See application file for complete search history.

(56) References Cited

U.S. PATENT DOCUMENTS

| | | | |
|---|---|---|---|
| 9,134,866 B2* | 9/2015 | Andersson | .............. G06F 3/044 |
| 9,367,100 B2* | 6/2016 | Ganguly | ................ G06F 1/1656 |
| 2003/0038876 A1 | 2/2003 | Nagashima | |
| 2006/0012484 A1 | 1/2006 | Claude | |

FOREIGN PATENT DOCUMENTS

| | | |
|---|---|---|
| JP | 2006-30191 A | 2/2006 |
| JP | 2013-150355 A | 8/2013 |
| JP | 2013-179536 A | 9/2013 |
| JP | 2014-44057 A | 3/2014 |
| JP | 2015-49384 A | 3/2015 |

OTHER PUBLICATIONS

Office Action in JP Application No. 2015-097775, dated Feb. 7, 2017, for which an explanation of relevance is attached.

\* cited by examiner

MOBILE DEVICE

CROSS-REFERENCE TO RELATED APPLICATION

The present application claims priority to and incorporates by reference the entire contents of Japanese Patent Application No. 2015-097773 filed in Japan on May 12, 2015, Japanese Patent Application No. 2015-097774 filed in Japan on May 12, 2015 and Japanese Patent Application No. 2015-097775 filed in Japan on May 12, 2015.

BACKGROUND

Field

The present application is related to a mobile device.

Description of the Related Art

Devices having an atmospheric pressure sensor installed therein are conventionally known. In such devices, the atmospheric pressure sensor is used for detecting the atmospheric pressure. For example, Japanese Patent Application Laid-open No. 2005-230340 discloses a mobile device configured to determine the type of traveling mode of a subject by using an atmospheric pressure sensor.

There is room for improvement on the conventional devices with regard to processes using an atmospheric pressure sensor for detecting the atmospheric pressure.

SUMMARY

It is an object of embodiments to at least partially solve the problems in the conventional technology.

According to one aspect of embodiments, there is provided a mobile device comprising: an atmospheric pressure sensor configured to measure a value of atmospheric pressure; a touch screen; and at least one controller configured to conjecture that the mobile device is immersed in water when the value of the atmospheric pressure satisfies a condition, wherein the at least one controller is configured to conjecture whether the mobile device that has been immersed in water is out of the water on the basis of a detection result obtained by the touch screen.

According to another aspect of embodiments, there is provided a mobile device comprising: an atmospheric pressure sensor configured to detect a value of atmospheric pressure; and at least one controller configured to use the value of the atmospheric pressure in an application being executed thereby, wherein the at least one controller is configured to input predetermined data into the application when having determined that the mobile device is immersed in water on the basis of a change in the value of the atmospheric pressure.

According to another aspect of embodiments, there is provided mobile device comprising: an atmospheric pressure sensor configured to detect a value of atmospheric pressure; a touch screen; and at least one controller configured to use the value of the atmospheric pressure in an application being executed thereby and to input predetermined data into the application when having determined that the mobile device is immersed in water on the basis of contact points detected by the touch screen and output values at the contact points.

The above and other objects, features, advantages and technical and industrial significance of embodiments will be better understood by reading the following detailed description of presently preferred embodiments, when considered in connection with the accompanying drawings.

DETAILED DESCRIPTION OF THE PREFERRED EMBODIMENTS

A plurality of embodiments for realizing a mobile device, a controlling method, and a control computer program (hereinafter, "control program") of the present application will be explained in detail, with reference to the accompanying drawings. In the following sections, a smartphone will be used as an example of the mobile device discussed in the present application.

Figure 1:
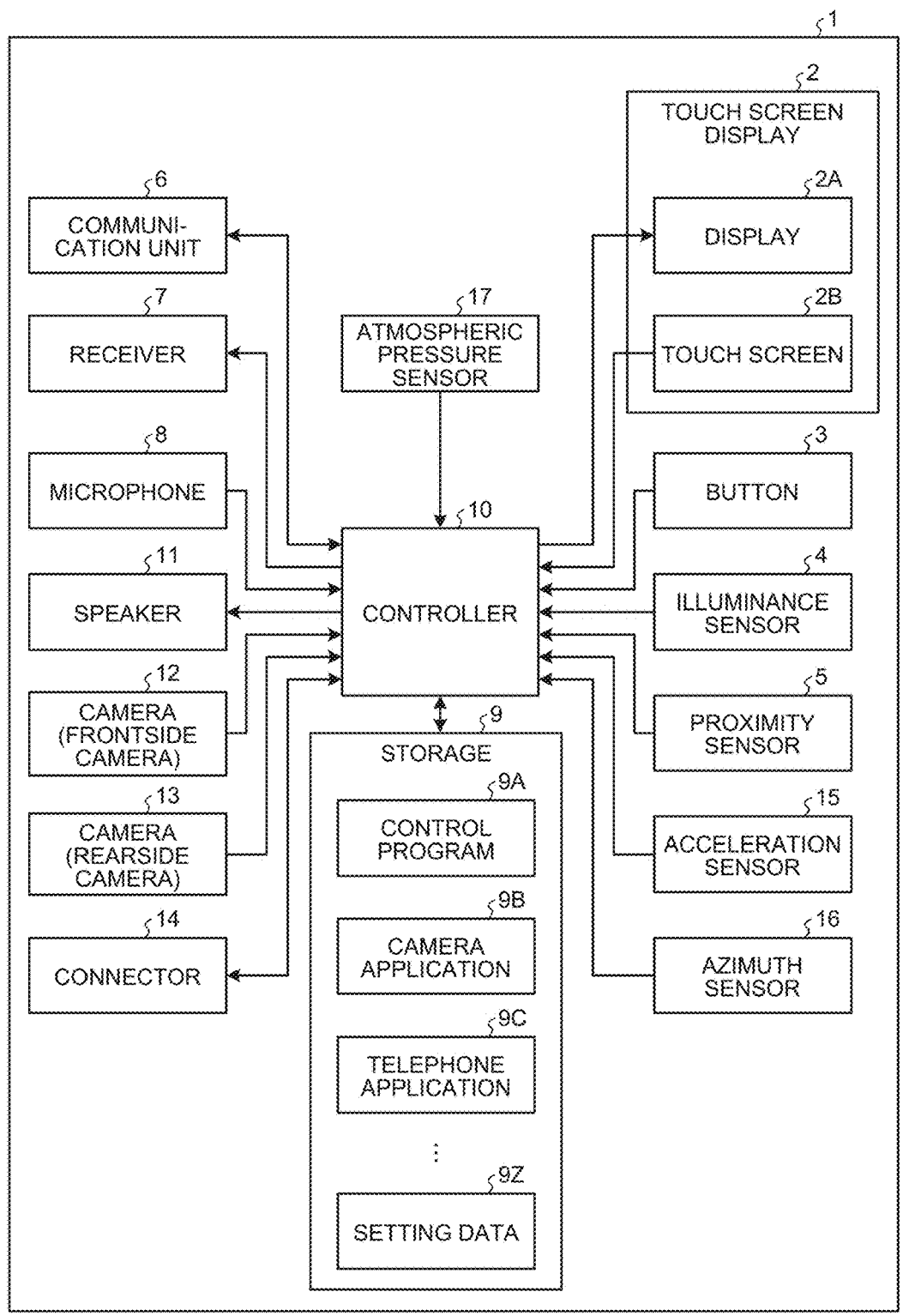
FIG. 1 is a block diagram illustrating a functional configuration of a smartphone according to one of a plurality of embodiments.

An exemplary functional configuration of a smartphone 1 according to an example of the plurality of embodiments will be explained, with reference to FIG. 1. FIG. 1 is a block diagram illustrating a functional configuration of the smartphone 1. In the following explanations, some of the constituent elements that are the same as one another may be referred to by using the same reference characters. Further, duplicate explanations may be omitted.

As illustrated in FIG. 1, the smartphone 1 includes a touch screen display 2, a button 3, an illuminance sensor 4, a proximity sensor 5, a communication unit 6, a receiver 7, a microphone 8, a storage 9, a controller 10, a speaker 11, a camera 12, another camera 13, a connector 14, an acceleration sensor 15, an azimuth sensor 16, and an atmospheric pressure sensor 17. In the following explanations, the term "the device" corresponds to the smartphone 1. In the following explanations, the situation in which the device is immersed in water may be expressed as a "water immersion". Further, in the following explanations, the situation in which the device is no longer immersed in the water may be expressed as "being out of the water".

The touch screen display 2 includes a display 2A and a touch screen 2B. For example, the display 2A and the touch screen 2B may be positioned on top of each other, may be positioned side by side, or may be positioned apart from each other. When the display 2A and the touch screen 2B are positioned on top of each other, for example, one or more of the sides of the display 2A do not have to extend along any of the sides of the touch screen 2B. The touch screen display 2 is an example of a display.

The display 2A includes a display device configured with a Liquid Crystal Display (LCD), an Organic Electro-Luminescence Display (OELD), an Inorganic Electro-Luminescence Display (IELD), or the like. The display 2A displays objects such as text, an image, a symbol, a figure, and the like on a screen. Examples of the screen containing the objects such as text, an image, a symbol, a figure, and the like and being displayed by the display 2A include, but are not limited to, a screen called "lock screen", a screen called "home screen", and an application screen that is displayed while an application is being executed. The home screen may be referred to as a desktop, a standby screen, an idle screen, a standard screen, an application list screen, or a launcher screen. The display 2A is an example of a display.

The touch screen 2B detects contact or proximity of a finger, a pen, a stylus pen, or the like, with or to the touch screen 2B. The touch screen 2B is capable of detecting the positions on the touch screen 2B when a plurality of fingers, pens, stylus pens, or the like are in contact with or in proximity to the touch screen 2B. The plurality of fingers, pens, stylus pens, or the like detected by the touch screen 2B may be referred to as "the finger". The positions which are detected by the touch screen 2B and with or to which the fingers are in contact or in proximity may be referred to as "detected positions". The touch screen 2B informs the controller 10 of the contact of the finger with the touch screen 2B, together with the detected positions. Operations which the touch screen 2B is capable of performing can be executed by the touch screen display 2 including the touch screen 2B. In other words, the operations performed by the touch screen 2B may be performed by the touch screen display 2. In some embodiments, the touch screen 2B measures information used for conjecturing whether the device that has been immersed in water is out of the water. When a capacitance method is adopted as a detection method, the touch screen 2B measures fluctuations of capacitance as the information used for conjecturing whether the device that has been immersed in water is out of the water. The touch screen 2B repeatedly performs a process of applying a predetermined signal to each of a plurality of sensor electrodes laid out in a grid formation all over the touch screen 2B and reading an outpour value from each of the sensor electrodes. As a result of this process, the touch screen 2B is able to measure fluctuations of the capacitance in detection points on the touch screen 2B. The sensor electrodes are an example of detection points. When a resistive film method or a load detection method is used as another detection method, the touch screen 2B may detect fluctuations of voltage level, for example, as the information used for determining whether the device is immersed in water. When a surface acoustic wave method is adopted as yet another detection method, the touch screen 2B may detect an attenuation of a surface acoustic wave emitted by the device, for example, as the information used for determining whether the device is immersed in water. When an infra-red ray method is adopted as yet another detection method, the touch screen 2B may detect an attenuation of infra-red light emitted by the device, for example, as the information used for determining whether the device is immersed in water.

According to some embodiments, an example will be explained in which the capacitance method is adopted as a detection method implemented by the touch screen 2B. The touch screen 2B implementing the capacitance method is capable of determining whether the device is out of the water, by measuring fluctuations of the capacitance. However, as long as it is possible to measure the information used for determining whether the device is out of the water, it is acceptable to adopt any arbitrary method besides the capacitance method, such as the resistive film method, the load detection method, the surface acoustic wave method, the infra-red ray method, or the like.

The controller 10 discriminates the type of a gesture, on the basis of at least one selected from among: the contact detected by the touch screen 2B, the position in which the contact is detected, a change of the position in which the contact is detected, an interval with which contacting actions are detected, and the number of times contact is detected. Operations which the controller 10 is capable of performing can be executed by the smartphone 1 including the controller 10. In other words, the operations performed by the controller 10 may be performed by the smartphone 1. The gesture denotes an operation performed on the touch screen 2B by using one or more fingers. Operations performed on the touch screen 2B can be performed on the touch screen display 2 including the touch screen 2B. Examples of the gesture that can be discriminated by the controller 10 via the touch screen 2B include, but are not limited to, a touch, a long touch, a release, a swipe, a tap, a double tap, a long tap, a drag, a flick, a pinch-in, and a pinch-out.

The button 3 receives an operational input from a user. The number of buttons 3 may be one or more than one.

The illuminance sensor 4 detects illuminance levels. An illuminance level is a value of a light flux incident to a unit area of a measurement surface of the illuminance sensor 4. The illuminance sensor 4 is used for, for example, adjustment of the luminance of the display 2A.

The proximity sensor 5 detects the presence of an object positioned in proximity thereto, in a non-contact manner. The proximity sensor 5 detects presence of the object on the basis of a change in the magnetic field, a change in a return time of a reflective wave of an ultrasound wave, or the like. For example, the proximity sensor 5 detects that the display 2A is brought into proximity to a face of a person. The illuminance sensor 4 and the proximity sensor 5 may be configured as a single sensor. The illuminance sensor 4 may be used as a proximity sensor.

The communication unit 6 performs communication in a wireless manner. Examples of the wireless communication standard supported by the communication unit 6 include, but are not limited to, cellular phone communication standards of 2G, 3G, 4G, and the like and short range wireless communication standards. Examples of the cellular phone communication standards include, but are not limited to, Long Term Evolution (LTE), Wideband Code Division Multiple Access (W-CDMA), Worldwide Interoperability for Microwave Access (WiMAX) (registered trademark), CDMA 2000, Personal Digital Cellular (PDC), Global System for Mobile Communications (GSM) (registered trademark), and Personal Handy-phone System (PHS). Examples of the short range wireless communication standards include, but are not limited to, Institute for Electrical and Electronics Engineers (IEEE) 802.11, Bluetooth (registered trademark), Infrared Data Association (IrDA), Near Field Communication (NFC), and Wireless Personal Area Network (WPAN). Examples of the communication standards of WPAN include, but are not limited to, ZigBee (registered trademark). The communication unit 6 may support one or more of the communication standards listed above.

The receiver 7 is an example of a sound output module. The receiver 7 outputs a sound signal transmitted thereto from the controller 10, as a sound. For example, the receiver 7 is capable of outputting a sound of a moving picture and a sound of music played back by the smartphone 1, as well as voice of a communicating partner during a telephone call. The microphone 8 is an example of a sound input module. The microphone 8 converts voice of the user or the like into a sound signal and transmits the sound signal to the controller 10.

The storage 9 is capable of storing therein computer programs (hereinafter, "programs") and data. The storage 9 may be used as a work area that temporarily stores therein processing results of the controller 10. The storage 9 may include an arbitrary non-transitory storage medium such as a semiconductor storage medium, a magnetic storage medium, or the like. The storage 9 may include a plurality of types of storage media. The storage 9 may include a combination made up of a storage medium such as a memory card, an optical disc, a magneto-optic disc, or the like and a storage medium reading device. The storage 9 may include a storage device used as a temporary storage region such as a Random Access Memory (RAM).

The programs stored in the storage 9 include an application executed in the foreground or in the background and a control program (not illustrated) that assists operations of the application. The screen of the application is displayed on the display 2A, for example, when being executed in the foreground. Examples of the control program include, but are not limited to, an Operating System (OS). The application and a basic program may be installed in the storage 9 via a wireless communication through the communication unit 6 or a non-transitory storage medium.

The storage 9 is capable of storing therein a control program 9A, a camera application 9B, a telephone application 9C, setting data 9Z, and the like.

The control program 9A is able to provide a function of conjecturing that, when the value of the atmospheric pressure measured by the atmospheric pressure sensor 17 satisfies a condition, the device is immersed in water. The control program 9A is able to provide a function of conjecturing whether the device that has been immersed in water is out of the water, on the basis of a detection result obtained by the touch screen 2B. The control program 9A is able to provide a function of periodically conjecturing whether the device that has been immersed in water is out of the water, on the basis of a detection result obtained by the touch screen 2B. The control program 9A is able to provide a function of conjecturing whether the device that has been immersed in water is out of the water, on the basis of the plurality of detection points on the touch screen 2B and output values from the plurality of detection points.

The camera application 9B is able to provide a function of taking, editing, and managing still images and moving images. The telephone application 9C is able to provide a telephone call function to realize a telephone call through a wireless communication.

The setting data 9Z is configured so as to include various types of data used in processes performed on the basis of the functions provided by the control program 9A, the camera application 9B, and the like. The setting data 9Z includes data related to changes in the atmospheric pressure used for conjecturing that the device is immersed in water. The setting data 9Z includes data related to changes in the capacitance used for conjecturing whether the device that has been immersed in water is out of the water.

The controller 10 includes an arithmetic processing unit. Examples of the arithmetic processing unit include, but are not limited to, a Central Processing Unit (CPU), a System-on-a-Chip (SoC), a Micro Control Unit (MCU), a Field Programmable Gate Array (FPGA), and a Co-processor. The controller 10 realizes various types of functions by integrally controlling operations of the smartphone 1. The controller 10 is an example of a controlling module.

More specifically, the controller 10 executes commands included in any of the programs stored in the storage 9, while referring to the data stored in the storage 9, as necessary. The controller 10 controls various functional modules in accordance with the data and the commands and thereby realizes the various types of functions. Examples of the functional modules include, but are not limited to, at least one selected from among the display 2A, the communication unit 6, the microphone 8, and the speaker 11. The controller 10 may change the control in accordance with a detection result obtained by a sensor. Examples of the sensor include, but are not limited to, at least one selected from among the touch screen 2B, the button 3, the illuminance sensor 4, the proximity sensor 5, the microphone 8, the camera 12, the camera 13, the acceleration sensor 15, the azimuth sensor 16, and the atmospheric pressure sensor 17.

Figure 2:
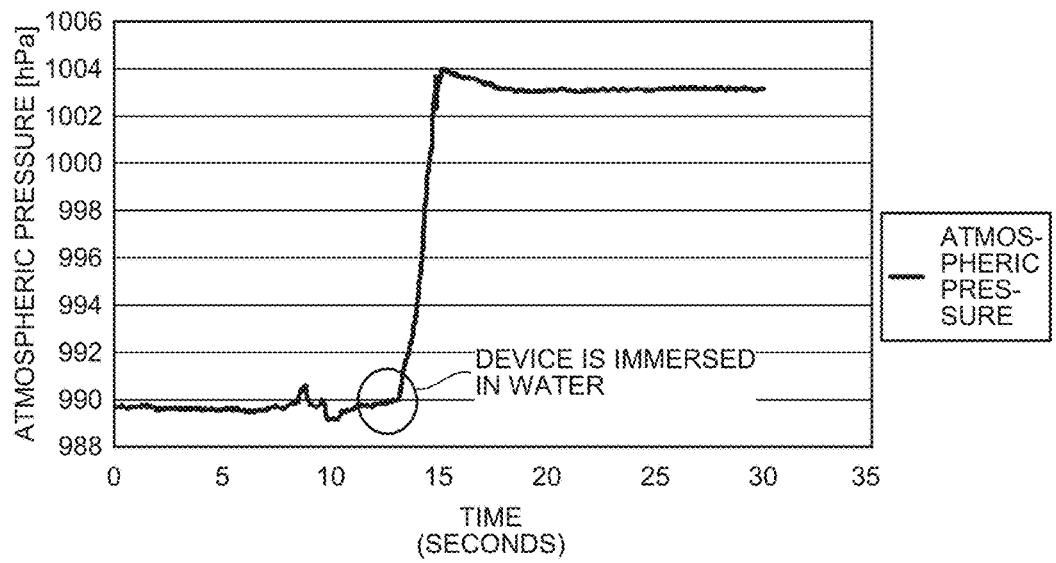
FIG. 2 is a chart illustrating an example of fluctuations of atmospheric pressure measured by an atmospheric pressure sensor.

The controller 10 realizes the process of conjecturing that the device is immersed in water by executing the control program 9A. When the value of the atmospheric pressure measured by the atmospheric pressure sensor 17 satisfies the condition, the controller 10 conjectures that the device is immersed in water. FIG. 2 is a chart illustrating an example of fluctuations of the atmospheric pressure measured by the atmospheric pressure sensor. As illustrated in FIG. 2, the value of the atmospheric pressure measured by the atmospheric pressure sensor 17 exhibits a drastic increase of 10 hectopascals or more for a few seconds, when the device is immersed in water. For example, the controller 10 is able to determine whether the device is immersed in water by defining, in advance, a change in (a slope of) the atmospheric pressure per unit time period exhibited when the device is immersed in water. In other words, the controller 10 is able to conjecture that the device is immersed in water by comparing the change in the atmospheric pressure defined in advance with the change in the atmospheric pressure calculated from the values of the atmospheric pressure measured by the atmospheric pressure sensor 17. For example, when the change in the atmospheric pressure defined in advance coincides, with a certain degree of accuracy, with the change in the atmospheric pressure calculated from the values measured by the atmospheric pressure sensor 17, the controller 10 may conjecture that the device is immersed in water.

Figure 3:
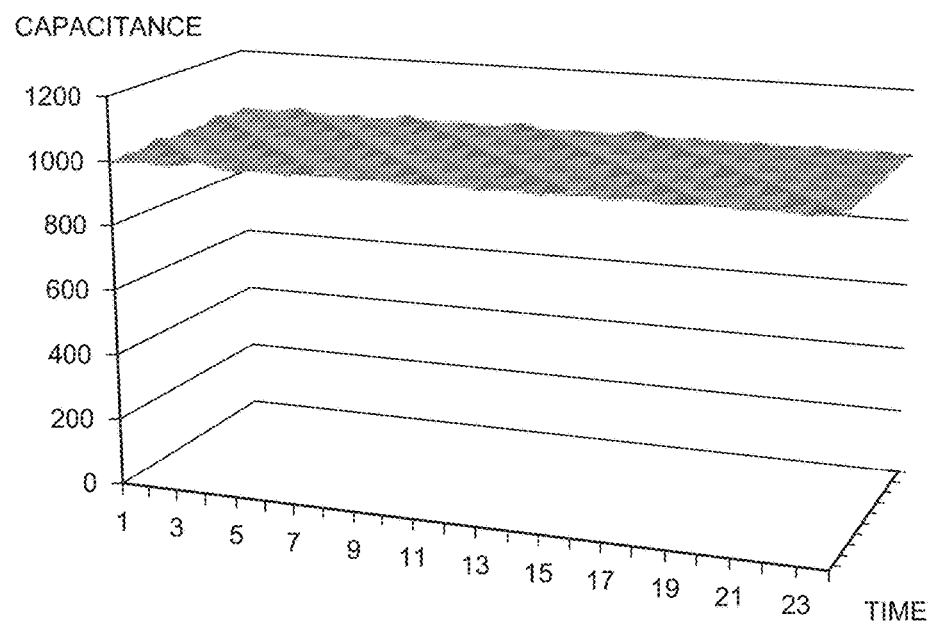
FIG. 3 is a chart illustrating an example of capacitance measured by a touch screen.
Figure 4:
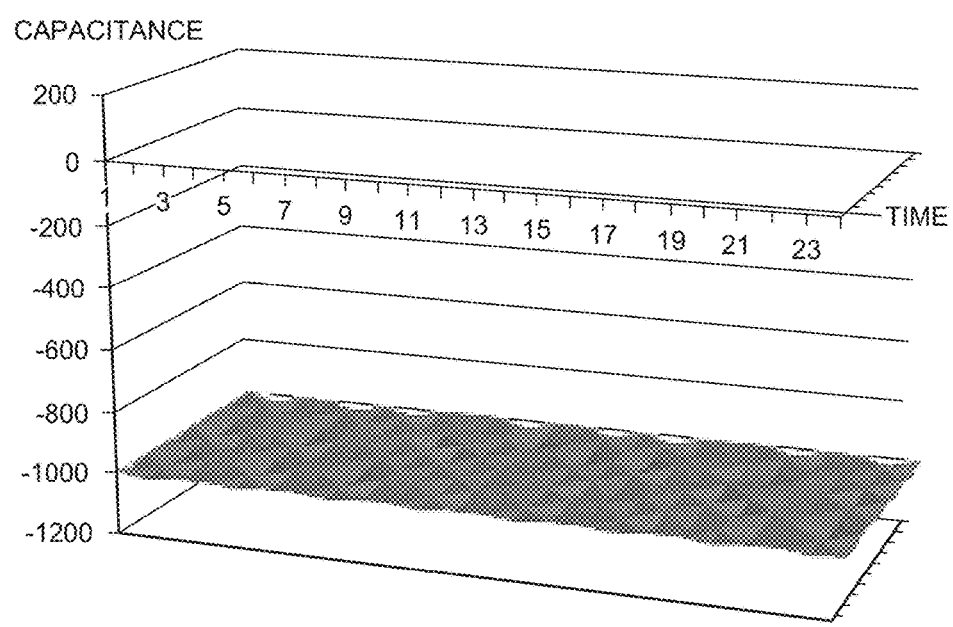
FIG. 4 is a chart illustrating another example of the capacitance measured by the touch screen.
Figure 5:
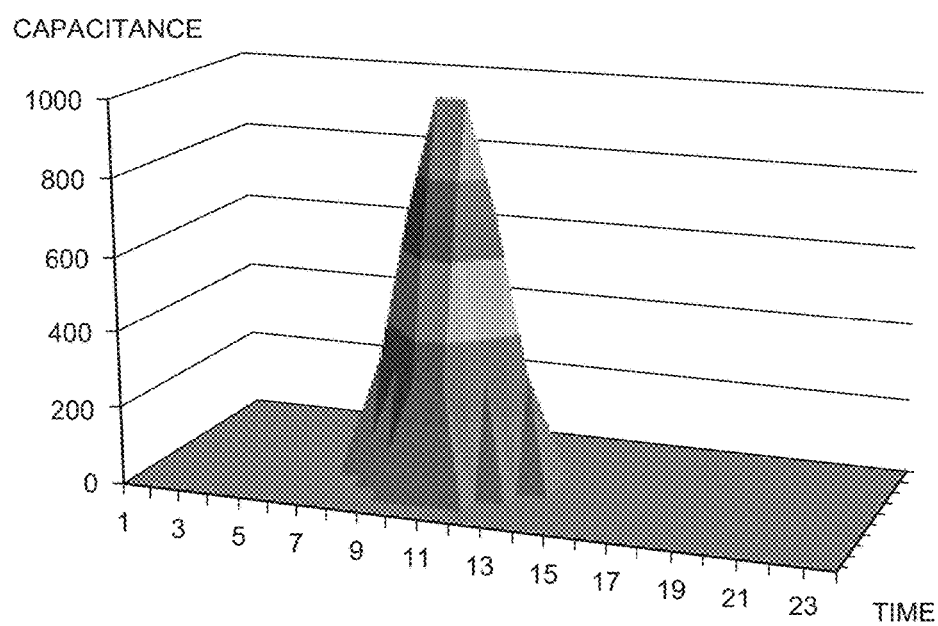
FIG. 5 is a chart illustrating yet another example of the capacitance measured by the touch screen.

The controller 10 realizes the process of conjecturing whether the device that has been immersed in water is out of the water, on the basis of a detection result obtained by the touch screen 2B. FIG. 3 is a chart illustrating an example of the capacitance measured by the touch screen. FIGS. 4 and 5 are charts illustrating other examples of the capacitance measured by the touch screen. The chart in FIG. 3 corresponds to the capacitance exhibited when the device is immersed in water. The chart in FIG. 4 corresponds to the capacitance exhibited when the device is taken out of water. The chart in FIG. 5 corresponds to the capacitance exhibited when a finger touches the touch screen 2B. As illustrated in FIG. 3, when the device is immersed in water, the capacitance measured by the touch screen 2B exhibits a distribution in which the capacitance is uniform near a certain positive value. In contrast, as illustrated in FIG. 4, when the device is taken out of the water, i.e., when the device is out of the water and is in the air, the fluctuation of the capacitance measured by the touch screen 2B exhibits a distribution in which the capacitance is uniform near a certain negative value. As illustrated in FIG. 5, when a finger touches the touch screen 2B, the capacitance measured by the touch screen 2B exhibits a non-uniform distribution, unlike in the examples illustrated in FIGS. 3 and 4. The controller 10 is able to conjecture that the device is out of the water, by determining whether the capacitance measured by the touch screen 2B exhibits a transition from the example of capacitance illustrated in FIG. 3 to the example of capacitance illustrated in FIG. 4 or FIG. 5.

When performing the process of conjecturing that the device is out of the water on the basis of the detection result obtained by the touch screen 2B, the controller 10 is able to perform the process of making the conjecture on the basis of the output value from each detection point on the touch screen 2B. When performing the process of conjecturing that the device is out of the water on the basis of the detection result obtained by the touch screen 2B, the controller 10 may periodically perform the process with predetermined timing.

The speaker 11 includes a sound output module. The speaker 11 outputs a sound signal transmitted thereto from the controller 10, as a sound. For example, the speaker 11 may output a ringtone and music. One of the receiver 7 and the speaker 11 may offer the functions of the other.

The camera 12 and the camera 13 are each capable of converting an image taken thereby into an electrical signal. The camera 12 may be a frontside camera that takes an image of an object facing the display 2A. The camera 13 may be a rearside camera that takes an image of an object facing the side opposite from the display 2A. The camera 12 and the camera 13 may be installed in the smartphone 1 while being functionally and physically integrated together as a camera unit in which it is possible to be used as the frontside and or the rearside cameras while switching therebetween.

The connector 14 is a terminal to which another device can be connected. The connector 14 may be a generally-used terminal such as a Universal Serial Bus (USB) terminal, a High-Definition Multimedia Interface (HDMI) (registered trademark) terminal, a Light Peak (Thunderbolt (registered trademark)) terminal, or an earphone/microphone connector. The connector 14 may be an exclusive-use terminal such as a dock connector. Examples of the device that can be connected to the connector 14 include, but are not limited to, an external storage device, a speaker, and a communication device.

The acceleration sensor 15 is capable of measuring a direction and a magnitude of acceleration acting on the smartphone 1. The azimuth sensor 16 is capable of detecting, for example, a direction of the geomagnetism and measuring a orientation (the azimuth) of the smartphone 1, on the basis of the direction of the geomagnetism.

The atmospheric pressure sensor 17 is capable of measuring the atmospheric pressure acting on the smartphone 1. The atmospheric pressure sensor 17 is an example of a sensor.

In addition to the functional modules described above, the smartphone 1 may include a Global Positioning System (GPS) receiver and a vibrator. The GPS receiver is capable of receiving a radio signal in a predetermined frequency band from GPS satellites. The GPS receiver performs a demodulating process on the received radio signal and transmits the processed signal to the controller 10. The GPS receiver supports a process of calculating the current position of the smartphone 1. The vibrator causes a part or the entirety of the smartphone 1 to vibrate. For example, the vibrator includes a piezoelectric element or an eccentric motor to generate the vibration. The smartphone 1 has installed therein functional modules (e.g., a battery) that are inevitably used to maintain various functions of the smartphone 1 and one or more controllers that are inevitably used to realize the control over the smartphone 1.

Figure 6:
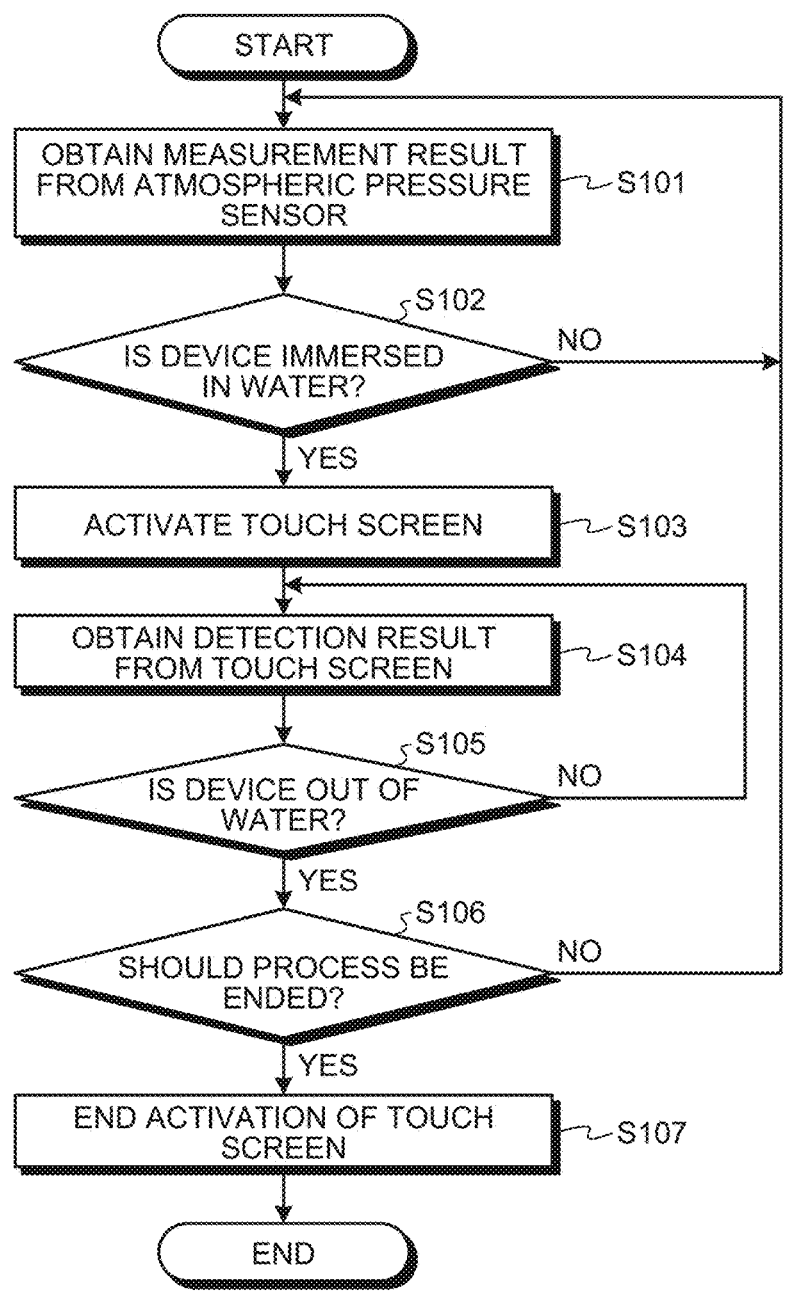
FIG. 6 is a flowchart illustrating a flow in a process performed by a smartphone according to one of the embodiments.

A flow in a process performed by the smartphone 1 according to some embodiments will be explained, with reference to FIG. 6. FIG. 6 is a flowchart illustrating the flow in the process performed by the smartphone according to the embodiments. The process illustrated in FIG. 6 is realized as a result of executing the control program 9A stored in the storage 9 by the controller 10. The process illustrated in FIG. 6 is repeatedly performed while the smartphone 1 is activated, unless an operation to end the process illustrated in FIG. 6 is performed.

As illustrated in FIG. 6, the controller 10 obtains a measurement result from the atmospheric pressure sensor 17 (Step S101).

The controller 10 determines whether the device is immersed in water, on the basis of the measurement result obtained by the atmospheric pressure sensor 17 (Step S102). When the result of the determining process indicates that the device is not immersed in water (No at Step S102), the controller 10 returns to the processing procedure at Step S101 described above.

On the contrary, when the result of the determining process indicates that the device is immersed in water (Yes at Step S102), the controller 10 activates the touch screen 2B (Step S103).

The controller 10 obtains a detection result from the touch screen 2B (Step S104).

The controller 10 determines whether the device is out of the water, on the basis of the detection result obtained by the touch screen 2B (Step S105).

When the result of the determining process indicates that the device is not yet out of the water (No at Step S105), the controller 10 returns to the processing procedure at Step S104.

On the contrary, when the result of the determining process indicates that the device is out of the water (Yes at Step S105), the controller 10 determines whether the process should be ended (Step S106). For example, when a situation where it is unlikely that the device is immersed in water (e.g., when the device starts being electrically charged via the connector 14) is detected, the controller 10 determines that the process illustrated in FIG. 6 should be ended.

When the result of the determining process indicates that the process should not be ended (No at Step S106), the controller 10 returns to the processing procedure at Step S101 described above.

When the result of the determining process indicates that the process should be ended (Yes at Step S106), the controller 10 ends the activation of the touch screen 2B (Step S107) and ends the process illustrated in FIG. 6.

During the process illustrated in FIG. 6, the determining process at Step S105 may repeatedly be performed by the controller 10 with predetermined timing, for example.

In the aspect of the embodiments described above, when having determined that the device is immersed in water on the basis of the change in the atmospheric pressure, the smartphone 1 activates the touch screen 2B and conjectures whether the device that has been immersed in water is out of the water, on the basis of the change in the capacitance measured by the touch screen 2B. According to the embodiments, the touch screen 2B is used after it has been determined that the device is immersed in water on the basis of the change in the atmospheric pressure. Accordingly, the smartphone 1 is able to determine whether the device is immersed in water and whether the device is out of the water, while keeping the electric power consumption low.

Figure 7:
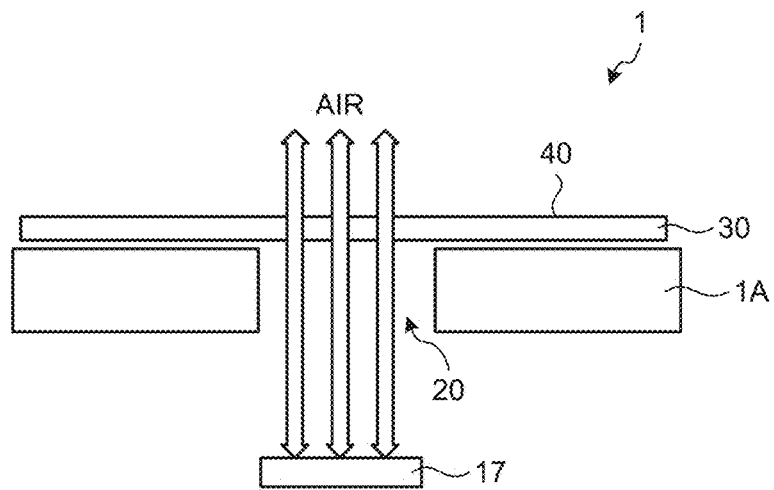
FIG. 7 is a schematic drawing of a partial cross-sectional view of the smartphone.
Figure 8:
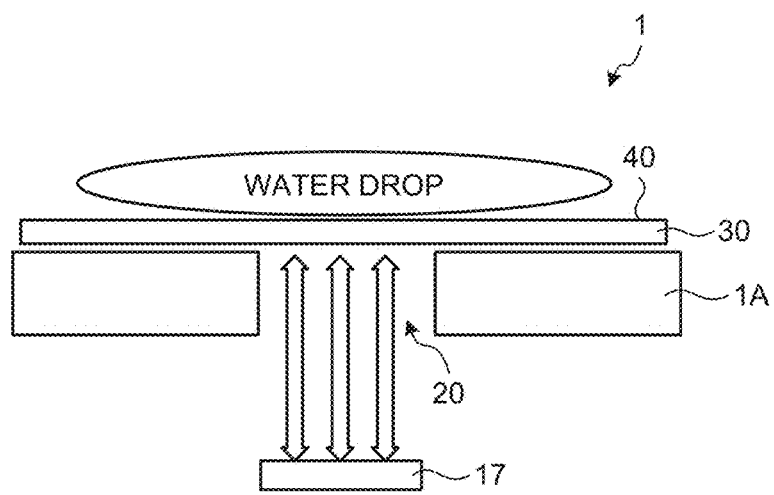
FIG. 8 is another schematic drawing of a partial cross-sectional view of the smartphone.
Figure 9:
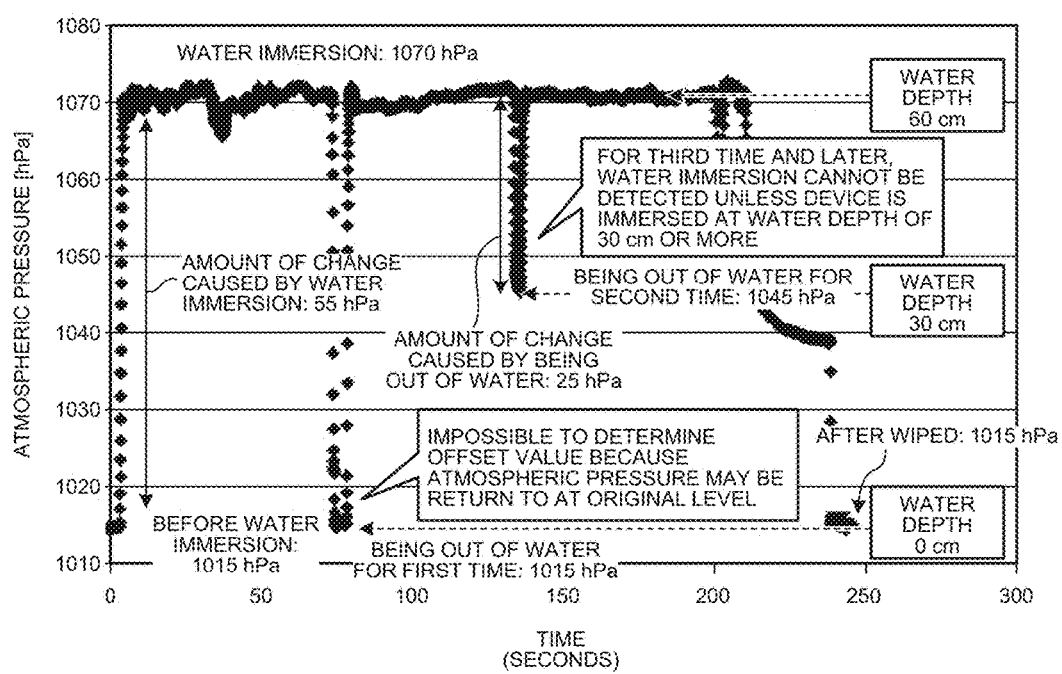
FIG. 9 is a chart illustrating another example of fluctuations of the atmospheric pressure measured by the atmospheric pressure sensor.

As explained in the aspect of the embodiments above, the smartphone 1 conjectures that the device is immersed in water on the basis of the change in the atmospheric pressure and conjectures that the device is out of the water on the basis of the change in the capacitance. In view of further reducing the electric power consumption, it is also acceptable to configure the smartphone 1 so as to perform the process of conjecturing both whether the device is immersed in water and whether the device is out of the water, only on the basis of the measurement result obtained by the atmospheric pressure sensor 17, which uses a relatively smaller amount of electric power, without using the touch screen 2B, which uses a relatively larger amount of electric power. However, the smartphone 1 according to the embodiments does not perform the process of conjecturing whether the device is out of the water on the basis of the measurement result obtained by the atmospheric pressure sensor 17, i.e., on the basis of a change in the atmospheric pressure. The reason will be explained below. FIGS. 7 and 8 are schematic drawings of partial cross-sectional views of the smartphone. FIG. 9 is a chart illustrating another example of fluctuations of the atmospheric pressure measured by the atmospheric pressure sensor.

As illustrated in FIG. 7, the smartphone 1 includes a housing 1A. The housing 1A is provided with a ventilation hole 20 in a position opposite to the atmospheric pressure sensor 17. A ventilation valve including a sheet 30 and a water retention sheet 40 which is made of cloth is provided on the external surface of the ventilation hole 20. When the smartphone 1 is immersed in water, a water drop or a water film may be formed on the outside of the ventilation valve, as illustrated in FIG. 8, due to the water retention function of the water retention sheet 40. Because the ventilation through the ventilation hole 20 becomes insufficient, there is a possibility that the atmospheric pressure sensor 17 may become unable to measure the atmospheric pressure accurately. This possibility is apparent also from the fact that, for example, when the smartphone 1 repeatedly goes in and out of water as illustrated in FIG. 9, the difference between the value of the atmospheric pressure exhibited when the smartphone 1 is immersed in water and the value of the atmospheric pressure exhibited when the smartphone 1 is taken out of the water gradually becomes smaller. In the example illustrated in FIG. 9, because the value of the atmospheric pressure observed when the device is taken out of the water for the first time may be back at the original level of atmospheric pressure observed before the water immersion, it is impossible to determine an offset value. In the example illustrated in FIG. 9, for water immersions for the third time and later, it is not possible to detect the smartphone 1 being underwater, unless the smartphone 1 sinks by 30 cm or more. In the example illustrated in FIG. 9, after water drops are wiped off the smartphone 1 taken out of the water, the atmospheric pressure may return to the original level. When the smartphone 1 repeatedly goes in and out of water, it would be difficult for the controller 10 to conjecture that the device is out of water on the basis of changes in the atmospheric pressure. According to the aspect of the embodiments described above, the problem described above, which would be caused if it were determined whether the device is out of water on the basis of changes in the atmospheric pressure, is solved by configuring the smartphone 1 to determine whether the device is out of water on the basis of a change in the capacitance measured by the touch screen 2B. The ventilation hole 20 is an example of a hole. The water retention sheet 40 is an example of a member made of cloth.

In the aspect of the embodiments described above, the smartphone 1 conjectures whether the device is immersed in water on the basis of the change in the atmospheric pressure and conjectures whether the device is out of the water on the basis of the change in the capacitance. As illustrated in FIG. 9, when the smartphone 1 repeatedly goes in and out of water in a short period of time, the smartphone 1 may have a water drop or the like formed on the outside of the ventilation valve for the ventilation hole 20. In that situation, it is difficult for the smartphone 1 to conjecture not only whether the device is out of water, but also whether the device is immersed in water for the second time or later, due to the water drop or the like formed on the outside of the ventilation valve. In another aspect of the embodiments described below, an example will be explained in which the smartphone 1 conjectures that the device is immersed in water for the first time on the basis of a change in the atmospheric pressure measured by the atmospheric pressure sensor 17 and conjectures that the device is immersed in water for the second time or later on the basis of changes in the capacitance measured by the touch screen 2B. With this arrangement, the smartphone 1 is able to determine more accurately whether the device is immersed in water and whether the device is out of water.

The smartphone 1 according to said another aspect is different from the smartphone 1 according to the aspect of the embodiments described above, for the following features.

The control program 9A provides a function of conjecturing whether the device that has been immersed in water is out of the water on the basis of a detection result obtained by the touch screen 2B and subsequently conjecturing whether the device is immersed in water again on the basis of a detection result obtained by the touch screen 2B.

First of all, by executing the control program 9A, the controller 10 conjectures whether the device that has been immersed in water is out of the water, on the basis of the detection result obtained by the touch screen 2B. After conjecturing that the smartphone 1 is out of the water, the controller 10 realizes the process of conjecturing whether the device is immersed in water again, on the basis of the detection result obtained by the touch screen 2B. In other words, the controller 10 conjectures the water immersion of the device for the first time, on the basis of a change in the atmospheric pressure measured by the atmospheric pressure sensor 17. Subsequently, after conjecturing that the device is out of the water on the basis of a change in the capacitance measured by the touch screen 2B, the controller 10 performs a process of making a conjecture on the basis of changes in the capacitance measured by the touch screen 2B, with respect to being immersed in water and being out of the water for the second time and later.

When performing the process of conjecturing that the device is immersed in water and that the device is out of the water on the basis of the detection results obtained by the touch screen 2B, the controller 10 performs a process of making the conjecture on the basis of the detection points on the touch screen 2B and output values from the detection points. When performing the process of conjecturing that the device is immersed in water and that the device is out of the water on the basis of the detection results obtained by the touch screen 2B, the controller 10 may periodically perform the process with predetermined timing.

Figure 10:
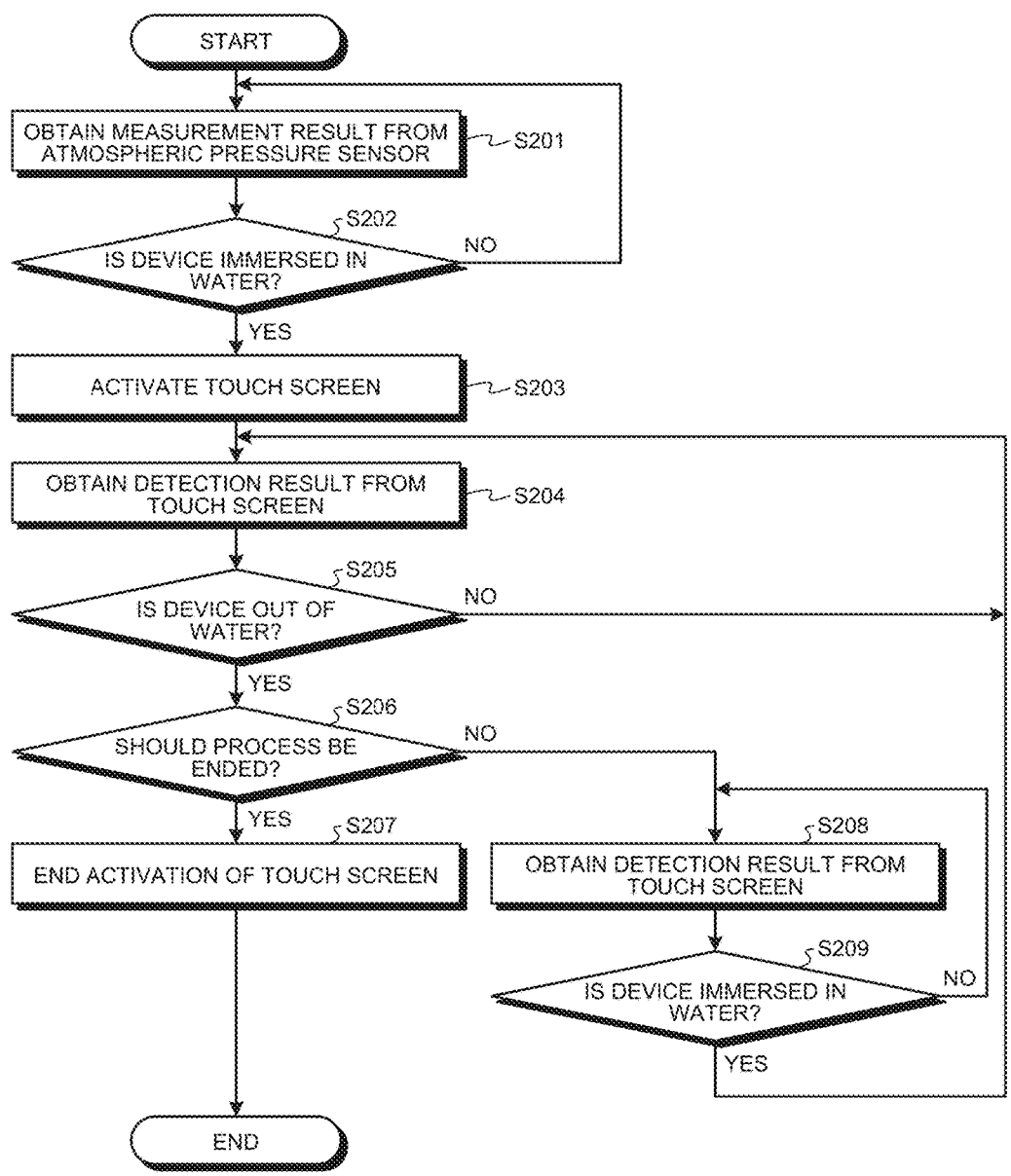
FIG. 10 is a flowchart illustrating a flow in a process performed by a smartphone according to one of the embodiments.

A flow in a process performed by the smartphone 1 according to some embodiments will be explained, with reference to FIG. 10. FIG. 10 is a flowchart illustrating the flow in the process performed by the smartphone according to the embodiments. The process illustrated in FIG. 10 is realized as a result of executing the control program 9A stored in the storage 9 by the controller 10. The process illustrated in FIG. 10 is repeatedly performed while the smartphone 1 is activated, unless an operation to end the process illustrated in FIG. 10 is performed.

As illustrated in FIG. 10, the controller 10 obtains a measurement result from the atmospheric pressure sensor 17 (Step S201).

The controller 10 determines whether the device is immersed in water, on the basis of the measurement result obtained by the atmospheric pressure sensor 17 (Step S202). When the result of the determining process indicates that the device is not immersed in water (No at Step S202), the controller 10 returns to the processing procedure at Step S201 described above.

On the contrary, when the result of the determining process indicates that the device is immersed in water (Yes at Step S202), the controller 10 activates the touch screen 2B (Step S203).

The controller 10 obtains a detection result from the touch screen 2B (Step S204).

The controller 10 determines whether the device is out of the water, on the basis of the detection result obtained by the touch screen 2B (Step S205).

When the result of the determining process indicates that the device is not yet out of the water (No at Step S205), the controller 10 returns to the processing procedure at Step S204.

On the contrary, when the result of the determining process indicates that the device is out of the water (Yes at Step S205), the controller 10 determines whether the process should be ended (Step S206). For example, when a situation where it is unlikely that the device is immersed in water (e.g., when the device starts being electrically charged via the connector 14) is detected, the controller 10 determines that the process illustrated in FIG. 10 should be ended.

When the result of the determining process indicates that the process should be ended (Yes at Step S206), the controller 10 ends the activation of the touch screen 2B (Step S207) and ends the process illustrated in FIG. 10.

On the contrary, when the result of the determining process indicates that the process should not be ended (No at Step S206), the controller 10 obtains a detection result from the touch screen 2B (Step S208).

The controller 10 determines whether the device is immersed in water, on the basis of the detection result obtained by the touch screen 2B (Step S209).

When the result of the determining process indicates that the device is not immersed in water (No at Step S209), the controller 10 returns to the processing procedure at Step S208 described above.

On the contrary, when the result of the determining process indicates that the device is immersed in water (Yes at Step S209), the controller 10 returns to the processing procedure at Step S204 described above.

During the process illustrated in FIG. 10, the determining process at Step S205 may repeatedly be performed by the controller 10 with predetermined timing, for example. During the process illustrated in FIG. 10, the determining process at Step S209 may repeatedly be performed by the controller 10 with predetermined timing, for example.

The process according to the aspect of the embodiments described above is similarly applicable to any other electronic device that is expected to be operated in water, besides the smartphone 1.

Figure 11:
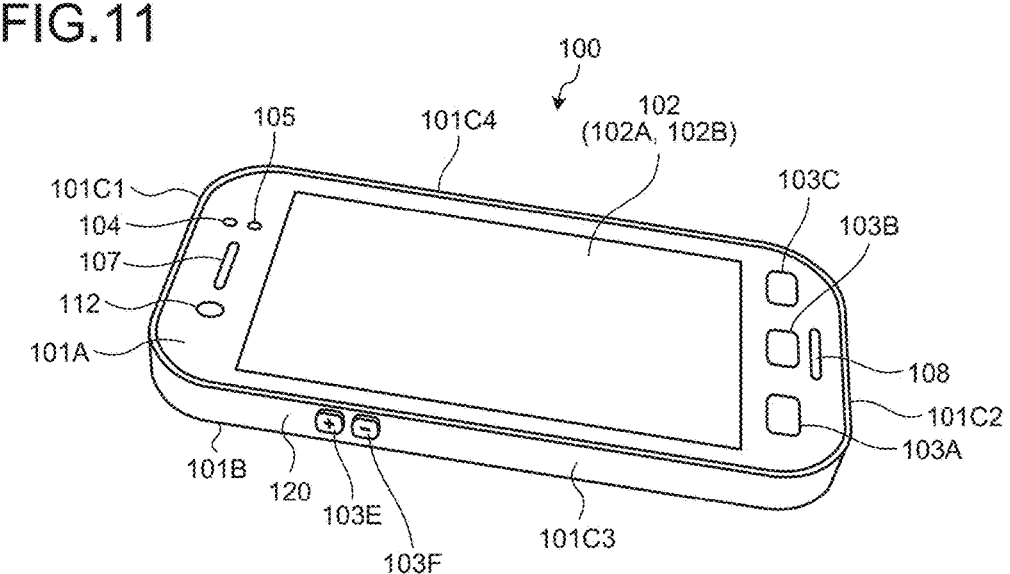
FIG. 11 is a perspective view of the smartphone according to some embodiments.
Figure 12:
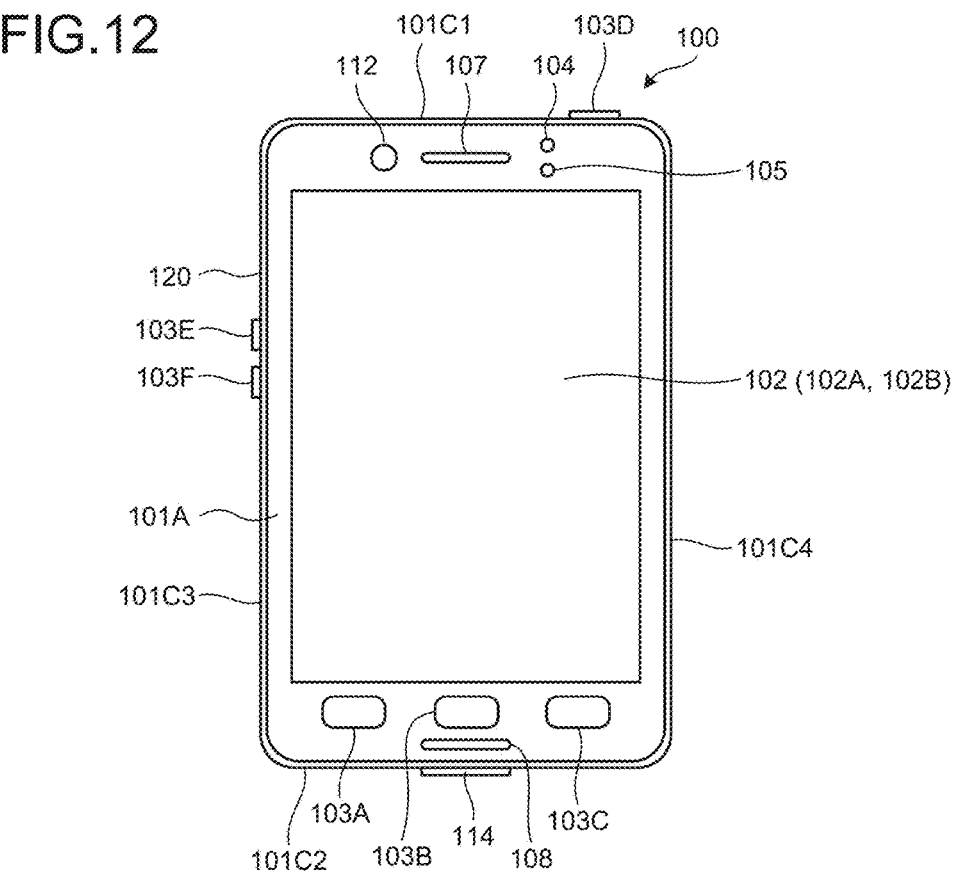
FIG. 12 is a front view of the smartphone.
Figure 13:
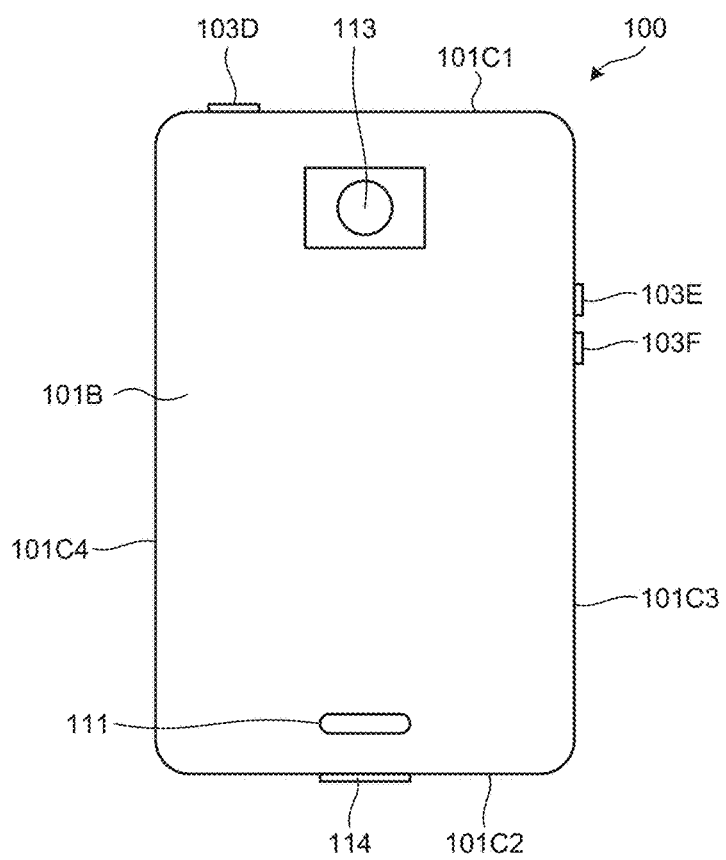
FIG. 13 is a rear view of the smartphone.

An overall configuration of a smartphone 100 according to some embodiments will be explained, with reference to FIGS. 11 to 13. As illustrated in FIGS. 11 to 13, the smartphone 100 includes a housing 120. The housing 120 includes a front face 101A, a back face 101B, and side faces 101C1 to 101C4. The front face 101A is the face positioned on the front of the housing 120. The back face 101B is the face positioned on the back of the housing 120. The side faces 101C1 to 101C4 are lateral faces connecting the front face 101A and the back face 101B together. In the following explanation, the side faces 101C1 to 101C4 may collectively be referred to as side faces 101C, without any particular one of the faces being specified.

The smartphone 100 has, on the front face 101A thereof, a touch screen display 102, buttons 103A to 103C, an illuminance sensor 104, a proximity sensor 105, a receiver 107, a microphone 108, and a camera 112. Further, the smartphone 100 has, on the back face 101B thereof, a speaker 111 and a camera 113. Also, the smartphone 100 has, on the side face 101C thereof, buttons 103D to 103F and a connector 114. In the following sections, the buttons 103A to 103F may collectively be referred to as buttons 103, without any particular one of the buttons being specified.

The touch screen display 102 includes a display 102A and a touch screen 102B. In the example illustrated in FIG. 11, the display 102A and the touch screen 102B each have a substantially rectangular shape; however, the shapes of the display 102A and the touch screen 102B are not limited to the shapes in the present example. The display 102A and the touch screen 102B may each have any shape such as a square or a circular shape. In the example illustrated in FIG. 11, the display 102A and the touch screen 102B are positioned on top of each other; however, the positions of the display 102A and the touch screen 102B are not limited to those in the present example. For instance, the display 102A and the touch screen 102B may be positioned side by side or may be positioned apart from each other. In the example illustrated in FIG. 11, the long sides of the display 102A extend along the long sides of the touch screen 102B, whereas the short sides of the display 102A extend along the short sides of the touch screen 102B; however, the manner in which the display 102A and the touch screen 102B are positioned on top of each other is not limited to the one in the present example. For instance, when the display 102A and the touch screen 102B are positioned on top of each other, one or more of the sides of the display 102A do not have to extend along any of the sides of the touch screen 102B.

The display 102A includes a display device configured with a Liquid Crystal Display (LCD), an Organic Electro-Luminescence Display (OELD), an Inorganic Electro-Luminescence Display (IELD), or the like. The display 102A displays text, an image, a symbol, a figure, and the like.

The touch screen 102B detects contact of a finger, a pen, a stylus pen, or the like with the touch screen 102B. The touch screen 102B is capable of detecting the positions in which a plurality of fingers, pens, stylus pens, or the like are in contact with the touch screen 102B. In the following explanation, the fingers, the pens, the stylus pens, or the like that come into contact with the touch screen 102B may be referred to as "contacting object" or "object that is in contact".

The detection method implemented by the touch screen 102B may be an arbitrary method, such as a capacitance method, a resistive film method, a surface acoustic wave method, an infra-red ray method, a load detection method, or the like. The following explanation is based on the assumption that, for the purpose of keeping the explanation simple, the user touches the touch screen 102B with his/her one or more fingers, to operate the smartphone 100.

The smartphone 100 discriminates the type of a gesture, on the basis of at least one selected from among: the contact detected by the touch screen 102B, the position in which the contact is detected, a change of the position in which the contact is detected, an interval with which contacting actions are detected, and the number of times contact is detected. The gesture denotes an operation performed on the touch screen 102B. Examples of the gesture that can be discriminated by the smartphone 100 include, but are not limited to, a touch, a long touch, a release, a swipe, a tap, a double tap, a long tap, a drag, a flick, a pinch-in, and a pinch-out.

The smartphone 100 operates according to any of the gestures discriminated via the touch screen 102B. Thus, it is possible to realize operability that is intuitive and makes it easy for the user to use the device. Operations performed by the smartphone 100 according to the discriminated gestures may vary depending on the screen being displayed on the display 102A. In the following explanation, for the purpose of keeping the explanation simple, the situation in which "the touch screen 102B detects contact, and the smartphone 100 discriminates the type of the gesture as X on the basis of the detected contact" may be expressed as "the smartphone 100 detects X" or as "a controller detects X".

The housing 120 included in the smartphone 100 is structured so as to prevent water from entering the inside thereof. To realize a sealing structure, the smartphone 100 is configured so that openings formed in the housing 120 are sealed by using functional members that pass gas but do not pass liquid, as well as one or more caps, or the like. The functional members that pass gas but do not pass liquid may be realized by using, for example, Gore-Tex (registered trademark), Drytec, eVent, BERGTECH, HyventD, or the like. In the present aspect of the embodiments, the housing 120 includes the touch screen display 102 and the buttons 103. In that situation, the smartphone 100 is configured so that the functional members that pass gas but do not pass liquid and the like prevent water from entering the gap formed between the housing 120 and the touch screen display 102 and buttons 103.

The smartphone 100 is able to offer various use cases by including the sealing structure. Examples of the use cases include, but are not limited to, cases where the device is used near water and cases where the device is used in water.

Figure 14:
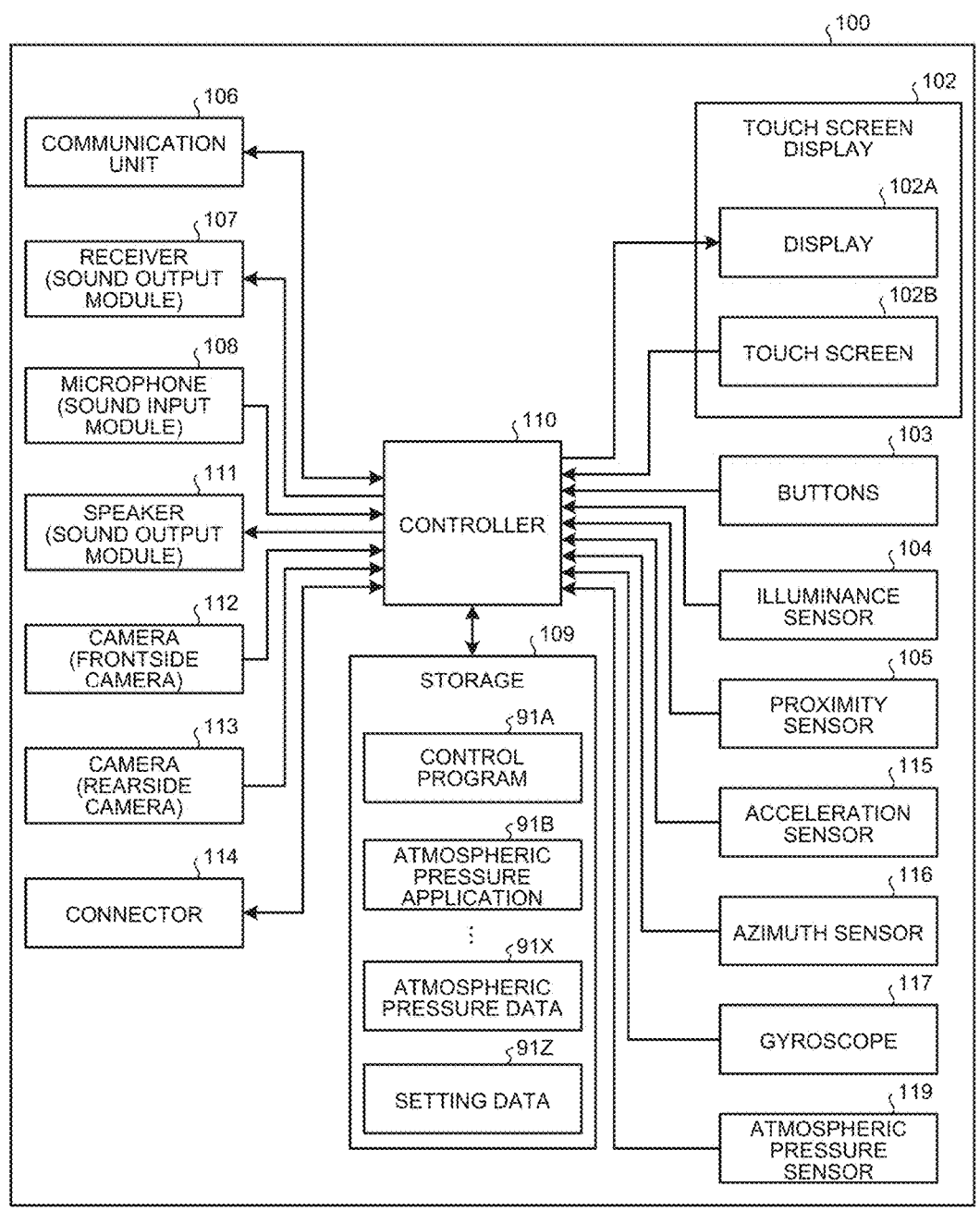
FIG. 14 is a block diagram of the smartphone.

FIG. 14 is a block diagram of the smartphone 100. The smartphone 100 includes the touch screen display 102, the buttons 103, the illuminance sensor 104, the proximity sensor 105, a communication unit 106, the receiver 107, the microphone 108, a storage 109, a controller 110, the speaker 111, the cameras 112 and 113, the connector 114, an acceleration sensor 115, an azimuth sensor 116, a gyroscope 117, and an atmospheric pressure sensor 119.

The touch screen display 102 includes, as mentioned above, the display 102A and the touch screen 102B. The display 102A displays text, an image, a symbol, a shape, or the like. The touch screen 102B detects contact. The controller 110 detects a gesture performed on the smartphone 100. More specifically, the controller 110 detects an operation (the gesture) performed on the touch screen 102B (the touch screen display 102), in collaboration with the touch screen 102B.

The buttons 103 are operated by the user. The buttons 103 includes the buttons 103A to 103F. The controller 110 detects an operation performed on any of the buttons 103, in collaboration with the buttons 103. Examples of the operation performed on the buttons 103 include, but are not limited to, a click, a double click, a triple crick, a push, and a multi-push.

The buttons 103A to 103C may be, for example, a home button, a back button, and a menu button. The button 103D may be, for example, a power on/off button for the smartphone 100. The button 103D may also serve as a sleep/ cancel-sleep button. The buttons 103E and 103F may be, for example, sound volume buttons.

The illuminance sensor 104 detects the illuminance of ambient light of the smartphone 100. The illuminance denotes intensity, brightness, or luminance of the light. For example, the illuminance sensor 104 is used for adjusting the luminance of the display 102A. The proximity sensor 105 detects the presence of an object positioned in proximity thereto, in a non-contact manner. The proximity sensor 105 detects presence of the object on the basis of a change in the magnetic field, a change in a return time of a reflective wave of an ultrasound wave, or the like. For example, the proximity sensor 105 detects that the touch screen display 102 is brought into proximity to a face of a person. The illuminance sensor 104 and the proximity sensor 105 may be configured as a single sensor. The illuminance sensor 104 may be used as a proximity sensor.

The communication unit 106 performs communication in a wireless manner. A communication method supported by the communication unit 106 is based on a wireless communication standard. Examples of the wireless communication standard include, but are not limited to, cellular phone communication standards of 2G, 3G, 4G, and the like. Examples of the cellular phone communication standards include, but are not limited to, Long Term Evolution (LTE), Wideband Code Division Multiple Access (W-CDMA), Wideband Code Division Multiple Access 2000 (CDMA 2000), Personal Digital Cellular (PDC), Global System for Mobile Communications (GSM) (registered trademark), and Personal Handy-phone System (PHS). Examples of the wireless communication standard further include, but are not limited to, Worldwide Interoperability for Microwave Access (WiMAX) (registered trademark), IEEE 802.11, Bluetooth (registered trademark), Infrared Data Association (IrDA), and a Near Field Communication (NFC). The communication unit 106 may support one or more of the communication standards listed above.

The receiver 107 and the speaker 111 are each an example of a sound output module that outputs sound. The receiver 107 and the speaker 111 are each capable of outputting a sound signal transmitted thereto from the controller 110, as a sound. For example, the receiver 107 may be used for outputting voice of a communication partner during a telephone call. For example, the speaker 111 may be used for outputting a ringtone and music. One of the receiver 107 and the speaker 111 may offer the functions of the other. The microphone 108 is an example of a sound input module that inputs sound. The microphone 108 is capable of converting voice of the user or the like into a sound signal and transmitting the sound signal to the controller 110.

The storage 109 is capable of storing therein programs and data. The storage 109 may also be used as a work area that temporarily stores therein processing results of the controller 110. The storage 109 includes a recording medium. The recording medium may include an arbitrary non-transitory storage medium such as a semiconductor storage medium, a magnetic storage medium, or the like. The storage 109 may include a plurality of types of storage media. The storage 109 may include a combination made up of a portable storage medium such as a memory card, an optical disc, a magneto-optic disc, or the like and a storage medium reading device. The storage 109 may include a storage device used as a temporary storage region such as a Random Access Memory (RAM).

The programs stored in the storage 109 include an application executed in the foreground or in the background and a control program that assists operations of the application. For example, the application causes the display 102A to display a screen and causes the controller 110 to execute a process corresponding to the gesture detected via the touch screen 102B. The control program may be an OS, for example. The application and the control program may be installed in the storage 109 via a wireless communication through the communication unit 106 or a non-transitory storage medium.

The storage 109 stores therein, for example, a control program 91A, an atmospheric pressure application 91B, atmospheric pressure data 91X, and setting data 91Z. For example, the atmospheric pressure application 91B is able to provide a function of displaying the atmospheric pressure acting on the smartphone 100. The atmospheric pressure data 91X includes information indicating the atmospheric pressure acting on the smartphone 100. The setting data 91Z includes information about various types of settings related to operations of the smartphone 100.

The control program 91A is able to provide functions related to various types of control to bring the smartphone 100 into operation. For example, by controlling the communication unit 106, the receiver 107, the microphone 108, and the like, the control program 91A realizes a telephone call. The functions provided by the control program 91A include a function for various types of control such as changing information displayed on the display 102A in accordance with a gesture detected via the touch screen 102B. The functions provided by the control program 91A include a function of detecting traveling and stopping of the user having the smartphone 100, by controlling the acceleration sensor 115, the atmospheric pressure sensor 119, and the like. Any of the functions provided by the control program 91A may be used in combination with a function provided by another program such as the atmospheric pressure application 91B or the like.

The control program 91A is able to provide a function of determining whether the smartphone 100 (hereinafter, "the device") is immersed in water. Methods used for determining that the smartphone 100 is immersed in water will be explained later.

The atmospheric pressure application 91B is used for displaying a value of the atmospheric pressure, for example. The atmospheric pressure application 91B is able to provide a function of a barometer, for example. The atmospheric pressure application 91B is able to provide a function of logging atmospheric pressure values in an arbitrary cycle. The atmospheric pressure application 91B is able to provide a function of displaying the value of the atmospheric pressure detected by the atmospheric pressure sensor 119 on the display 102A. The atmospheric pressure application 91B is able to provide a function of calculating an altitude by applying the detected atmospheric pressure value into a calculation formula. In the present aspect of the embodiments, an example will be explained in which the atmospheric pressure application 91B provides a function of displaying a value of the atmospheric pressure and a value of the altitude.

The atmospheric pressure data 91X may include a plurality of pieces of atmospheric pressure information. The atmospheric pressure data 91X is stored in a time series. The atmospheric pressure information includes items such as time, atmospheric pressure, and the like. The time denotes the time at which the atmospheric pressure is detected by the atmospheric pressure sensor 119. The atmospheric pressure denotes a value of the pressure of the atmosphere detected by the atmospheric pressure sensor 119. In the atmospheric pressure data 91X, the value of the atmospheric pressure detected by the atmospheric pressure sensor 119 is logged.

The setting data 91Z includes condition data used for determining that the smartphone 100 (the device) is immersed in water. Examples of situations in which the device is immersed in water include, but are not limited to, situations where the entire device is immersed in water, situations where the device is submerged in water, and situations where a part of the device is immersed in water. The condition data will be explained later.

The controller 110 includes an arithmetic processing unit. Examples of the arithmetic processing unit include, but are not limited to, a Central Processing Unit (CPU), a System-on-a-Chip (SoC), a Micro Control Unit (MCU), a Field Programmable Gate Array (FPGA), and a Co-processor. The controller 110 is capable of integrally controlling operations of the smartphone 100. Various types of functions of the smartphone 100 are realized on the basis of the control by the controller 110.

More specifically, the controller 110 is capable of executing commands included in any of the programs stored in the storage 109. The controller 110 is able to refer to the data stored in the storage 109 as necessary. The controller 110 controls functional modules according to the data and the commands. The controller 110 realizes the various types of functions by controlling the functional modules. Examples of the functional modules include, but are not limited to, the display 102A, the communication unit 106, the receiver 107, and the speaker 111. The controller 110 may change the control in accordance with a detection result obtained by a sensor. Examples of the sensor include, but are not limited to, the touch screen 102B, the buttons 103, the illuminance sensor 104, the proximity sensor 105, the microphone 108, the camera 112, the camera 113, the acceleration sensor 115, the azimuth sensor 116, the gyroscope 117, and the atmospheric pressure sensor 119.

The controller 110 is capable of performing the various types of control by executing the control program 91A, for example. The various types of control which the controller 110 is capable of performing include changing the information displayed on the display 102A in accordance with a gesture detected via the touch screen 102B.

The camera 112 is a frontside camera that takes an image of an object facing the front face 101A. The camera 113 is a rearside camera that takes an image of an object facing the back face 101B.

The connector 114 is a terminal to which another device can be connected. The connector 114 may be a generally-used terminal such as a Universal Serial Bus (USB) terminal, a High-Definition Multimedia Interface (HDMI) (registered trademark) terminal, a Light Peak (Thunderbolt (registered trademark)) terminal, or an earphone/microphone connector. The connector 114 may be an exclusive-use terminal such as a dock connector. Examples of the device that can be connected to the connector 114 include, but are not limited to, an external storage device, a speaker, and a communication device.

The acceleration sensor 115 is capable of detecting a direction and a magnitude of acceleration acting on the smartphone 100. The azimuth sensor 116 is capable of detecting a direction of terrestrial magnetism. The gyroscope 117 is capable of detecting an angle of the smartphone 100 and a magnitude of an angular velocity thereof. The atmospheric pressure sensor 119 is capable of detecting atmospheric pressure acting on the smartphone 100. Detection results obtained by the acceleration sensor 115, the azimuth sensor 116, the gyroscope 117, and the atmospheric pressure sensor 119 may be used in combination for detecting changes in position and attitude of the smartphone 100.

A part or all of the programs and the data stored in the storage 109 illustrated in FIG. 14 may be downloaded from another device through a wireless communication performed by the communication unit 106. A part or all of the programs and the data stored in the storage 109 illustrated in FIG. 14 may be stored in a non-transitory storage medium from which a reading device included in the storage 109 is able to read information. A part or all of the programs and the data stored in the storage 109 illustrated in FIG. 14 may be stored in a non-transitory storage medium from which a reading device connected to the connector 114 is able to read information. Examples of the non-transitory storage medium include, but are not limited to, an optical disc such as a Compact Disc (CD) (registered trademark), a Digital Versatile Disc (DVD) (registered trademark), a Blu-ray (registered trademark) disc, or the like, a magneto-optical disc, a magnetic storage medium, a memory card, and a solid state storage medium.

The configuration of the smartphone 100 illustrated in FIG. 14 is merely an example and may be modified as appropriate without departing from the gist of the embodiments. For example, the number and the types of the buttons 103 are not limited to those in the example illustrated in FIG. 14. As buttons used for performing operations related to a screen, the smartphone 100 may include buttons in a ten-key formation or in a QWERTY formation, in place of the buttons 103A to 103C. For operations related to a screen, the smartphone 100 may include only one button or may include no button. In the example illustrated in FIG. 14, the smartphone 100 includes the two cameras; however, the smartphone 100 may include only one camera or may include no camera. In the example illustrated in FIG. 14, the smartphone 100 includes the four types of sensors to detect the position and the attitude thereof; however, the smartphone 100 does not have to include all of the four types of sensors. Alternatively, the smartphone 100 may include another type of sensor to detect one or both of the position and the attitude thereof.

Figure 15:
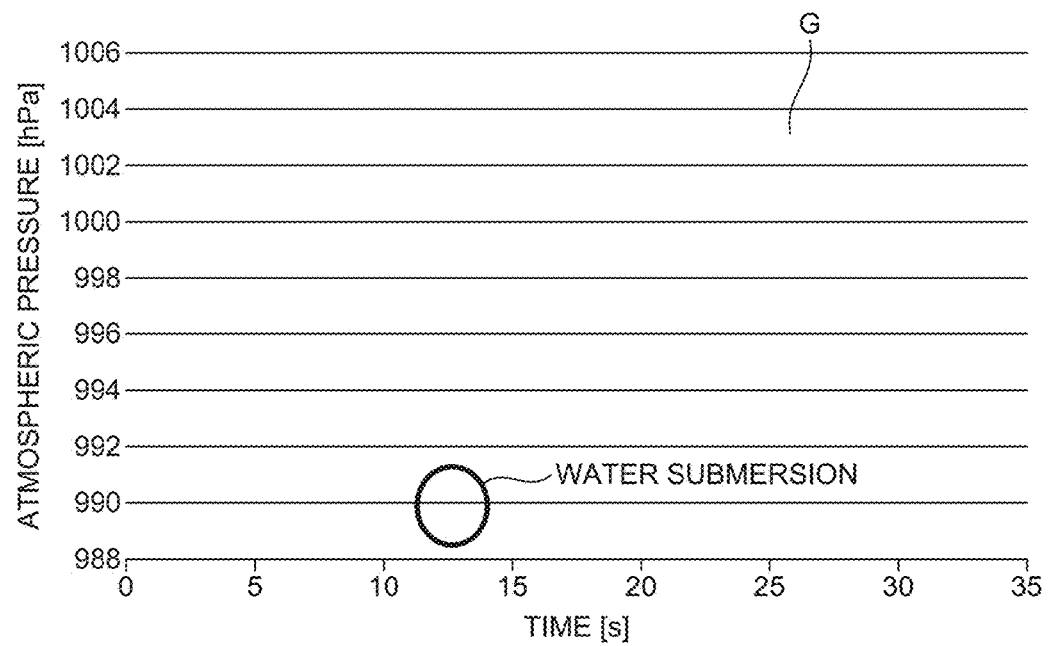
FIG. 15 is a chart illustrating an example of fluctuations of the atmospheric pressure when a smartphone is submerged in water.

An example of a change in the atmospheric pressure detected by the atmospheric pressure sensor 119 when the smartphone 100 is submerged in water, i.e., when the device is completely immersed in water will be explained, with reference to FIG. 15. FIG. 15 is a chart illustrating an example of fluctuations of the atmospheric pressure when the smartphone 100 is submerged in water.

The curve G illustrated in FIG. 15 indicates fluctuations of the atmospheric pressure observed when the smartphone 100 in a sealed state is submerged in water. The sealed state denotes a state in which water is prevented from entering the inside of the housing 120. The sealing state is a state in which operations of the smartphone 100 submerged in water are possible.

In the example illustrated in FIG. 15, the atmospheric pressure sensor 119 detects values corresponding to the atmosphere, before the device is submerged in water. When the smartphone 100 is submerged in water, the value of the atmospheric pressure detected by the atmospheric pressure sensor 119 increases from 990 hPa to 1004 hPa for a few seconds. When the smartphone 100 keeps being submerged in the water, the value of the atmospheric pressure detected by the atmospheric pressure sensor 119 remains at 1003 hPa. As observed here, when the smartphone 100 is submerged in water, the value of the atmospheric pressure detected by the atmospheric pressure sensor 119 drastically increases due to the water pressure.

In contrast, when the smartphone 100 travels in a building from one floor to the next floor, the amount of change in the atmospheric pressure detected by the smartphone 100 is approximately 0.5 hPa. As observed here, for the smartphone 100, the change in the atmospheric pressure caused by being submerged in the water is larger than the change in the atmospheric pressure caused by traveling between floors.

The smartphone 100 is able to determine that the device is immersed in water, on the basis of the change in the atmospheric pressure detected by the atmospheric pressure sensor 119. The smartphone 100 is able to use the detection result obtained by the atmospheric pressure sensor 119 used for detecting the atmospheric pressure, for the purpose of determining (detecting) whether the device is immersed in water.

In the present aspect of the embodiments, an example will be explained in which the smartphone 100 arranges the condition data used for determining that the device is immersed in water in the setting data 91Z to be stored. The condition data includes a determination condition indicating an amount of change in the atmospheric pressure caused by a submersion in water per predetermined period of time. For example, there is a low possibility that the atmospheric pressure on (the altitude of) the smartphone 100 may change by as much as 1 hPa (approximately 10 meters [m]) in a time period shorter than one second. The condition data includes a determination condition by which, if the atmospheric pressure changes by 1 hPa or more in 600 ms, for example, it is determined that the device is immersed in water (submerged in water).

After having executed the atmospheric pressure application 91B, the smartphone 100 logs the value of the atmospheric pressure detected by the atmospheric pressure sensor 119 into the atmospheric pressure data 91X stored in the storage 109. The smartphone 100 may execute the atmospheric pressure application 91B while the value of the atmospheric pressure detected by the atmospheric pressure sensor 119 is logged in the atmospheric pressure data 91X stored in the storage 109. The smartphone 100 determines whether the device is immersed in water, on the basis of changes in the value of the atmospheric pressure and the condition data.

When it is determined that the device is not immersed in water, the smartphone 100 inputs the detected value of the atmospheric pressure into the atmospheric pressure application 91B being executed thereby. The smartphone 100 displays the value of the atmospheric pressure and a value of the altitude on the display 102A, by employing the atmospheric pressure application 91B.

When it is determined that the device is immersed in water, the smartphone 100 inputs predetermined data into the atmospheric pressure application 91B being executed thereby. Examples of the predetermined data include, but are not limited to, data indicating that the device is immersed in water, data indicating that a water pressure value is exhibited, and data indicating that an atmospheric pressure value is not exhibited. In the present aspect of the embodiments, an example will be explained in which the predetermined data is data indicating that the device is immersed in water. In this situation, by employing the atmospheric pressure application 91B, the smartphone 100 displays information indicating that the device is immersed in water and the value of the atmospheric pressure on the display 102A.

The smartphone 100 according to the embodiments are capable of determining that the device is immersed in water, by employing the atmospheric pressure sensor 119. When it is determined that the device is immersed in water, the smartphone 100 is able to input the predetermined data into the atmospheric pressure application 91B making use thereof. The smartphone 100 is able to display for the user, in a recognizable manner, whether or not the value of the atmospheric pressure used in the atmospheric pressure application 91B is a value of atmospheric pressure detected at the time of being immersed in water. The smartphone 100 is able to reduce a sense of discomfort felt by the user due to a drastic change in the value of the atmospheric pressure.

In the aspect of the embodiments described above, the example is explained in which, when it is determined that the device is immersed in water, the smartphone 100 inputs the predetermined data into the atmospheric pressure application 91B; however, the embodiments are not limited to this example. For instance, when it is determined that the device is immersed in water, the smartphone 100 may store predetermined data in the storage 109 in association with the atmospheric pressure data 91X. The smartphone 100 is able to keep the event of determining that the device is submerged in water as a log related to the atmospheric pressure.

Figure 16:
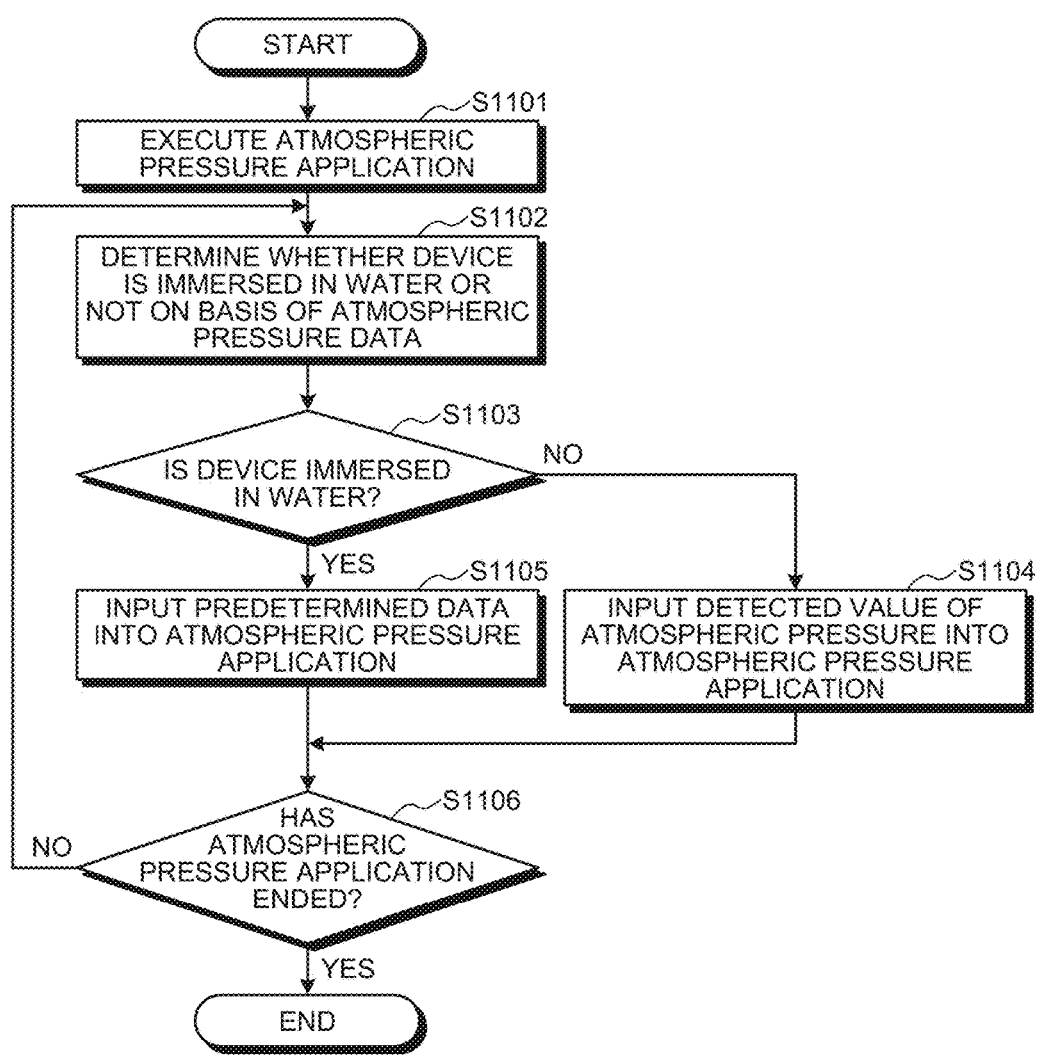
FIG. 16 is a flowchart illustrating a processing procedure in an example of control by the smartphone.

A processing procedure of the control by the smartphone 100 in relation to determining whether the device is immersed in water will be explained, with reference to FIG. 16. FIG. 16 is a flowchart illustrating a processing procedure in an example of the control by the smartphone 100. The processing procedure illustrated in FIG. 16 is realized as a result of executing the control program 91A by the controller 110. The processing procedure illustrated in FIG. 16 is executed when the user requests for executing the atmospheric pressure application 91B.

As illustrated in FIG. 16, the controller 110 included in the smartphone 100 executes the atmospheric pressure application 91B at Step S1101. Processes performed by the controller 110 while executing the atmospheric pressure application 91B will be explained later.

At Step S1102, the controller 110 determines whether the device is immersed in water, on the basis of the atmospheric pressure data 91X stored in the storage 109. More specifically, when a change in the atmospheric pressure logged into the atmospheric pressure data 91X satisfies the determination condition in the condition data, the controller 110 determines that the device is immersed in water.

When it is determined that the device is not immersed in water at Step S1102 (No at Step S1103), the controller 110 proceeds to Step S1104. At Step S1104, the controller 110 inputs the detected value of the atmospheric pressure into the atmospheric pressure application 91B and subsequently proceeds to Step S1106 (explained later).

When it is determined at Step S1102 that the device is immersed in water (Yes at Step S1103), the controller 110 proceeds to Step S1105. At Step S1105, the controller 110 inputs the predetermined data into the atmospheric pressure application 91B and subsequently proceeds to Step S1106.

At Step S1106, the controller 110 determines whether the atmospheric pressure application 91B has ended. When it is determined that the atmospheric pressure application 91B has not ended (No at Step S1106), the controller 110 returns the process to Step S1102 and performs the process again. When it is determined that the atmospheric pressure application 91B has ended (Yes at Step S1106), the controller 110 ends the processing procedure illustrated in FIG. 16.

Figure 17:
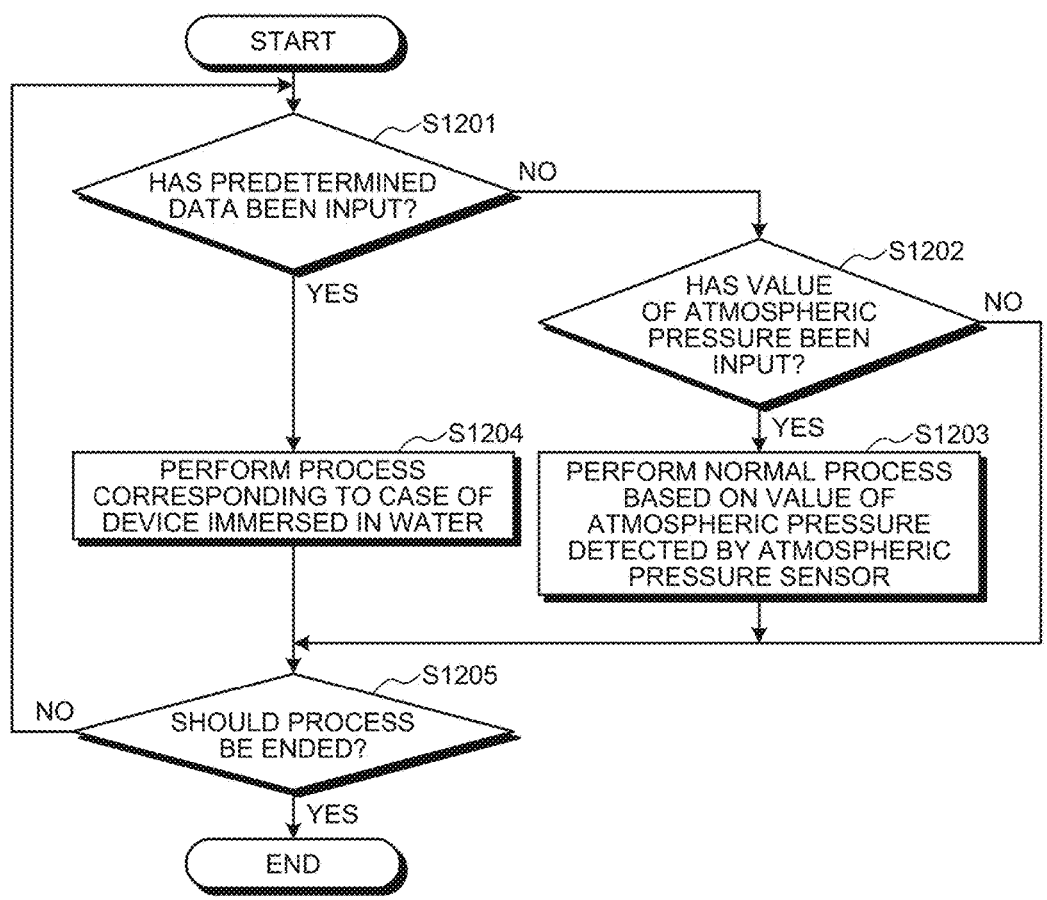
FIG. 17 is a flowchart illustrating a processing procedure related to an atmospheric pressure application.

A processing procedure of the control by the smartphone 100 in relation to the atmospheric pressure application 91B will be explained, with reference to FIG. 17. FIG. 17 is a flowchart illustrating the processing procedure related to the atmospheric pressure application 91B. The processing procedure illustrated in FIG. 17 is realized as a result of executing the atmospheric pressure application 91B by the controller 110.

As illustrated in FIG. 17, at Step S1201, the controller 110 included in the smartphone 100 determines whether the predetermined data has been input. More specifically, when the process at Step S1105 in the processing procedure illustrated in FIG. 16 is performed, the controller 110 determines that the predetermined data has been input. When it is determined that the predetermined data has not been input (No at Step S1201), the controller 110 proceeds to Step S1202.

At Step S1202, the controller 110 determines whether a value of the atmospheric pressure has been input. More specifically, when the process at Step S1104 in the processing procedure illustrated in FIG. 16 is performed, the controller 110 determines that a value of the atmospheric pressure has been input. When it is determined that a value of the atmospheric pressure has not been input (No at Step S1202), the controller 110 proceeds to Step S1205 (explained later). When it is determined that a value of the atmospheric pressure has been input (Yes at Step S1202), the controller 110 proceeds to Step S1203.

At Step S1203, the controller 110 performs a normal process based on the value of the atmospheric pressure detected by the atmospheric pressure sensor 119. Examples of the normal process include, but are not limited to, the process of displaying the input value of the atmospheric pressure and a value of the altitude on the display 102A. By performing the normal process, for example, the controller 110 causes the display 102A to display a screen containing information about the atmospheric pressure and information about the altitude. When having performed the normal process, the controller 110 proceeds to Step S1205 (explained later).

When it is determined that the predetermined data has been input (Yes at Step S1201), the controller 110 proceeds to Step S1204. At Step S1204, the controller 110 performs a process corresponding to a case in which the device is immersed in water. Examples of the process corresponding to the case in which the device is immersed in water include a process of displaying information indicating that the device is immersed in water on the display 102A. By performing the process corresponding to the case in which the device is immersed in water, for example, the controller 110 causes the display 102A to display a screen containing the information indicating that the device is immersed in water, information about the atmospheric pressure, and information about the altitude. When the controller 110 causes the screen to display the information indicating that the device is immersed in water, the controller 110 does not have to cause the screen to display the information about the atmospheric pressure and the information about the altitude. When having performed the process corresponding to the case in which the device is immersed in water, the controller 110 proceeds to Step S1205.

At Step S1205, the controller 110 determines whether the processing procedure should be ended. For example, when an ending operation performed by the user is detected, the controller 110 determines that the processing procedure should be ended. When it is determined that the processing procedure should not be ended (No at Step S1205), the controller 110 returns to Step S1201 to perform the process again. When it is determined that the processing procedure should be ended (Yes at Step S1205), the controller 110 ends the processing procedure illustrated in FIG. 17.

When the predetermined data is data indicating that the device is immersed in water, the smartphone 100 described above may cause the display 102A to display the value of the atmospheric pressure as a value of water pressure, by employing the atmospheric pressure application 91B. In that situation, the smartphone 100 may input the predetermined data and the value of the atmospheric pressure into the atmospheric pressure application 91B. By displaying the value of the water pressure on the display 102A, the smartphone 100 is able to improve the convenience when the user uses the device in water.

Another aspect of the smartphone 100 according to the embodiments will be explained below. The smartphone 100 according to said another aspect of the embodiments has the same configuration as that of the smartphone 100 illustrated in FIGS. 11 to 14, except that the control program 91A has a different function. Thus, said another aspect of the embodiments will be explained below by using the smartphone 100 as an example.

After having executed the atmospheric pressure application 91B, the smartphone 100 logs the value of the atmospheric pressure detected by the atmospheric pressure sensor 119 into the atmospheric pressure data 91X stored in the storage 109. The smartphone 100 determines whether the device is immersed in water, on the basis of a change in the value of the atmospheric pressure and the condition data.

When it is determined that the device is not immersed in water, the smartphone 100 inputs the detected value of the atmospheric pressure into the atmospheric pressure application 91B being executed thereby. The smartphone 100 displays the value of the atmospheric pressure and a value of the altitude on the display 102A, by employing the atmospheric pressure application 91B.

When it is determined that the device is immersed in water, the smartphone 100 discontinues using the detected value of the atmospheric pressure in the atmospheric pressure application 91B being executed thereby. The smartphone 100 discontinues updating the value of the atmospheric pressure and the value of the altitude that are displayed on the display 102A by employing the atmospheric pressure application 91B. As a result, the smartphone 100 is able to avoid the situation where a value that is not a value of the atmospheric pressure (i.e., a value of the water pressure) is displayed, when the detected value of the atmospheric pressure has drastically changed.

Figure 18:
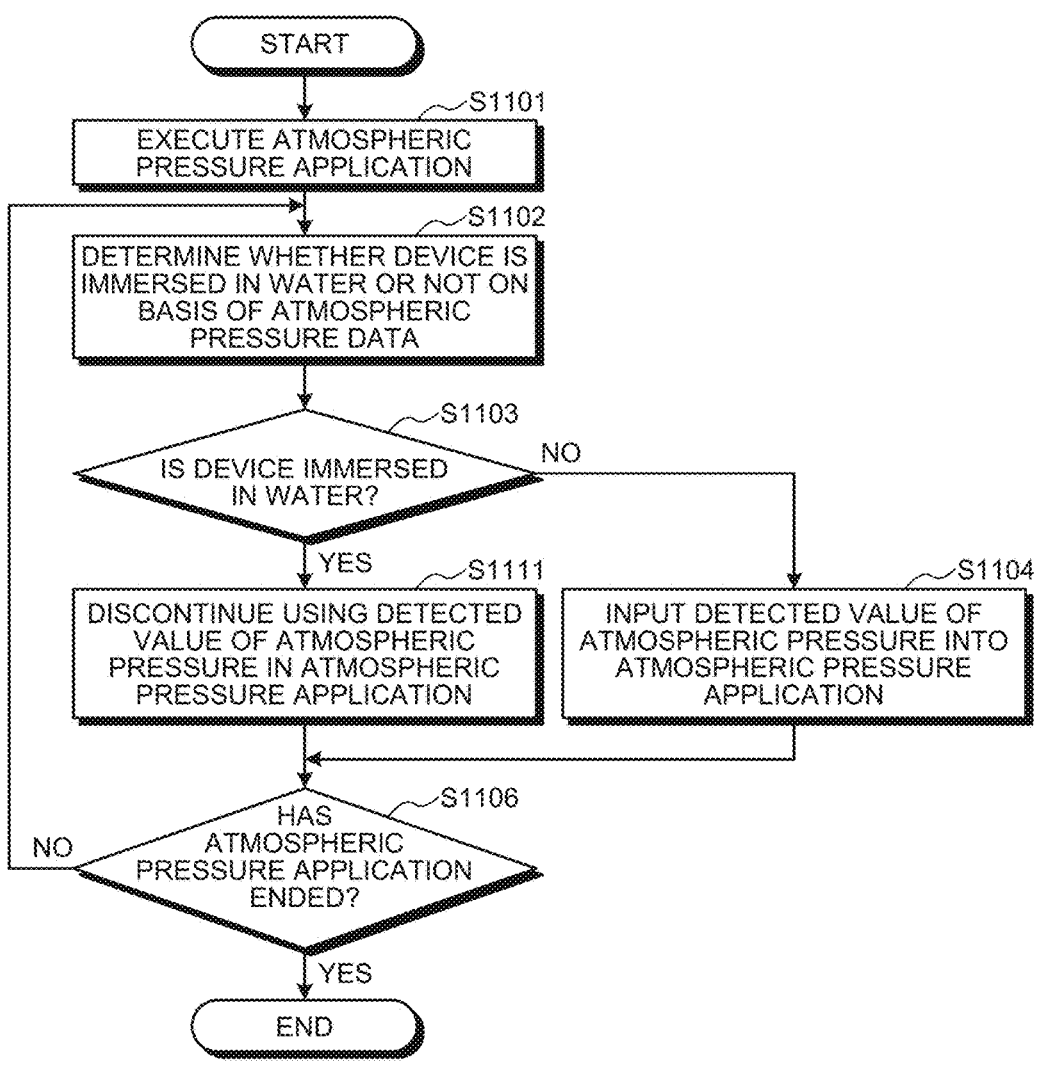
FIG. 18 is a flowchart illustrating a processing procedure in an example of control by a smartphone according to another aspect of the embodiments.

A processing procedure of the control by the smartphone 100 according to said another aspect of the embodiments will be explained, with reference to FIG. 18. FIG. 18 is a flowchart illustrating a processing procedure in an example of the control by the smartphone 100 according to said another aspect of the embodiments. The processing procedure illustrated in FIG. 18 is realized as a result of executing the control program 91A by the controller 110. The processing procedure illustrated in FIG. 18 is performed by the controller 110 when the user requests for executing the atmospheric pressure application 91B.

In the example illustrated in FIG. 18, the processes at Steps S1101 to S1104 and at Step S1106 are the same as the processes at Steps S1101 to S1104 and at Step S1106 in FIG. 16. Thus, only the different parts will be explained, and the explanation for the same parts will be omitted.

When it is determined that the device is immersed in water at Step S1102 (Yes at Step S1103), the controller 110 proceeds to Step S1111. At Step S1111, the controller 110 discontinues using the detected value of the atmospheric pressure in the atmospheric pressure application 91B. In other words, the controller 110 does not input the value of the atmospheric pressure into the atmospheric pressure application 91B. The controller 110 proceeds to Step S1106 (which has already been explained). When it is determined that the atmospheric pressure application 91B has ended (Yes at Step S1106), the controller 110 ends the processing procedure illustrated in FIG. 18.

Figure 19:
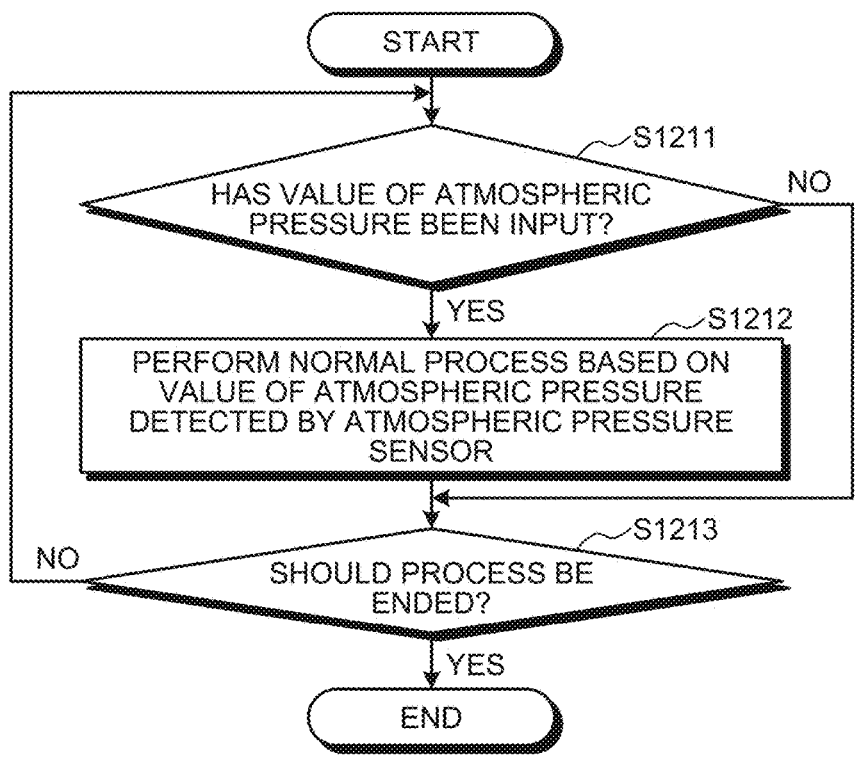
FIG. 19 is a flowchart illustrating a processing procedure related to an atmospheric pressure application according to said another aspect of the embodiments.

A processing procedure of the control by the smartphone 100 in relation to the atmospheric pressure application 91B according to said another aspect will be explained, with reference to FIG. 19. FIG. 19 is a flowchart illustrating the processing procedure related to the atmospheric pressure application 91B according to said another aspect of the embodiments. The processing procedure illustrated in FIG. 19 is realized as a result of executing the atmospheric pressure application 91B by the controller 110.

As illustrated in FIG. 19, at Step S1211, the controller 110 included in the smartphone 100 determines whether a value of the atmospheric pressure has been input. More specifically, when the process at Step S1104 in the processing procedure illustrated in FIG. 18 is performed, the controller 110 determines that a value of the atmospheric pressure has been input. When it is determined that a value of the atmospheric pressure has not been input (No at Step S1211), the controller 110 proceeds to Step S1213 (explained later). When it is determined that a value of the atmospheric pressure has been input (Yes at Step S1211), the controller 110 proceeds to Step S1212.

At Step S1212, the controller 110 performs the normal process based on the value of the atmospheric pressure detected by the atmospheric pressure sensor 119. Examples of the normal process include, but are not limited to, the process of displaying the input value of the atmospheric pressure and a value of the altitude on the display 102A. By performing the normal process, for example, the controller 110 causes the display 102A to display a screen containing information about the atmospheric pressure and information about the altitude. When having performed the normal process, the controller 110 proceeds to Step S1213.

At Step S1213, the controller 110 determines whether the process should be ended. When it is determined that the process should not be ended (No at Step S1213), the controller 110 returns to Step S1211 and performs the process again. When it is determined that the process should be ended (Yes at Step S1213), the controller 110 ends the processing procedure illustrated in FIG. 19.

Yet another aspect of the smartphone 100 according to the embodiments will be explained below. The smartphone 100 according to said yet another aspect of the embodiments has the same configuration as the smartphone 100 illustrated in FIGS. 11 to 14, except that the control program 91A has a different function. Thus, said yet another aspect of the embodiments will be explained below by using the smartphone 100 as an example.

After having executed the atmospheric pressure application 91B, the smartphone 100 logs the value of the atmospheric pressure detected by the atmospheric pressure sensor 119 into the atmospheric pressure data 91X stored in the storage 109. The smartphone 100 determines whether the device is immersed in water, on the basis of a change in the value of the atmospheric pressure and the condition data.

When it is determined that the device is not immersed in water, the smartphone 100 inputs the detected value of the atmospheric pressure into the atmospheric pressure application 91B being executed thereby. The smartphone 100 displays the value of the atmospheric pressure and a value of the altitude on the display 102A, by employing the atmospheric pressure application 91B.

When it is determined that the device is immersed in water, the smartphone 100 inputs the value of the atmospheric pressure observed before having been immersed in water into the atmospheric pressure application 91B. The smartphone 100 displays the value of the atmospheric pressure observed before having been immersed in water and a corresponding value of the altitude on the display 102A, by employing the atmospheric pressure application 91B being executed thereby. As a result, the smartphone 100 is able to avoid the situation where a value that is not a value of the atmospheric pressure (i.e., a value of the water pressure) is displayed, when the detected value of the atmospheric pressure has drastically changed.

Figure 20:
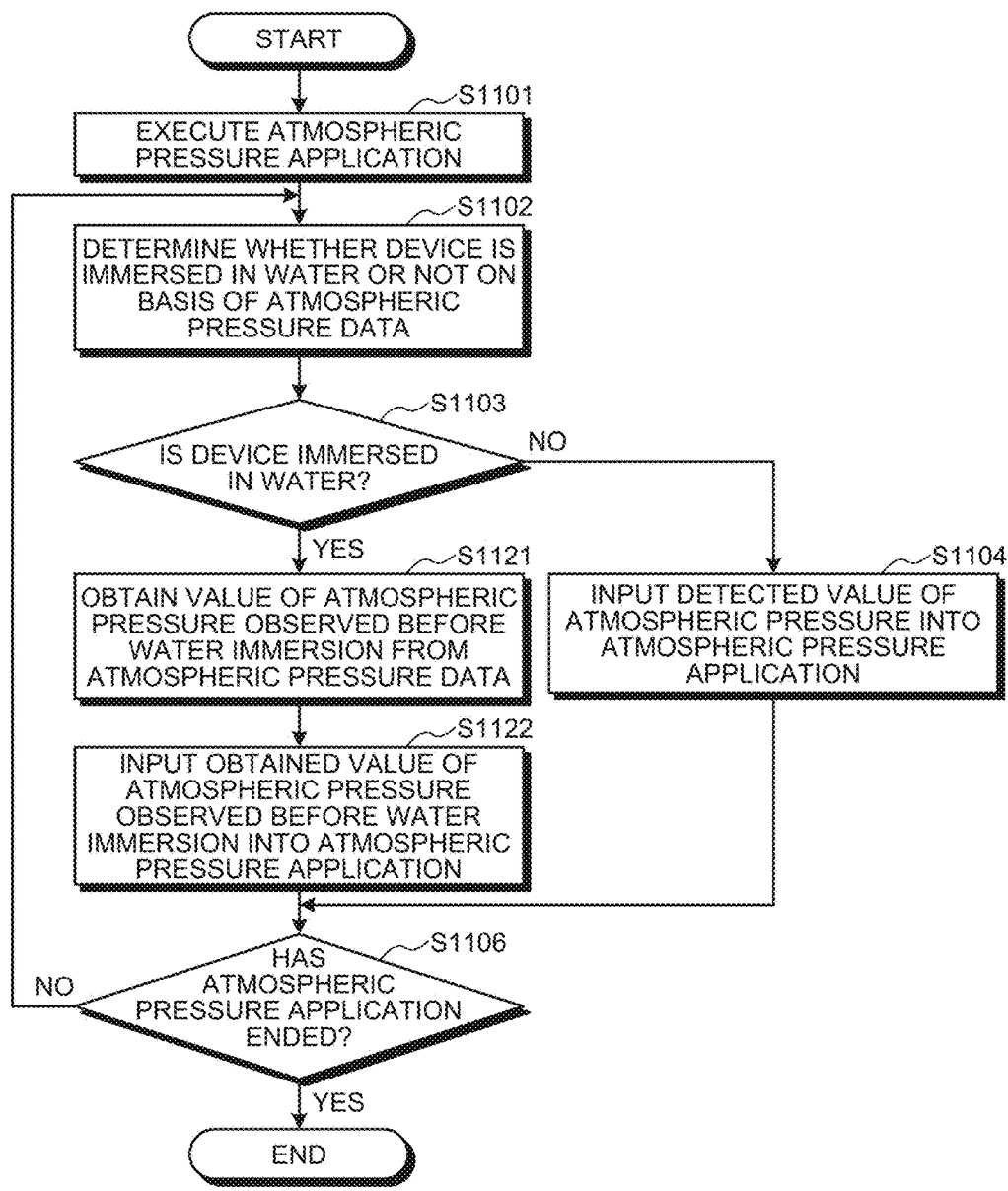
FIG. 20 is a flowchart illustrating a processing procedure in an example of control by a smartphone according to yet another aspect of the embodiments.

A processing procedure of the control by the smartphone 100 according to said yet another aspect of the embodiments will be explained, with reference to FIG. 20. FIG. 20 is a flowchart illustrating a processing procedure in an example of the control by the smartphone 100 according to said yet another aspect of the embodiments. The processing procedure illustrated in FIG. 20 is realized as a result of executing the control program 91A by the controller 110. The processing procedure illustrated in FIG. 20 is performed by the controller 110 when the user requests for executing the atmospheric pressure application 91B.

In the example illustrated in FIG. 20, the processes at Steps S1101 to S1104 and at Step S1106 are the same as the processes at Steps S1101 to S1104 and at Step S1106 in FIG. 16. Thus, only the different parts will be explained, and the explanation for the same parts will be omitted.

When it is determined at Step S1102 that the device is immersed in water (Yes at Step S1103), the controller 110 proceeds to Step S1121. At Step S1121, the controller 110 obtains the value of the atmospheric pressure observed before having been immersed in water from the atmospheric pressure data 91X stored in the storage 109. More specifically, the controller 110 obtains the value of the atmospheric pressure observed before the drastic change has occurred in the value of the atmospheric pressure, from the atmospheric pressure data 91X. At Step S1122, the controller 110 inputs the obtained value of the atmospheric pressure observed before having been immersed in water into the atmospheric pressure application 91B. The controller 110 proceeds to Step S1106 (which has already been explained). When it is determined that the atmospheric pressure application 91B has ended (Yes at Step S1106), the controller 110 ends the processing procedure illustrated in FIG. 20.

As for the processing procedure of the control by the smartphone 100 in relation to the atmospheric pressure application 91B according to said yet another aspect of the embodiments, the processing procedure illustrated in FIG. 19 according to the other aspect of the embodiments that has already been explained is applicable as it is.

The smartphone 100 according to some embodiments will be explained. The smartphone 100 according to the embodiments has the same configuration as the configuration of the smartphone 100 illustrated in FIGS. 11 to 14, except that the control program 91A has a different function. The embodiments will be explained below by using the smartphone 100 as an example.

The example was explained above in which the smartphone 100 according to the aspect of the embodiments determines whether the device is immersed in water on the basis of the detection result obtained by the atmospheric pressure sensor 119. Another example will be explained in which the smartphone 100 according to some embodiments determines whether the device is immersed in water by using another determining method.

Figure 21:
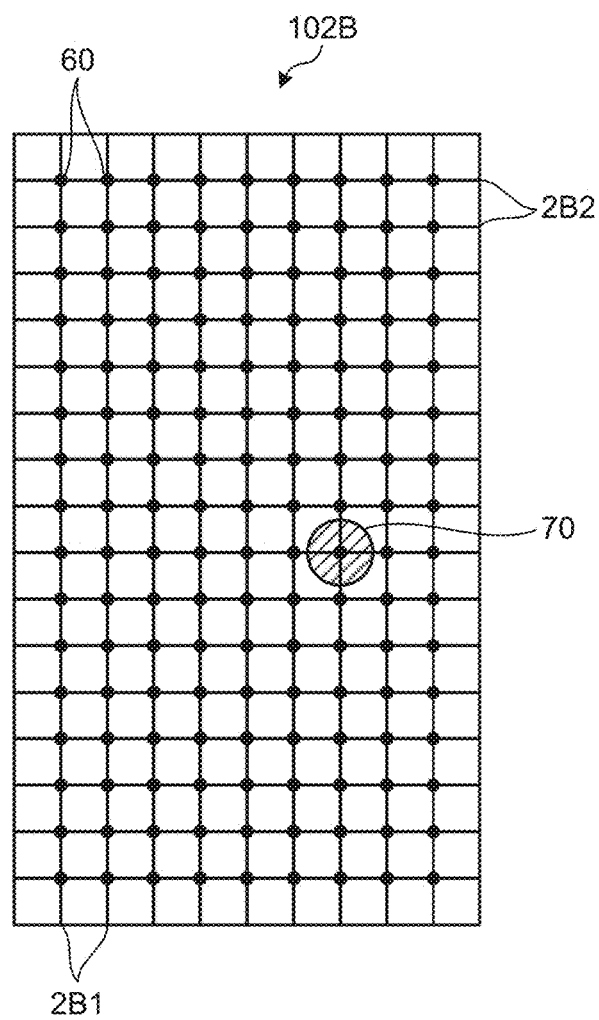
FIG. 21 is a drawing illustrating an example of a detecting configuration of a touch screen.

Said another example in which the smartphone 100 determines whether or not the device is immersed in water will be explained with reference to FIG. 21. FIG. 21 is a drawing illustrating an example of a detecting configuration of the touch screen 102B. The detection method implemented by the touch screen 102B illustrated in FIG. 21 is a capacitance method.

As illustrated in FIG. 21, the touch screen 102B includes a plurality of first electrodes 2B1 and a plurality of second electrodes 2B2. The plurality of first electrodes 2B1 is the electrodes extending in the long-side direction of the touch screen 102B. The plurality of second electrodes 2B2 is the electrodes extending in the short-side direction of the touch screen 102B. The plurality of first electrodes 2B1 intersects the plurality of second electrodes 2B2 in a matrix formation. The parts in which the first electrodes 2B1 and the second electrodes 2B2 intersect each other are detection points 60 of the touch screen 102B. The touch screen 102B includes the plurality of detection points 60. The plurality of detection points 60 is used when the smartphone 100 identifies the contact position (the contact point) of a contacting object on the touch screen 102B. The plurality of detection points 60 is positioned in a matrix formation.

The touch screen 102B is configured in such a manner that, when an electrically-conductive contacting object comes into proximity to any of the first electrodes 2B1 and the second electrodes 2B2, capacitive coupling occurs between the contacting object and the electrodes. The touch screen 102B is configured so that the detected value changes at the detection point 60 at which the capacitive coupling has occurred between the contacting object and the electrodes. In the example illustrated in FIG. 21, on the touch screen 102B, the detected value at the detection point 60 near a contact point 70 of the contacting object is larger than the detected values at the other detection points 60. Thus, the smartphone 100 is able to detect the contact point 70 of the contacting object on the touch screen 102B, on the basis of the detected value at the detection point 60 that has changed.

When the smartphone 100 is completely immersed in water, because the entire surface of the touch screen 102B is in contact with water, the detected values at all of the plurality of detection points 60 change. In other words, the detected values on the touch screen 102B in the water are larger than those in the air. The smartphone 100 is able to determine whether the device is immersed in water, on the basis of the detection results at the plurality of detection points 60. More specifically, the smartphone 100 is able to determine that the device is immersed in water, when the detected values at all of the plurality of detection points 60 satisfy the determination condition.

The setting data 91Z stored in the storage 109 includes condition data used for determining whether or not the smartphone 100 (the device) is immersed in water, on the basis of detection results obtained by the touch screen 102B. The condition data may include a condition used for determining that the smartphone 100 is out of the water.

The condition data includes the determination condition used for determining whether the device is immersed in water. The determination condition includes a condition corresponding to predetermined one or more of the detection points 60 used for the determining process. The determination condition includes, for example, a detection threshold value corresponding to the predetermined detection points 60, a detection range, a range of detected contact points 70, and the like. The predetermined detection points 60 may be all of the plurality of detection points 60. The predetermined detection points 60 may be a part of the plurality of detection points 60. The determination condition may include a range of changes, a threshold value, and the like per predetermined time period.

In the present aspect of the embodiments, the determination condition includes a condition used for determining that the device is immersed in water when contact is detected at the plurality of detection points 60. For example, when the device is in water, contact is detected at all of the plurality of detection points 60 on the touch screen 102B. In contrast, when water is on the surface of the device without the device being submerged in water, contact is detected at a part of the plurality of detection points 60 on the touch screen 102B. The determination condition includes a condition used for determining that the device is not immersed in water when no contact is detected at a part of the plurality of detection points 60.

In the following sections, an example will be explained in which the condition data includes the detection points 60 used by the smartphone 100 for the determining process and an output range of the output values from the detection points 60.

After having executed the atmospheric pressure application 91B, the smartphone 100 logs the value of the atmospheric pressure detected by the atmospheric pressure sensor 119 into the atmospheric pressure data 91X stored in the storage 109. The smartphone 100 may execute the atmospheric pressure application 91B while the value of the atmospheric pressure detected by the atmospheric pressure sensor 119 is logged in the atmospheric pressure data 91X stored in the storage 109. The smartphone 100 determines whether the device is immersed in water, on the basis of the detection results obtained by the touch screen 102B and the condition data.

When it is determined that the device is not immersed in water, the smartphone 100 inputs the detected value of the atmospheric pressure into the atmospheric pressure application 91B being executed thereby. The smartphone 100 displays the value of the atmospheric pressure and a value of the altitude on the display 102A, by employing the atmospheric pressure application 91B.

When it is determined that the device is immersed in water, the smartphone 100 inputs predetermined data into the atmospheric pressure application 91B being executed thereby. Examples of the predetermined data include, but are not limited to, data indicating that the device is immersed in water, data indicating that a water pressure value is exhibited, and data indicating that an atmospheric pressure value is not exhibited. In the present aspect of the embodiments, an example will be explained in which the predetermined data is data indicating that the device is immersed in water. The smartphone 100 displays information indicating that the device is immersed in water and the value of the atmospheric pressure on the display 102A, by employing the atmospheric pressure application 91B.

The smartphone 100 according to the embodiments is able to determine that the device is immersed in water by using the touch screen 102B. When it is determined that the device is immersed in water, the smartphone 100 is able to input the value of the atmospheric pressure into the atmospheric pressure application 91B making use thereof. The smartphone 100 is able to display for the user, in a recognizable manner, whether the value of the atmospheric pressure is a value detected at the time of being immersed in water.

Figure 22:
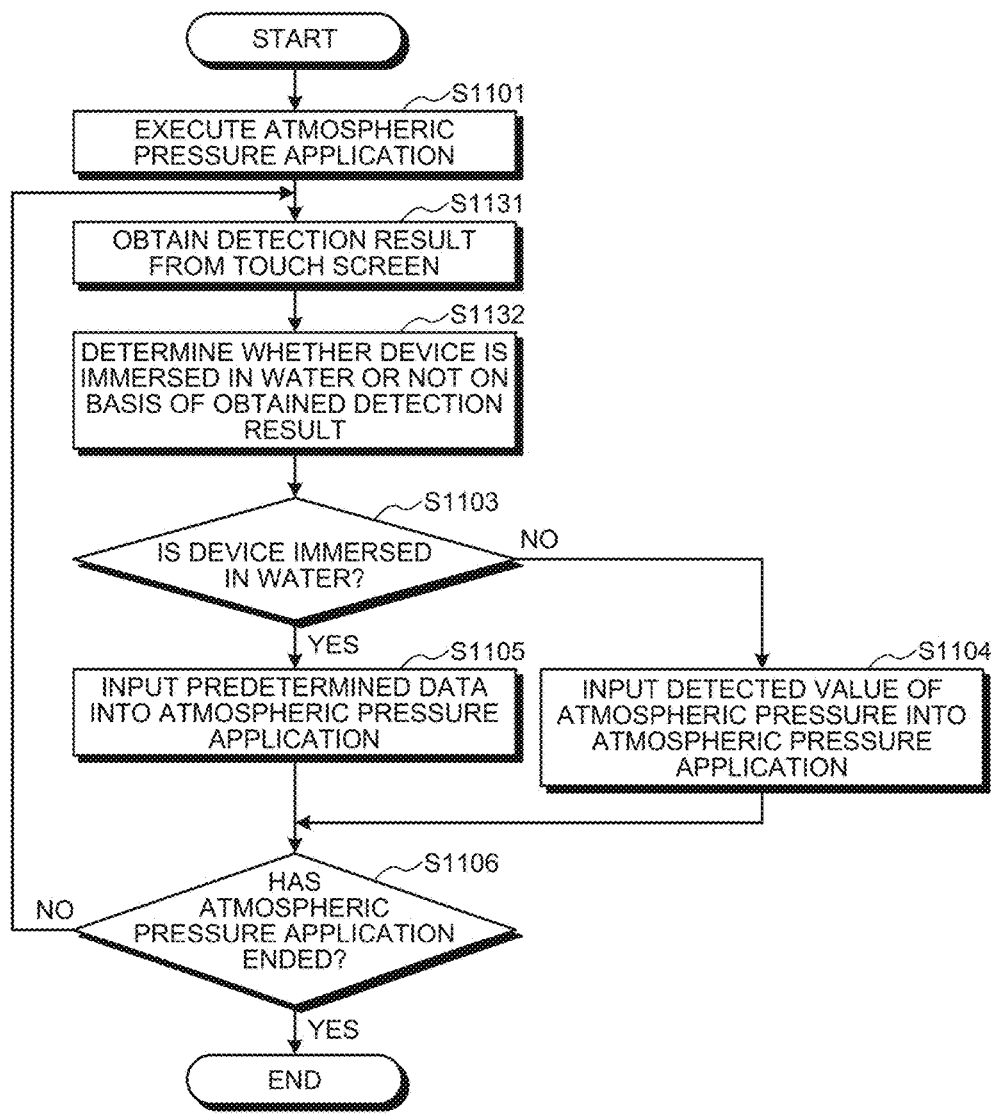
FIG. 22 is a flowchart illustrating a processing procedure in an example of control by a smartphone according to some embodiments.

A processing procedure of the control by the smartphone 100 according to some embodiments will be explained, with reference to FIG. 22. FIG. 22 is a flowchart illustrating a processing procedure in an example of the control by the smartphone 100 according to the embodiments. The processing procedure illustrated in FIG. 22 is realized as a result of executing the control program 91A by the controller 110. The processing procedure illustrated in FIG. 22 is performed by the controller 110 when the user requests for executing the atmospheric pressure application 91B.

In the example illustrated in FIG. 22, the processes at Step S1101 and at Steps S1103 to S1106 are the same as the processes at Step S1101 and at Steps S1103 to S1106 in FIG. 16. Thus, only the different parts in the example illustrated in FIG. 22 will be explained, and the explanation for the same parts will be omitted.

When the atmospheric pressure application 91B is executed at Step S1101, the controller 110 obtains a detection result from the touch screen 102B at Step S1131. More specifically, the controller 110 scans the first electrodes 2B1 and the second electrodes 2B2 of the touch screen 102B. The controller 110 is able to obtain the output values from all of the plurality of detection points 60, as the detection result. The controller 110 may obtain a detection result indicating one or more of the detection points 60 at which the output values changed and the output values thereof.

At Step S1132, the controller 110 determines whether the device is immersed in water, on the basis of the detection result obtained at Step S1131. More specifically, when the output values from the detection points 60 designated by the determination condition are within the output range indicated in the determination condition, the controller 110 determines that the device is immersed in water. When the output values from the detection points 60 designated by the determination condition are not within the output range indicated in the determination condition, the controller 110 determines that the device is not immersed in water. When no contact is detected at a part of the plurality of detection points 60, the controller 110 determines that the device is not immersed in water.

When it is determined that the device is not immersed in water at Step S1132 (No at Step S1103), the controller 110 proceeds to Step S1104. At Step S1104, the controller 110 inputs the detected value of the atmospheric pressure into the atmospheric pressure application 91B and subsequently proceeds to Step S1106 (explained later).

When it is determined that the device is immersed in water at Step S1132 (Yes at Step S1103), the controller 110 proceeds to Step S1105. At Step S1105, the controller 110 inputs the predetermined data into the atmospheric pressure application 91B and subsequently proceeds to Step S1106.

At Step S1106, the controller 110 determines whether the atmospheric pressure application 91B has ended. When it is determined that the atmospheric pressure application 91B has not ended (No at Step S1106), the controller 110 returns the process to Step S1131 and performs the process again. When it is determined that the atmospheric pressure application 91B has ended (Yes at Step S1106), the controller 110 ends the processing procedure illustrated in FIG. 22.

As for the processing procedure of the control by the smartphone 100 in relation to the atmospheric pressure application 91B according to the embodiments, the processing procedure illustrated in FIG. 17 that has already been explained is applicable as it is.

Yet another aspect of the smartphone 100 according to the embodiments will be explained below. The smartphone 100 according to said yet another aspect of the embodiments has the same configuration as that of the smartphone 100 illustrated in FIGS. 11 to 14, except that the control program 91A has a different function. Thus, said yet another aspect of the embodiments will be explained below by using the smartphone 100 as an example.

After having executed the atmospheric pressure application 91B, the smartphone 100 logs the value of the atmospheric pressure detected by the atmospheric pressure sensor 119 into the atmospheric pressure data 91X stored in the storage 109. The smartphone 100 determines whether the device is immersed in water, on the basis of the detection result obtained by the touch screen 102B and the condition data.

When it is determined that the device is not immersed in water, the smartphone 100 inputs the detected value of the atmospheric pressure into the atmospheric pressure application 91B being executed thereby. The smartphone 100 displays the value of the atmospheric pressure and a value of the altitude on the display 102A, by employing the atmospheric pressure application 91B.

When it is determined that the device is immersed in water, the smartphone 100 discontinues using the detected value of the atmospheric pressure in the atmospheric pressure application 91B being executed thereby. The smartphone 100 discontinues updating the value of the atmospheric pressure and the value of the altitude that are displayed on the display 102A, by employing the atmospheric pressure application 91B. As a result, the smartphone 100 is able to avoid the situation where a value that is not a value of the atmospheric pressure (i.e., a value of the water pressure) is displayed, when the detected value of the atmospheric pressure has drastically changed.

Figure 23:
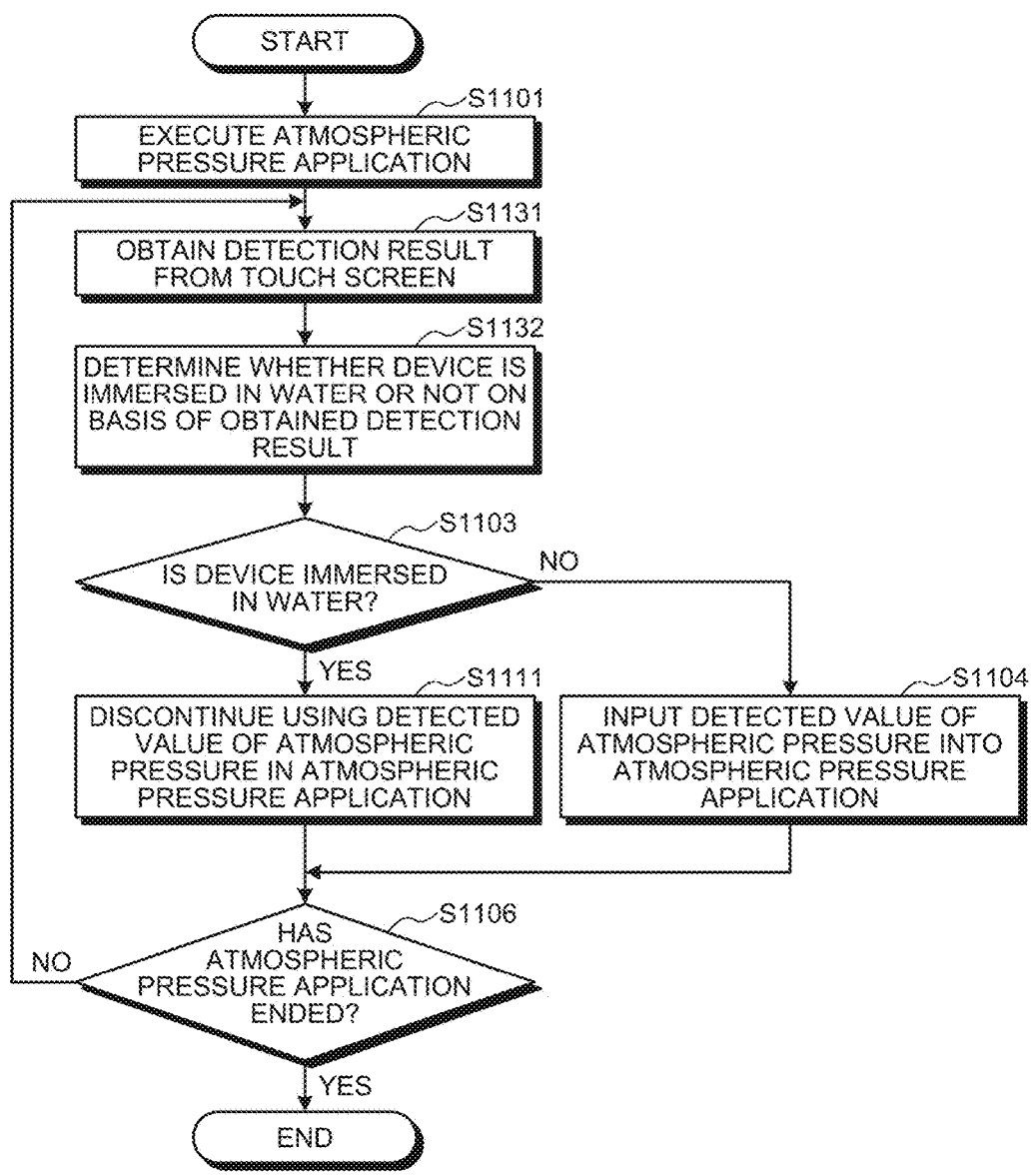
FIG. 23 is a flowchart illustrating a processing procedure in an example of control by a smartphone according to yet another aspect of the embodiments.

A processing procedure of the control by the smartphone 100 according to said yet another aspect of the embodiments will be explained, with reference to FIG. 23. FIG. 23 is a flowchart illustrating a processing procedure in an example of the control by the smartphone 100 according to said yet another aspect of the embodiments. The processing procedure illustrated in FIG. 23 is realized as a result of executing the control program 91A by the controller 110. The processing procedure illustrated in FIG. 23 is executed by the controller 110 when the user requests for executing the atmospheric pressure application 91B.

In the example illustrated in FIG. 23, the processes at Steps S1101, S1103 to S1104, S1106, and S1131 to S1132 are the same as the processes at Steps S1101, S1103 to S1104, S1106, and S1131 to S1132 in FIG. 22. Thus, only the different parts in the example illustrated FIG. 23 will be explained, and the explanation for the same parts will be omitted.

When it is determined that the device is immersed in water at Step S1132 (Yes at Step S1103), the controller 110 proceeds to Step S1111. At Step S1111, the controller 110 discontinues using the detected value of the atmospheric pressure in the atmospheric pressure application 91B. In other words, the controller 110 does not input the value of the atmospheric pressure into the atmospheric pressure application 91B. The controller 110 proceeds to Step S1106 (which has already been explained). When it is determined that the atmospheric pressure application 91B has ended (Yes at Step S1106), the controller 110 ends the processing procedure illustrated in FIG. 23.

As for the processing procedure of the control exercised by the smartphone 100 in relation to the atmospheric pressure application 91B according to said yet another aspect of the embodiments, the processing procedure illustrated in FIG. 19 that has already been explained is applicable as it is.

Yet another aspect of the smartphone 100 according to the embodiments will be explained below. The smartphone 100 according to said yet another aspect of the embodiments has the same configuration as that of the smartphone 100 illustrated in FIGS. 11 to 14, except that the control program 91A has a different function. Thus, said yet another aspect of the embodiments will be explained below by using the smartphone 100 as an example.

After having executed the atmospheric pressure application 91B, the smartphone 100 logs the value of the atmospheric pressure detected by the atmospheric pressure sensor 119 into the atmospheric pressure data 91X stored in the storage 109. The smartphone 100 determines whether the device is immersed in water, on the basis of the detection result obtained by the touch screen 102B and the condition data.

When it is determined that the device is not immersed in water, the smartphone 100 inputs the detected value of the atmospheric pressure into the atmospheric pressure application 91B being executed thereby. The smartphone 100 displays the value of the atmospheric pressure and a value of the altitude on the display 102A, by employing the atmospheric pressure application 91B.

When it is determined that the device is immersed in water, the smartphone 100 inputs the value of the atmospheric pressure observed before having been immersed in water into the atmospheric pressure application 91B. The smartphone 100 displays the value of the atmospheric pressure observed before having been immersed in water and a corresponding value of the altitude on the display 102A, by employing the atmospheric pressure application 91B being executed thereby. As a result, the smartphone 100 is able to avoid the situation where a value that is not a value of the atmospheric pressure (i.e., a value of the water pressure) is displayed, when the detected value of the atmospheric pressure has drastically changed.

Figure 24:
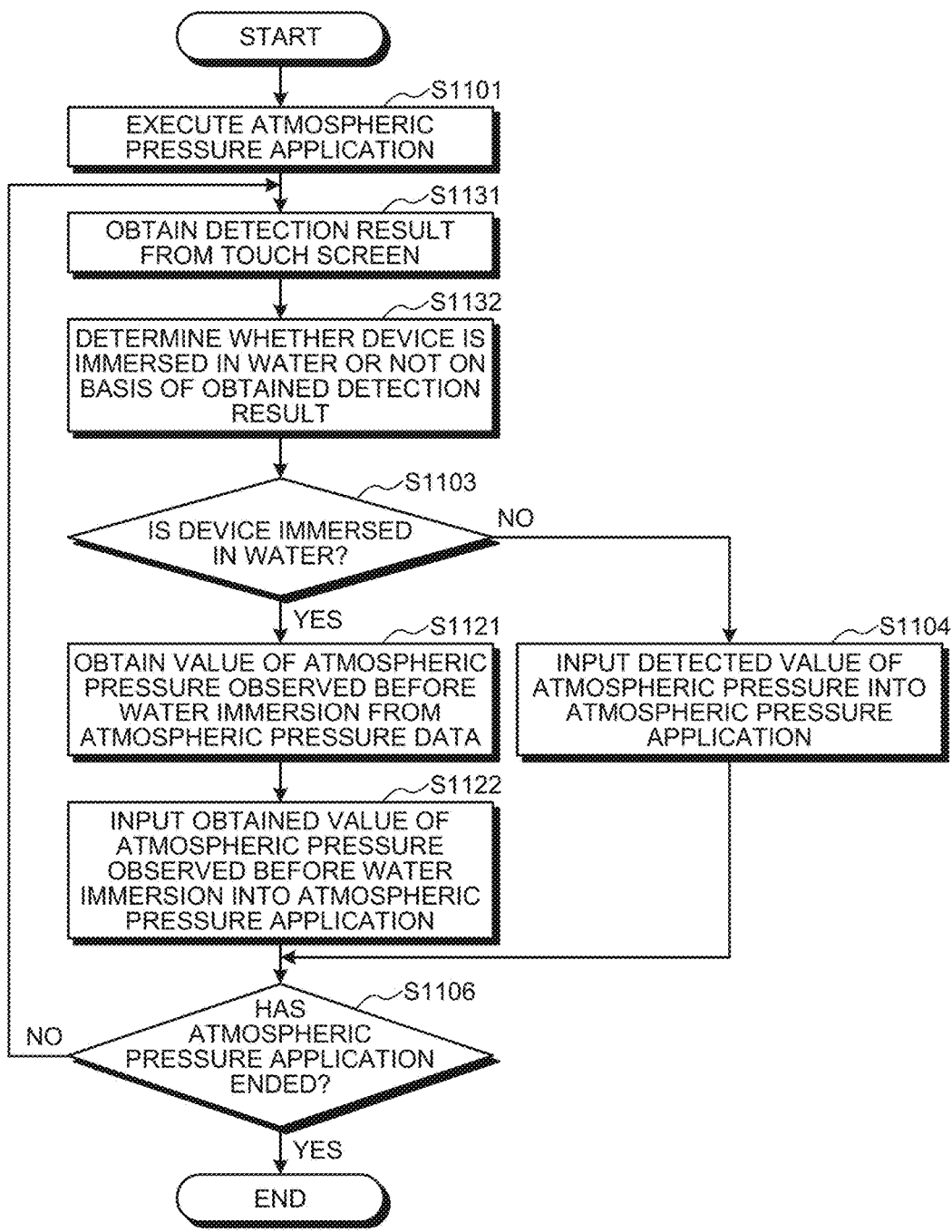
FIG. 24 is a flowchart illustrating a processing procedure in an example of control by the smartphone according to said yet another aspect of the embodiments.

A processing procedure of the control by the smartphone 100 according to said yet another aspect of the embodiments will be explained, with reference to FIG. 24. FIG. 24 is a flowchart illustrating a processing procedure in an example of the control by the smartphone 100 according to said yet another aspect of the embodiments. The processing procedure illustrated in FIG. 24 is realized as a result of executing the control program 91A by the controller 110. The processing procedure illustrated in FIG. 24 is executed by the controller 110 when the user requests for executing the atmospheric pressure application 91B.

In the example illustrated in FIG. 24, the processes at Steps S1101, S1103 to S1104, S1106, and S1131 to S1132 are the same as the processes at Steps S1101, S1103 to S1104, S1106, and S1131 to S1132 in FIG. 22. Thus, only the different parts in the example illustrated FIG. 24 will be explained, and the explanation for the same parts will be omitted.

When it is determined that the device is immersed in water at Step S1132 (Yes at Step S1103), the controller 110 proceeds to Step S1121. At Step S1121, the controller 110 obtains the value of the atmospheric pressure observed before having been immersed in water from the atmospheric pressure data 91X stored in the storage 109. More specifically, the controller 110 obtains the value of the atmospheric pressure observed before the drastic change has occurred in the value of the atmospheric pressure, from the atmospheric pressure data 91X. At Step S1122, the controller 110 inputs the obtained value of the atmospheric pressure observed before having been immersed in water into the atmospheric pressure application 91B. The controller 110 proceeds to Step S1106 (which has already been explained). When it is determined that the atmospheric pressure application 91B has ended (Yes at Step S1106), the controller 110 ends the processing procedure illustrated in FIG. 24.

As for the processing procedure of the control by the smartphone 100 in relation to the atmospheric pressure application 91B according to said yet another aspect of the embodiments, the processing procedure illustrated in FIG. 19 that has already been explained is applicable as it is.

The embodiments disclosed herein may be modified without departing from the gist and the scope of the embodiments. Further, any of the embodiments disclosed herein may be combined as appropriate. For example, the embodiments described above may be modified as described below.

For example, any of the programs illustrated in FIG. 14 may be divided into a plurality of modules and may be joined with any other program.

In the aspect of the embodiments described above, the example is explained in which the smartphone 100 determines whether the device is immersed in water. However, the embodiments are not limited to this example. For instance, the smartphone 100 is also capable of calculating the water depth.

The smartphone 100 stores a value of the atmospheric pressure observed just before determining that the device is immersed in water, into the atmospheric pressure data 91X stored in the storage 109. The smartphone 100 calculates the water depth by applying the value of the atmospheric pressure observed just before having been immersed in water and a value of the atmospheric pressure detected in the water (the water pressure) to a calculation program.

For example, the smartphone 100 uses the premise that the detected value of the atmospheric pressure changes by 150 hPa when the water depth changes by 1.5 meters [m]. In that situation, in the smartphone 100, when the atmospheric pressure (a reference atmospheric pressure) observed just before determining that the device is immersed in water is 1,000 hPa, the value detected by the atmospheric pressure sensor 119 at a water depth of 1.5 m is 1,150 hPa. As another example, in the smartphone 100, when the atmospheric pressure (a reference atmospheric pressure) observed just before determining that the device is immersed in water is 500 hPa, the value detected by the atmospheric pressure sensor 119 at a water depth of 1.5 m is 650 hPa. Examples of the calculation program include, but are not limited to, a program that calculates the water depth on the basis of a relationship between reference atmospheric pressure values, water pressure values, and water depth values. The smartphone 100 has the calculation program stored in the storage 109.

After it is determined that the device is immersed in water, the smartphone 100 calculates the water depth, by applying the detected value (the value of the water pressure) detected by the atmospheric pressure sensor 119 and the value of the atmospheric pressure observed just before determining that the device is immersed in water, to the calculation program. The smartphone 100 displays the calculated water depth on the display 102A. The smartphone 100 stores the calculated water depth into the storage 109 in association with the atmospheric pressure data 91X.

For example, when the user shakes the device underwater, in the smartphone 100, the detected value detected by the atmospheric pressure sensor 119 is larger than the value detected when the device is not shaken. In that situation, the smartphone 100 detects that the device is shaken on the basis of a detection result obtained by the acceleration sensor 115 and corrects the detected value obtained by the atmospheric pressure sensor 119 by using a predetermined correction value. Examples of the predetermined correction value include, but are not limited to, one or more values calculated from results of an experiment.

In the aspect of the embodiments described above, the example is explained in which the smartphone 100 determines whether the device is immersed in water on the basis of either the detection result obtained by the atmospheric pressure sensor 119 or the detection result obtained by the touch screen 102B; however, the embodiments are not limited to this example. For instance, the smartphone 100 may determine whether the device is immersed in water, on the basis of both of the detection results obtained by the atmospheric pressure sensor 119 and the touch screen 102B.

In the aspect of the embodiments described above, the example is explained in which, in the smartphone 100, the application using the value of the atmospheric pressure is the atmospheric pressure application 91B; however, the embodiments are not limited to this example. For instance, in the smartphone 100, the application using the value of the atmospheric pressure may be a calculation application that calculates the amount of energy consumed by the user, on the basis of the value of the atmospheric pressure.

For instance, the calculation application may be used, for example, for calculating the amount of energy consumed by the user. For example, the calculation application is able to provide a function for calculating the consumption amount of the user, by applying a traveling speed and altitude of the user, to a relational expression between the traveling speed (the number of steps) of the user and the amount of consumed energy. The amount of energy consumed by the user may be calculated while taking into consideration whether the device is immersed in water. For example, the calculation application may switch the relational expression used for calculating the amount of consumed energy, depending on whether the user is on the ground or in water, for the same number of steps of the user. The amount of energy consumed by the user may be calculated while taking into consideration environments of the user on the ground and in water. As the amount of consumed energy, for example, thermodynamic calories (cal) may be used as "a measurement for the amount of energy of substances ingested by a person or an animal, or the amount of energy consumed in the metabolism of a person or an animal", on the basis of the Japanese Measurement Act. However, the measurement for the amount of consumed energy is not limited to this example. It is also acceptable to adopt joules (J) on the basis of la Conference Generale Des Poids et Mesures (CGPM).

What can be calculated by the calculation application is not limited to the amount of energy consumed by the user. The calculation application may calculate an exercise amount of the user or the number of steps taken by the user when traveling by walking. The term "exercise" denotes a unit expressing an amount of physical activity. The exercise amount is represented by an amount of physical movements calculated by multiplying Metabolic Equivalents of Task (METs) by a time period during which the physical activity is carried out. MET is a unit expressing the intensity of physical activity. The intensity of physical activity varies for each type of physical activity. A MET value may be set for each of different traveling methods of the user, for example. MET may be used for calculating an amount of consumed energy, which is an activity factor indicating the amount of activity. A MET value is expressed as a ratio with respect to the intensity of physical activity observed when a person is at rest. For example, it is known that the state in which a person is sitting down and at rest corresponds to 1 MET, whereas normal walking corresponds to 3 METs. In other words, it means that the intensity of the physical activity during normal walking is three times higher than the intensity of the physical activity observed when the person is at rest.

In the aspect of the embodiments described above, the smartphone 100 is explained as an example of a mobile device including the atmospheric pressure sensor 119; however, the mobile device set forth in the accompanying claims is not limited to a smartphone. The mobile device set forth in the accompanying claims may be a mobile electronic device other than smartphones. Examples of the mobile electronic device include, but are not limited to, a mobile phone, a tablet, a mobile personal computer, a digital camera, a smartwatch, a head-mount display, a media player, an electronic book reader, a navigator, and a game machine.

Figure 25:
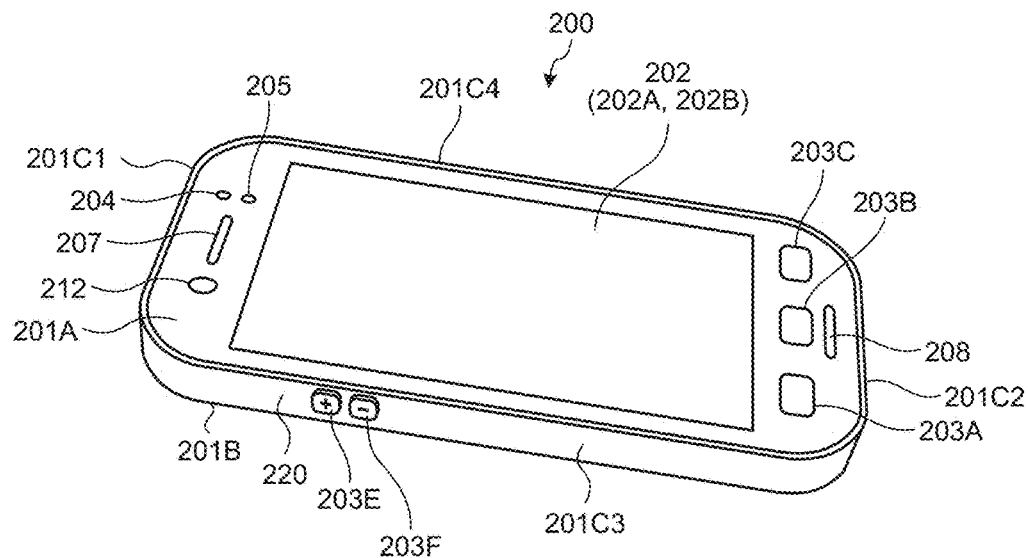
FIG. 25 is a perspective view of the smartphone according to some embodiments.
Figure 26:
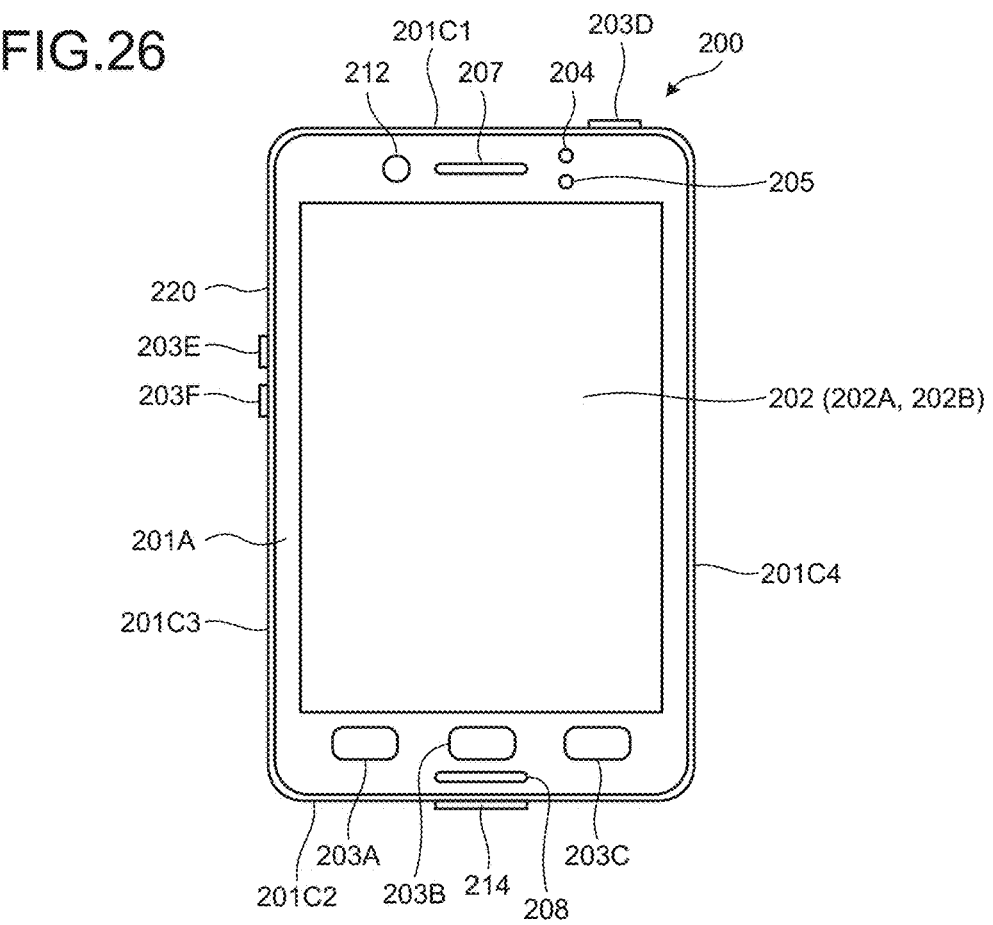
FIG. 26 is a front view of the smartphone.
Figure 27:
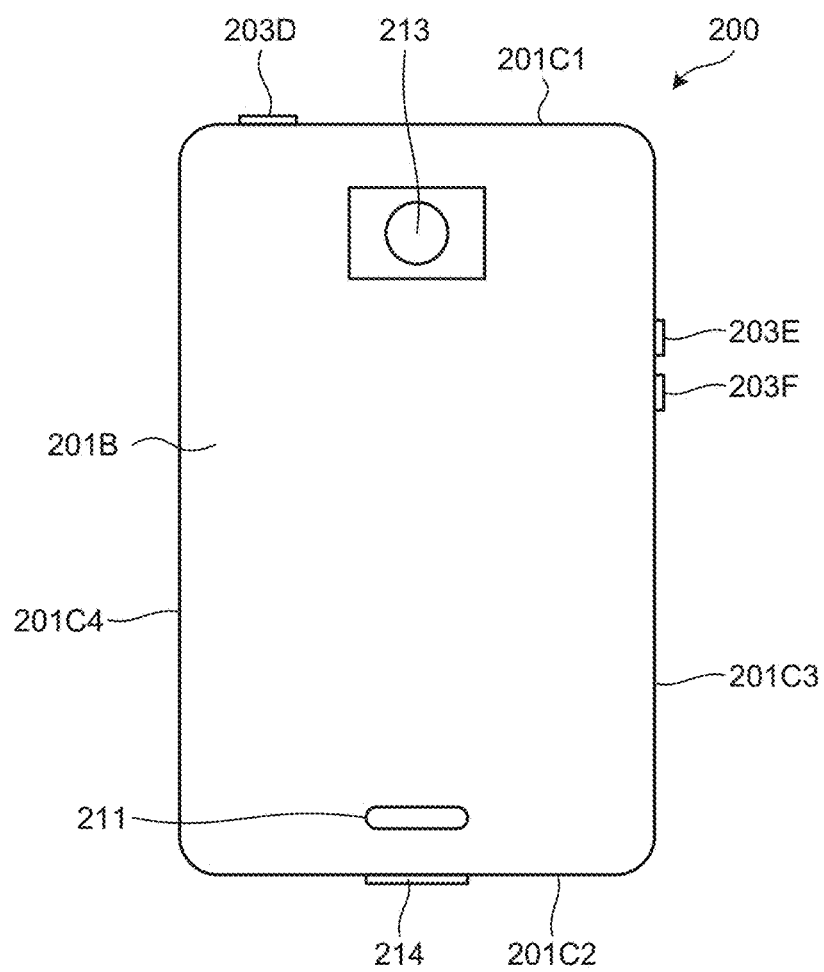
FIG. 27 is a rear view of the smartphone.

An overall configuration of a smartphone 200 according to some embodiments will be explained, with reference to FIGS. 25 to 27. As illustrated in FIGS. 25 to 27, the smartphone 200 includes a housing 220. The housing has a structure configured to prevent water from entering the inside thereof. The housing 220 has a structure provided with waterproof characteristics. More specifically, the housing 220 is configured so that a hole connecting the inside thereof to the outside thereof is provided with a mechanism that passes air but does not pass water. When the housing 220 is structured with a plurality of members, the housing 220 is provided with rubber sealing members or an adhesive positioned at the boundaries between the plurality of members. The adhesive adheres the plurality of members to one another. The boundaries of the members are hermetically sealed. The housing 220 includes a front face 201A, a back face 201B, and side faces 201C1 to 201C4. The front face 201A is a face positioned on the front of the housing 220. The back face 201B is a face positioned on the back of the housing 220. The side faces 201C1 to 201C4 are lateral faces connecting the front face 201A and the back face 201B together. In the following explanation, the side faces 201C1 to 201C4 may collectively be referred to as side faces 201C, without any particular one of the faces being specified.

The smartphone 200 has, on the front face 201A thereof, a touch screen display 202, buttons 203A to 203C, an illuminance sensor 204, a proximity sensor 205, a receiver 207, a microphone 208, and a camera 212. Further, the smartphone 200 has, on the back face 201B thereof, a speaker 211 and a camera 213. Also, the smartphone 200 has, on the side face 201C thereof, buttons 203D to 203F and a connector 214. In the following sections, the buttons 203A to 203F may collectively be referred to as buttons 203, without any particular one of the buttons being specified.

The touch screen display 202 includes a display 202A and a touch screen 202B. In the example illustrated in FIG. 25, the display 202A and the touch screen 202B each have a substantially rectangular shape; however, the shapes of the display 202A and the touch screen 202B are not limited to the shapes in the present example. The display 202A and the touch screen 202B may each have any shape such as a square or a circular shape. In the example illustrated in FIG. 25, the display 202A and the touch screen 202B are positioned on top of each other; however, the positions of the display 202A and the touch screen 202B are not limited to those in the present example. For instance, the display 202A and the touch screen 202B may be positioned side by side or may be positioned apart from each other. In the example illustrated in FIG. 25, the long sides of the display 202A extend along the long sides of the touch screen 202B, whereas the short sides of the display 202A extend along the short sides of the touch screen 202B; however, the manner in which the display 202A and the touch screen 202B are positioned on top of each other is not limited to the one in the present example. For instance, when the display 202A and the touch screen 202B are positioned on top of each other, one or more of the sides of the display 202A do not have to extend along any of the sides of the touch screen 202B.

The display 202A includes a display device configured with a Liquid Crystal Display (LCD), an Organic Electro-Luminescence Display (OELD), an Inorganic Electro-Luminescence Display (IELD), or the like. The display 202A displays objects such as text, an image, a symbol, a figure, and the like.

The touch screen 202B detects contact of a finger, a pen, a stylus pen, or the like with the touch screen 202B. The touch screen 202B is capable of detecting the positions in which a plurality of fingers, pens, stylus pens, or the like are in contact with the touch screen 202B. In the following explanation, the fingers, the pens, the stylus pens, or the like that come into contact with the touch screen 102B may be referred to as "contacting object" or "object that is in contact".

The detection method implemented by the touch screen 202B may be an arbitrary method, such as a capacitance method, a resistive film method, a surface acoustic wave method, an infra-red ray method, a load detection method, or the like. The following explanation is based on the assumption that, for the purpose of keeping the explanation simple, the user touches the touch screen 202B with his/her one or more fingers, to operate the smartphone 200.

The smartphone 200 discriminates the type of a gesture, on the basis of at least one selected from among: the contact detected by the touch screen 202B, the position in which the contact is detected, a change of the position in which the contact is detected, an interval with which contacting actions are detected, and the number of times contact is detected. The gesture denotes an operation performed on the touch screen 202B. Examples of the gesture that can be discriminated by the smartphone 200 include, but are not limited to, a touch, a long touch, a release, a swipe, a tap, a double tap, a long tap, a drag, a flick, a pinch-in, and a pinch-out.

Figure 28:
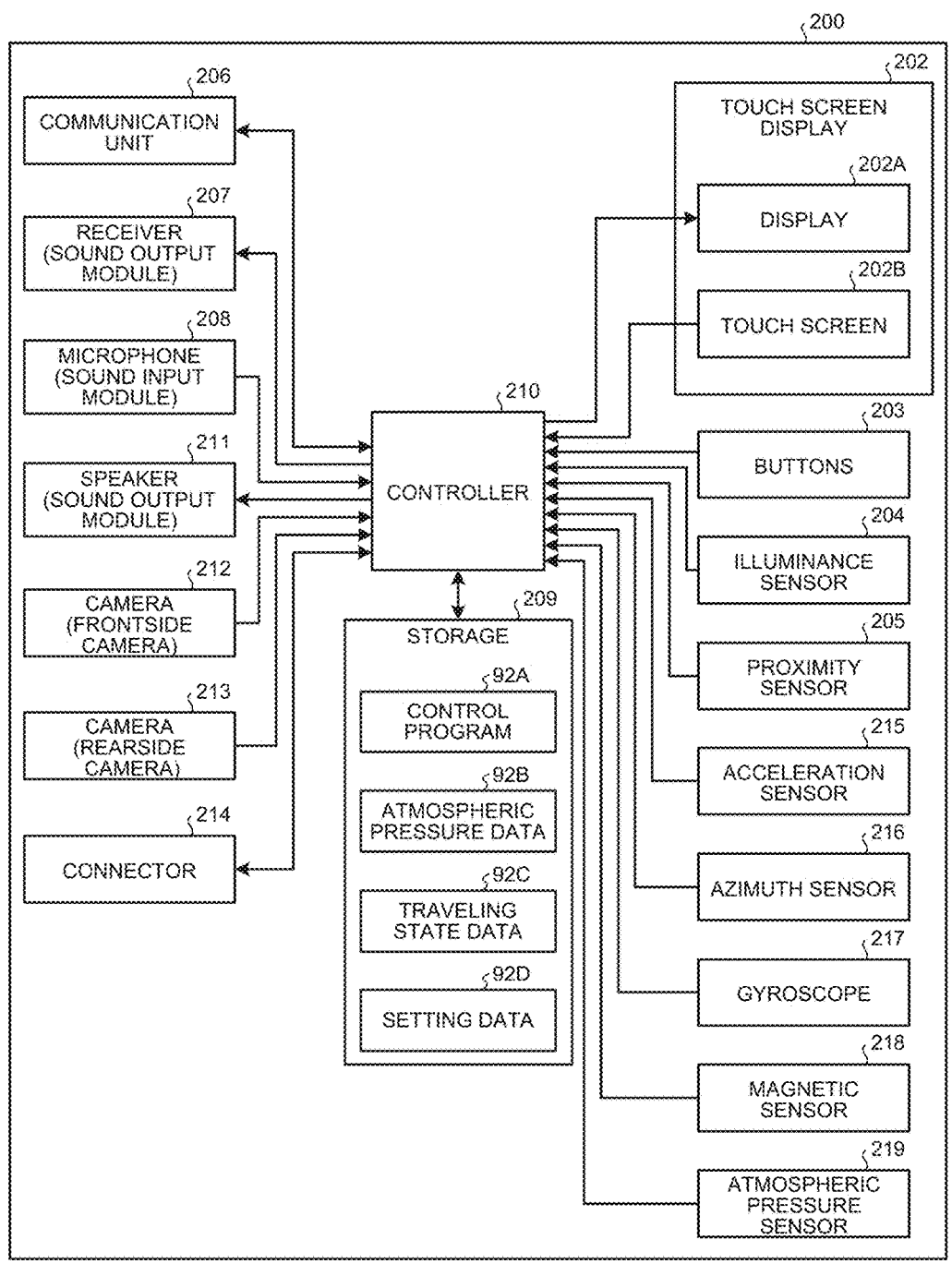
FIG. 28 is a block diagram of the smartphone.

FIG. 28 is a block diagram of the smartphone 200. The smartphone 200 includes the touch screen display 202, the buttons 203, the illuminance sensor 204, the proximity sensor 205, a communication unit 206, the receiver 207, the microphone 208, a storage 209, a controller 210, a speaker 211, the cameras 212 and 213, the connector 214, an acceleration sensor 215, an azimuth sensor 216, a gyroscope 217, a magnetic sensor 218, and an atmospheric pressure sensor 219.

The touch screen display 202 includes, as mentioned above, the display 202A and the touch screen 202B. The display 202A displays text, an image, a symbol, a shape, or the like. The touch screen 202B detects contact. The controller 210 detects a gesture performed on the smartphone 200. More specifically, the controller 210 detects an operation (the gesture) performed on the touch screen 202B (the touch screen display 202), in collaboration with the touch screen 202B.

The buttons 203 are operated by the user. The buttons 203 includes the buttons 203A to 203F. The controller 210 detects an operation performed on any of the buttons 203, in collaboration with the buttons 203. Examples of the operation performed on the buttons 203 include, but are not limited to, a click, a double click, a triple crick, a push, and a multi-push.

The buttons 203A to 203C may be, for example, a home button, a back button, and a menu button. The button 203D may be, for example, a power on/off button for the smartphone 200. The button 203D may also serve as a sleep/cancel-sleep button. The buttons 203E and 203F may be, for example, sound volume buttons.

The illuminance sensor 204 detects the illuminance of ambient light of the smartphone 200. The illuminance denotes intensity, brightness, or luminance of the light. For example, the illuminance sensor 204 is used for adjusting the luminance of the display 202A. The proximity sensor 205 detects the presence of an object positioned in proximity thereto, in a non-contact manner. The proximity sensor 205 detects presence of the object on the basis of a change in the magnetic field, a change in a return time of a reflective wave of an ultrasound wave, or the like. For example, the proximity sensor 205 detects that the touch screen display 202 is brought into proximity to a face of a person. The illuminance sensor 204 and the proximity sensor 205 may be configured as a single sensor. The illuminance sensor 204 may be used as a proximity sensor.

The communication unit 206 performs communication in a wireless manner. A communication method supported by the communication unit 206 is based on a wireless communication standard. Examples of the wireless communication standard include, but are not limited to, cellular phone communication standards of 2G, 3G, 4G, and the like. Examples of the cellular phone communication standards include, but are not limited to, Long Term Evolution (LTE), Wideband Code Division Multiple Access (W-CDMA), CDMA 2000, Personal Digital Cellular (PDC), Global System for Mobile Communications (GSM) (registered trademark), and Personal Handy-phone System (PHS). Examples of the wireless communication standard further include, but are not limited to, Worldwide Interoperability for Microwave Access (WiMAX) (registered trademark), IEEE 802.11, Bluetooth (registered trademark), Infrared Data Association (IrDA), and Near Field Communication (NFC). The communication unit 206 may support one or more of the communication standards listed above. The communication unit 206 may support wired communication. Examples of the wired communication include, but are not limited to, communication using Ethernet (registered trademark) and a fiber channel.

The receiver 207 and the speaker 211 are a sound output module. The receiver 207 and the speaker 211 each output a sound signal transmitted thereto from the controller 210, as a sound. For example, the receiver 207 may be used for outputting voice of a communication partner during a telephone call. For example, the speaker 211 may be used for outputting a ringtone and music. One of the receiver 207 and the speaker 211 may offer the functions of the other. The microphone 208 is a sound input module. The microphone 208 converts voice of the user or the like into a sound signal and transmits the sound signal to the controller 210.

The storage 209 stores therein programs and data. The storage 209 may also be used as a work area that temporarily stores therein processing results of the controller 210. The storage 209 may include an arbitrary non-transitory storage medium such as a semiconductor storage medium, a magnetic storage medium, or the like. The storage 209 may include a plurality of types of storage media. The storage 209 may include a combination made up of a portable storage medium such as a memory card, an optical disc, a magneto-optic disc, or the like and a storage medium reading device. The storage 209 may include a storage device used as a temporary storage region such as a Random Access Memory (RAM).

The programs stored in the storage 209 include an application executed in the foreground or in the background and a control program that assists operations of the application. For example, the application causes the display 202A to display a screen and causes the controller 210 to execute a process corresponding to a gesture detected via the touch screen 202B. The control program may be an OS, for example. The application and the control program may be installed in the storage 209 via a communication through the communication unit 206 or a non-transitory storage medium.

The storage 209 stores therein, for example, a control program 92A, atmospheric pressure data 92B, traveling state data 92C, and setting data 92D. The atmospheric pressure data 92B includes information about a relationship between detection results obtained by the atmospheric pressure sensor 219 and states of the smartphone 200. The atmospheric pressure data 92B stores therein a relationship between the detection results obtained by the atmospheric pressure sensor 219 and criteria used for determining whether or not the device is immersed in water, the relationship having been detected in advance by performing a test, a simulation, or the like. The traveling state data 92C includes information used for conjecturing a traveling method of the user. The traveling state data 92C stores therein a correspondence relationship between the detection results of the sensor and traveling methods, the correspondence relationship having been detected in advance by performing a test, a simulation, or the like. The setting data 92D includes information about various types of settings related to operations of the smartphone 200.

The control program 92A provides functions related to various types of control to bring the smartphone 200 into operation. For example, by controlling the communication unit 206, the receiver 207, the microphone 208, and the like, the control program 92A realizes a telephone call. The functions provided by the control program 92A include a function for various types of control such as changing information displayed on the display 202A in accordance with a gesture detected via the touch screen 202B. Any of the functions provided by the control program 92A may be used in combination with a function provided by another program such as an e-mail application.

The controller 210 is an arithmetic processing unit. Examples of the arithmetic processing unit include, but are not limited to, a Central Processing Unit (CPU), a System-on-a-Chip (SoC), a Micro Control Unit (MCU), and a Field Programmable Gate Array (FPGA). The controller 210 realizes various types of functions by integrally controlling operations of the smartphone 200.

More specifically, the controller 210 executes commands included in any of the programs stored in the storage 209, while referring to the data stored in the storage 209 as necessary. Further, the controller 210 controls functional modules according to the data and the commands and thereby realizes the various types of functions. Examples of the functional modules include, but are not limited to, at least one selected from among the display 202A, the communication unit 206, the receiver 207, and the speaker 211. The controller 210 may change the control in accordance with a detection result obtained by a sensor. Examples of the sensor include, but are not limited to, at least one selected from among the touch screen 202B, the buttons 203, the illuminance sensor 204, the proximity sensor 205, the microphone 208, the camera 212, the camera 213, the acceleration sensor 215, the azimuth sensor 216, the gyroscope 217, the magnetic sensor 218, and the atmospheric pressure sensor 219.

By executing the control program 92A, for example, the controller 210 performs the various types of control such as changing information displayed on the display 202A in accordance with a gesture detected via the touch screen 202B.

The camera 212 is a frontside camera that takes an image of an object facing the front face 201A. The camera 213 is a rearside camera that takes an image of an object facing the back face 201B.

The connector 214 is a terminal to which another device can be connected. The connector 214 may be a generally-used terminal such as a Universal Serial Bus (USB) terminal, a High-Definition Multimedia Interface (HDMI) (registered trademark) terminal, a Light Peak (Thunderbolt (registered trademark)) terminal, or an earphone/microphone connector. The connector 214 may be an exclusive-use terminal such as a dock connector. Examples of the device that can be connected to the connector 214 include, but are not limited to, an external storage device, a speaker, and a communication device.

The acceleration sensor 215 detects a direction and a magnitude of acceleration acting on the smartphone 200. The azimuth sensor 216 detects a direction of terrestrial magnetism. The gyroscope 217 detects an angle and an angular velocity of the smartphone 200. The magnetic sensor 218 detects magnetic forces in the surroundings of the smartphone 200. The atmospheric pressure sensor 219 detects atmospheric pressure (the barometric pressure) on the outside of the smartphone 200. The atmospheric pressure sensor 219 is positioned on the inside of the housing 220. The housing 220 is configured so that the atmospheric pressure on the inside thereof corresponds to the atmospheric pressure on the outside thereof by a hole that passes air but does not pass water. Because of this configuration, the atmospheric pressure sensor 219 is capable of detecting the atmospheric pressure on the outside of the smartphone 200 while being positioned on the inside thereof. Detection results obtained by the acceleration sensor 215, the azimuth sensor 216, and the gyroscope 217 are used in combination for detecting changes in position and attitude of the smartphone 200.

A part or all of the programs and the data stored in the storage 209 illustrated in FIG. 28 may be downloaded from another device through a communication performed by the communication unit 206. A part or all of the programs and the data stored in the storage 209 illustrated in FIG. 28 may be stored in a non-transitory storage medium from which a reading device included in the storage 209 is able to read information. A part or all of the programs and the data stored in the storage 209 illustrated in FIG. 28 may be stored in a non-transitory storage medium from which a reading device connected to the connector 214 is able to read information. Examples of the non-transitory storage medium include, but are not limited to, an optical disc such as a CD (registered trademark), a DVD (registered trademark), a Blu-ray (registered trademark) disc, or the like, a magneto-optical disc, a magnetic storage medium, a memory card, and a solid state storage medium.

The configuration of the smartphone 200 illustrated in FIG. 28 is merely an example and may be modified as appropriate without departing from the gist of the embodiments. For example, the number and the types of the buttons 203 are not limited to those in the example illustrated in FIG. 28. As buttons used for performing operations related to a screen, the smartphone 200 may include buttons in a ten-key formation or in a QWERTY formation, in place of the buttons 203A to 203C. For operations related to a screen, the smartphone 200 may include only one button or may include no button. In the example illustrated in FIG. 28, the smartphone 200 includes the two cameras; however, the smartphone 200 may include only one camera or may include no camera. In the example illustrated in FIG. 28, the smartphone 200 includes the three types of sensors to detect the position and the attitude thereof; however, the smartphone 200 does not have to include all of the three types of sensors. Alternatively, the smartphone 200 may include another type of sensor to detect one or both of the position and the attitude thereof.

Figure 29:
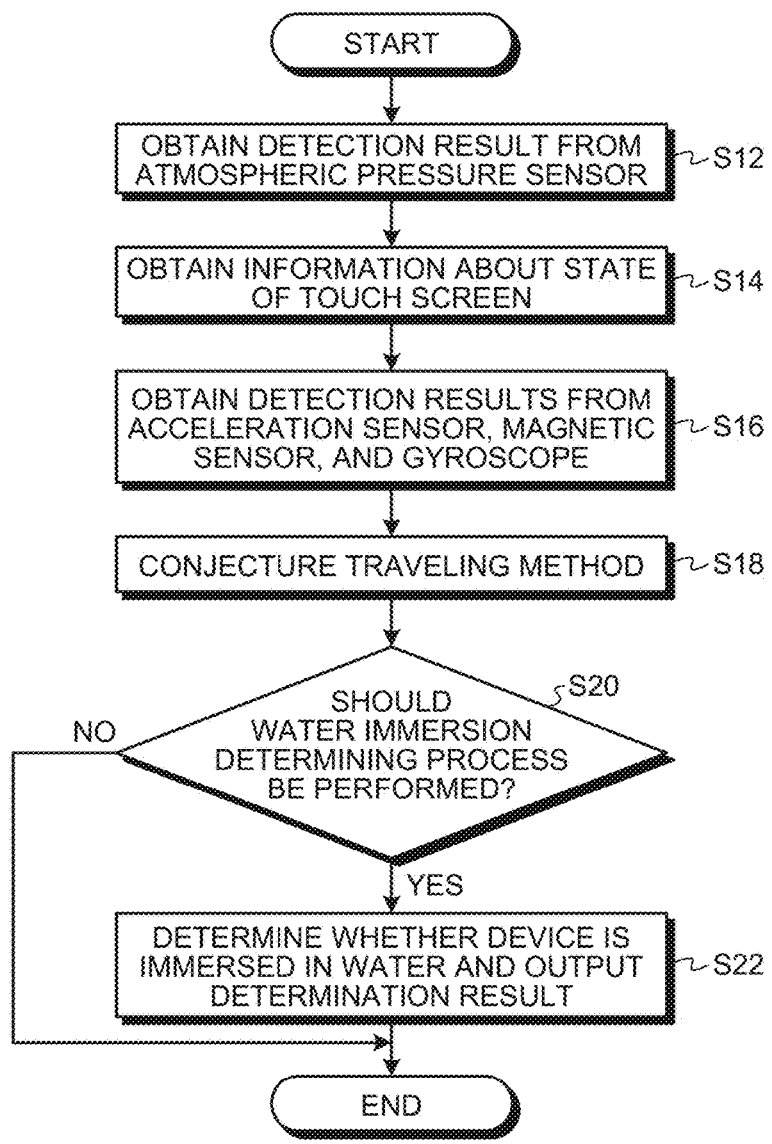
FIG. 29 is a flowchart illustrating an example of control by a smartphone according to some embodiments.
Figure 30:
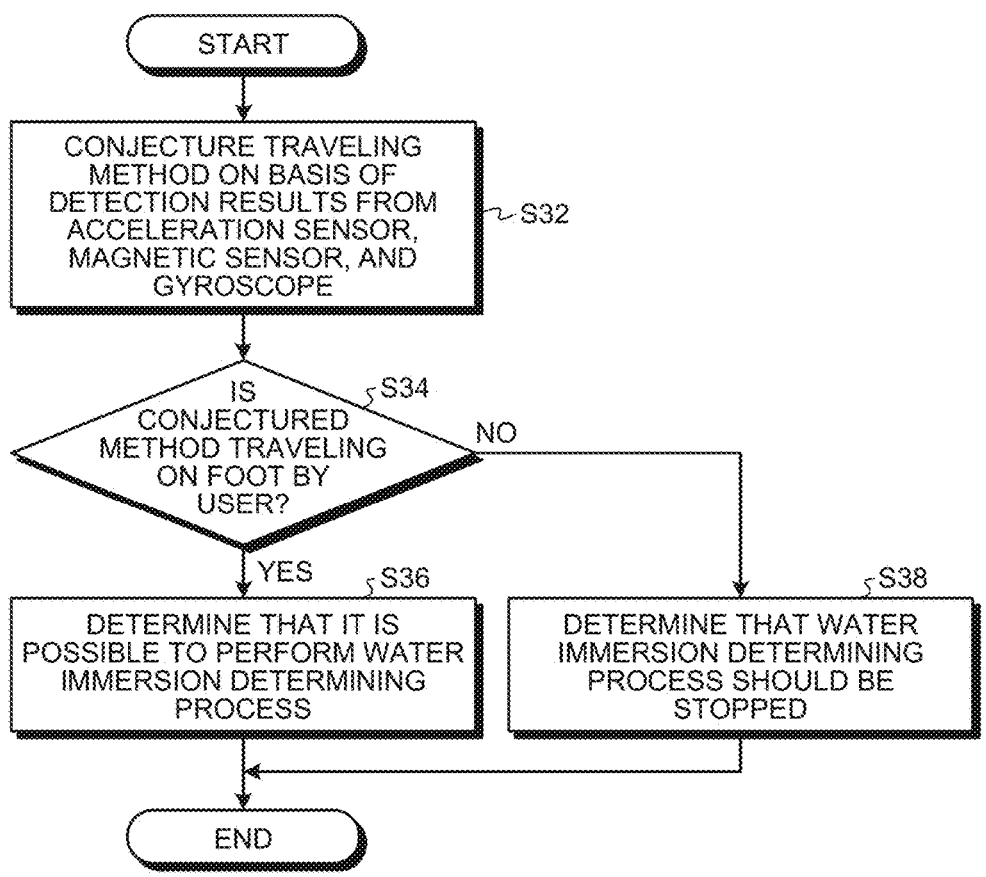
FIG. 30 is a flowchart illustrating an example of a traveling method conjecturing process performed under the control by the smartphone according to the embodiments.
Figure 31:
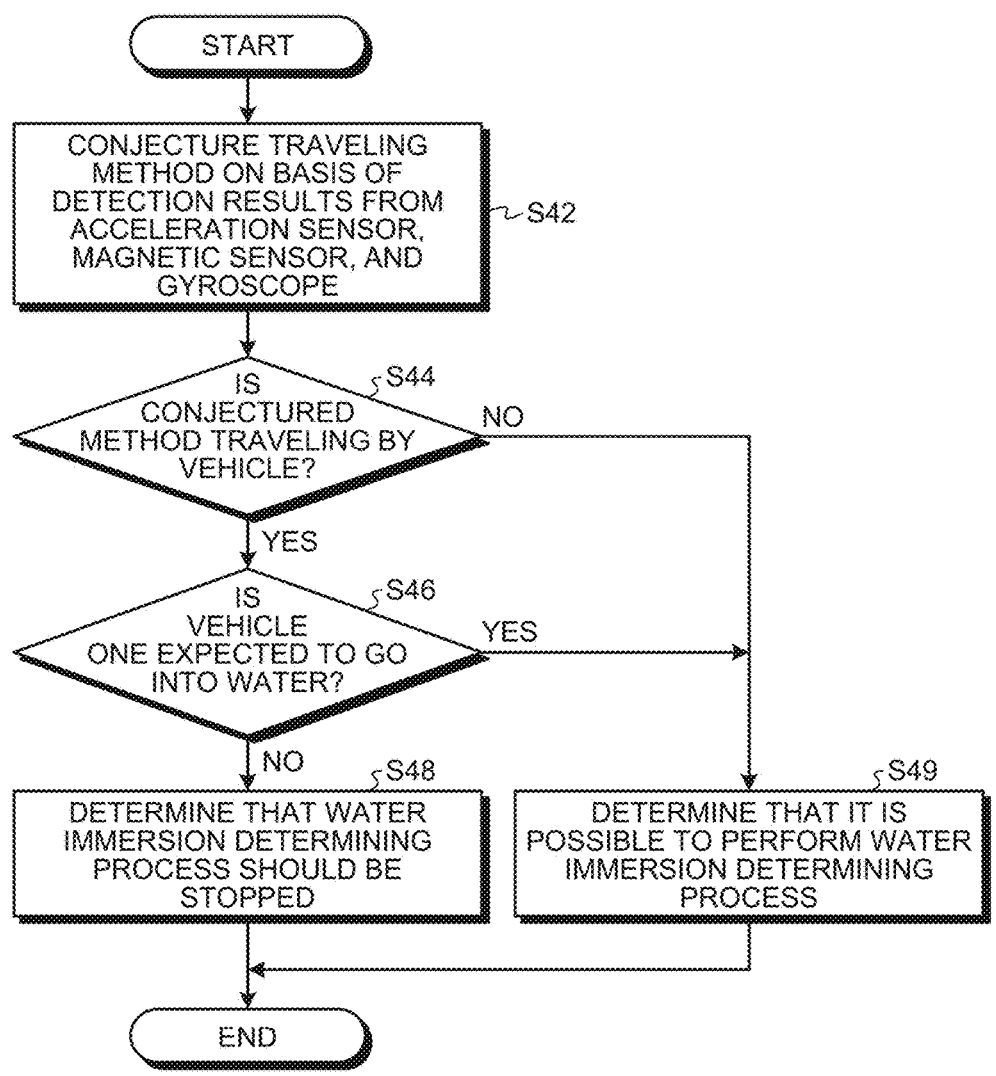
FIG. 31 is a flowchart illustrating another example of the traveling method conjecturing process performed under the control by the smartphone according to the embodiments.
Figure 32:
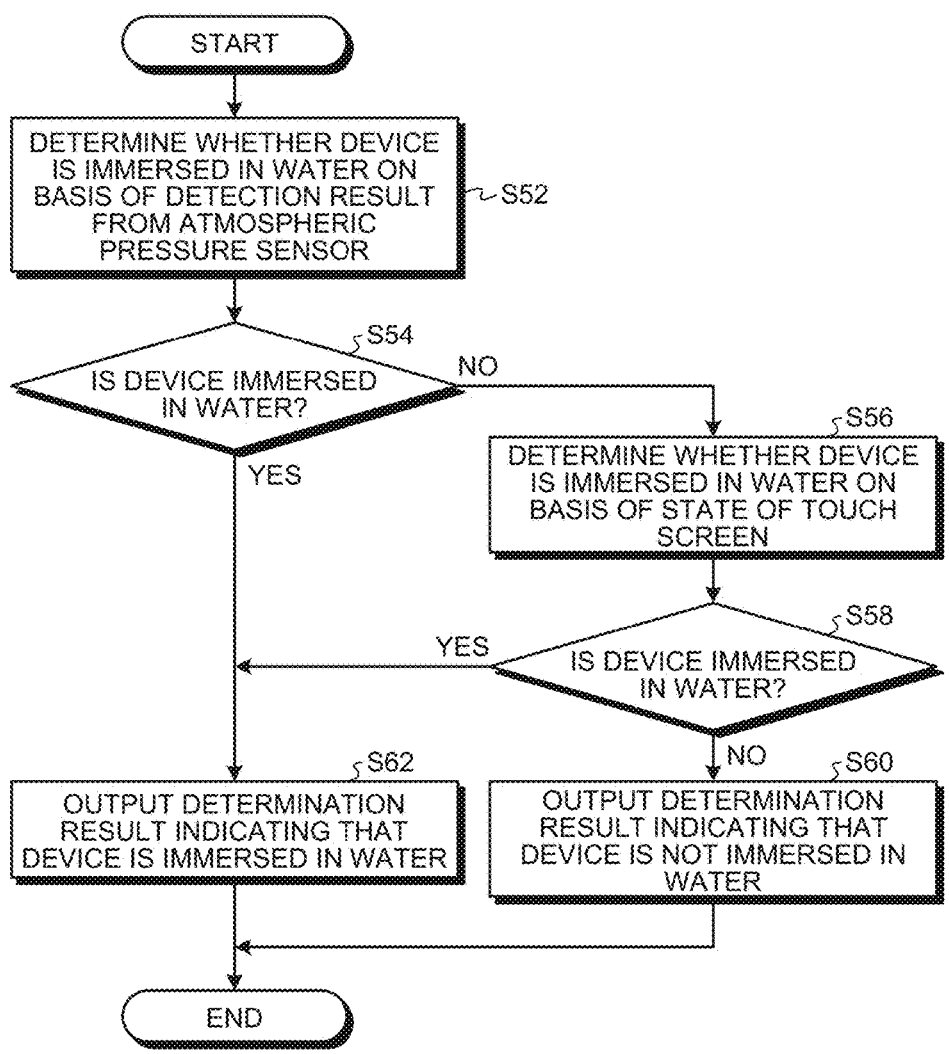
FIG. 32 is a flowchart illustrating an example of a process of determining whether the device is immersed in water performed under the control by the smartphone according to the embodiments.
Figure 33:
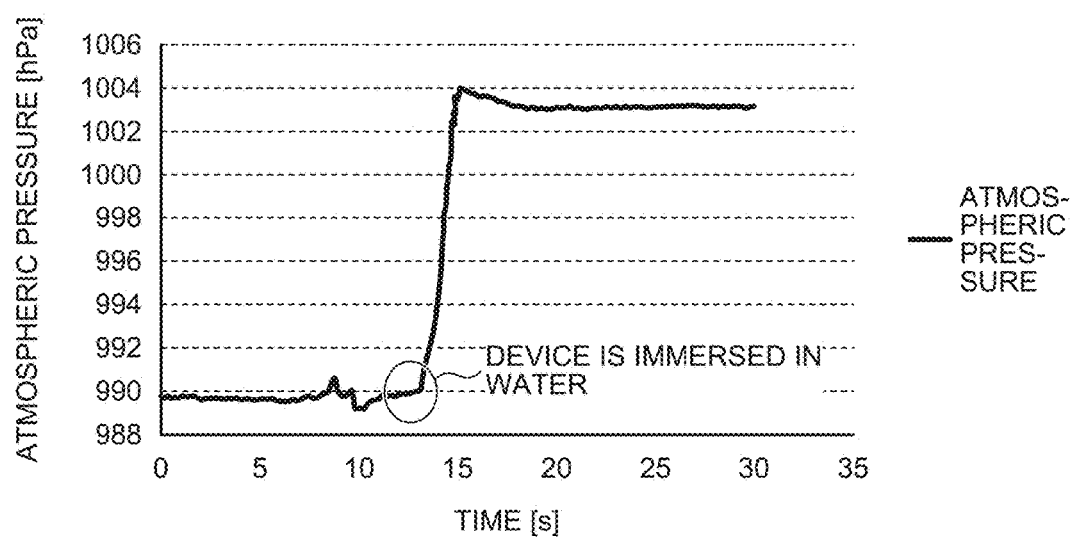
FIG. 33 is a chart illustrating an example of a detection result obtained by an atmospheric pressure sensor.
Figure 34:
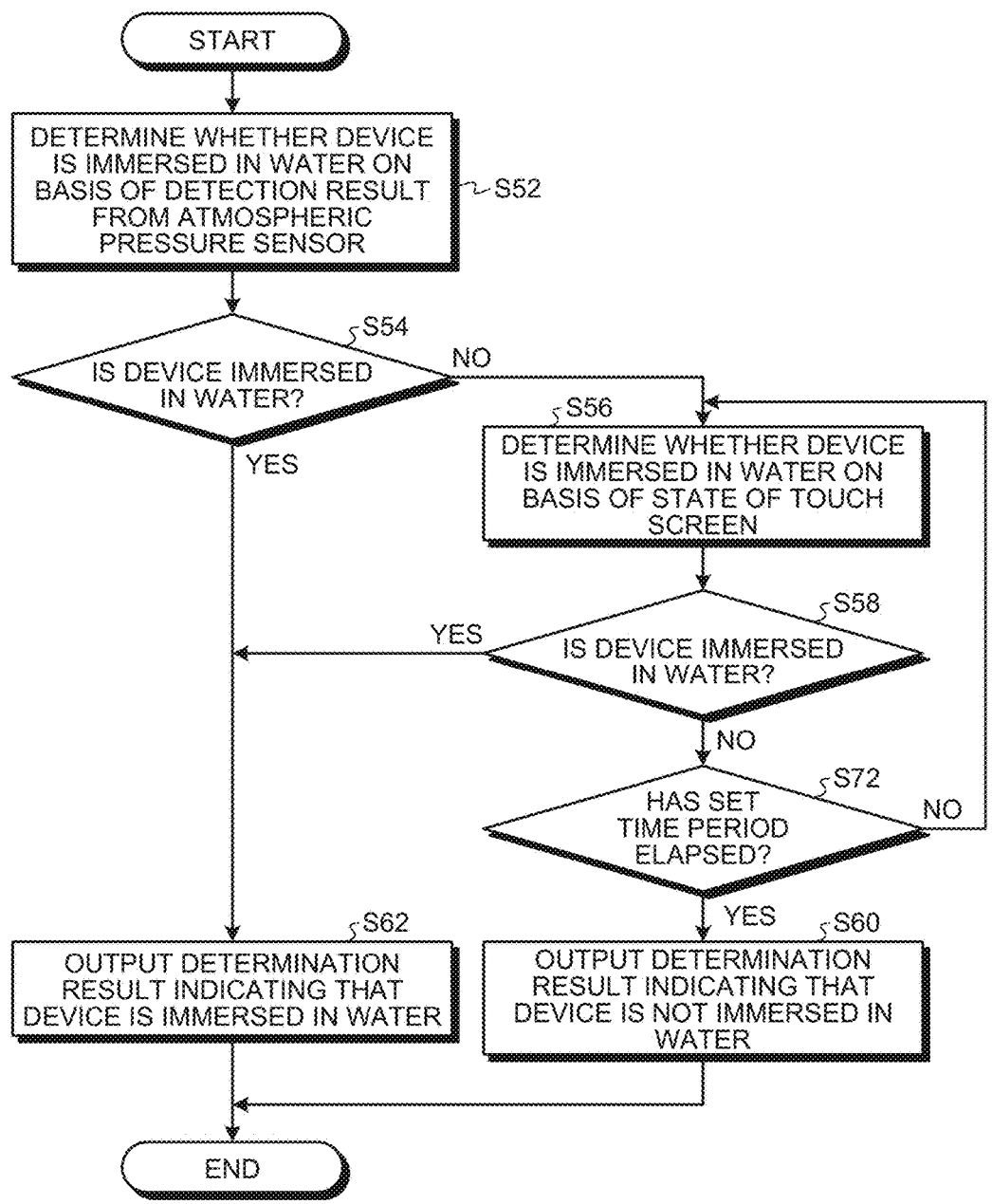
FIG. 34 is a flowchart illustrating another example of the process of determining whether the device is immersed in water performed under the control by the smartphone according to the embodiments.

Control by the smartphone 200 will be explained with reference to FIGS. 29 to 34. FIG. 29 is a flowchart illustrating an example of the control by a smartphone according to some embodiments. FIG. 30 is a flowchart illustrating an example of conjecturing a traveling method by the control of the smartphone according to the embodiments. FIG. 31 is a flowchart illustrating another example of conjecturing the traveling method by the control of the smartphone according to the embodiments. FIG. 32 is a flowchart illustrating an example of a process of determining whether the device is immersed in water by the control of the smartphone according to the embodiments. FIG. 33 is a chart illustrating an example of the detection result obtained by the atmospheric pressure sensor. FIG. 34 is a flowchart illustrating another example of the process of determining whether the device is immersed in water by the control of the smartphone according to the embodiments.

The smartphone 200 being immersed in water denotes situations in which the smartphone 200 is positioned below water surface. The smartphone 200 being immersed in water denotes situations in which the outside of the smartphone 200 is covered with water and situations in which the exterior of the housing 220 is filled with water.

First of all, an overall process performed by the smartphone 200 to determine whether the device is immersed in water will be explained, with reference to FIG. 29. The smartphone 200 is able to realize the functions illustrated in FIG. 29, by causing the controller 210 to execute the control program 92A stored in the storage 209. Further, the controller 210 may execute a processing procedure of any other function, in parallel with the processing procedure illustrated in FIG. 29.

At Step S12, the controller 210 included in the smartphone 200 at first obtains a detection result from the atmospheric pressure sensor 219. The controller 210 obtains a value of the atmospheric pressure from the detection result of the atmospheric pressure sensor 219. Subsequently, at Step S14, the controller 210 obtains information about the state of the touch screen 202B. The controller 210 obtains information about a contact state detected by the touch screen 202B. Subsequently, at Step S16, the controller 210 obtains detection results obtained by the acceleration sensor 215, the magnetic sensor 218, and the gyroscope 217. As the information used for conjecturing the traveling state, the controller 210 may obtain a detection result from a sensor other than the detection results obtained by the acceleration sensor 215, the magnetic sensor 218, and the gyroscope 217. The controller 210 may perform the processes at Steps S12, S14, and S16 in a different order or may perform any of these processes in parallel.

When having obtained various types of information in the processes at Steps S12, S14, and S16, the controller 210 conjectures the traveling method of the user at Step S18. The conjecture for the traveling method of the user will be explained later. When having conjectured the traveling method of the user, the controller 210 determines, at Step S20, whether the process (hereinafter, "water immersion determining process") of determining whether the device is immersed in water should be performed. The controller 210 determines whether or not the water immersion determining process should be performed on the basis of the traveling method of the user.

When it is determined that the water immersion determining process should not be performed (No at Step S20), the controller 210 ends the process. When it is determined that the water immersion determining process should be performed (Yes at Step S20), the controller 210 determines, at Step S22, whether the device is immersed in water, outputs a determination result, and ends the process. The method for outputting the determination result indicating whether the device is immersed in water is not particularly limited. The determination result may be output to another function or may be displayed on the display 202A.

The process at Step S18, more specifically, an example of the conjecture for the traveling method of the user, as well as an example of the process of determining whether the water immersion determining process should be performed will be explained, with reference to FIG. 30. At Step S32, the controller 210 conjectures the traveling method of the user, by using the detection results obtained by the acceleration sensor 215, the magnetic sensor 218, and the gyroscope 217. The controller 210 compares the detection results obtained by the acceleration sensor 215, the magnetic sensor 218, and the gyroscope 217 with information about patterns stored in the traveling state data 92C and conjectures the traveling method on the basis of a result of the comparison.

After having conjectured the traveling method of the user, the controller 210 determines, at Step S34, whether the conjectured traveling method is the traveling on foot by user. The traveling on foot by user denotes situations in which the user is traveling on his/her own while having the smartphone, i.e., situations in which the user is traveling without taking a vehicle that assists traveling. The traveling on foot by user includes at least one of walking (i.e., the user is walking) and running (i.e., the user is running). The traveling on foot by user also includes walking while using a walking stick, a push cart, or the like. When it is determined that the conjectured method is the traveling on foot by user (Yes at Step S34), the controller 210 determines at Step S36 that it is possible to perform the water immersion determining process. When it is determined that the conjectured method is not the traveling on foot by user (No at Step S34), the controller 210 determines, at Step S38, that the water immersion determining process should be stopped.

In the example illustrated in FIG. 30, whether the conjectured traveling method is the traveling on foot by user or not is used as the criterion for the determining process; however, the embodiments are not limited to this example. The process at Step S18, more specifically, another example of the traveling method conjecturing process, as well as another example of the process of determining whether the water immersion determining process should be performed, will be explained with reference to FIG. 31. The process illustrated in FIG. 31 may be performed in addition to the process illustrated in FIG. 30 or may be performed separately from the process illustrated in FIG. 30.

At Step S42, the controller 210 conjectures the traveling method, by using the detection results obtained by the acceleration sensor 215, the magnetic sensor 218, and the gyroscope 217. When having conjectured the traveling method, the controller 210 determines, at Step S44, whether the user is traveling by vehicle. Examples of the vehicle include, but are not limited to, at least one of a bicycle, a motorbike, an automobile, a train, an amphibious vehicle, a watercraft, and an airplane. When it is determined that the user is not traveling by vehicle (No at Step S44), the controller 210 proceeds to Step S49. When it is determined that the user is traveling by vehicle (Yes at Step S44), the controller 210 determines, at Step S46, whether the vehicle is one that is expected to go into water. Examples of vehicles expected to go into water include, but are not limited to, at least one watercraft and an amphibious vehicle. Further, examples of watercraft include, but are not limited to, a canoe, a boat, a ferry, a cargo ship, and a passenger ship. When it is determined that the vehicle is one expected to go into water (Yes at Step S46), the controller 210 proceeds to Step S49. When it is determined that the vehicle is not one expected to go into water (No at Step S46), the controller 210 determines, at Step S48, that the water immersion determining process should be stopped. When the result at Step S44 is No or when the result at Step S46 is Yes, the controller 210 determines, at Step S49, that it is possible to perform the water immersion determining process.

In the present aspect of the embodiments, the example is explained in which the traveling method of the user is conjectured by using the detection results obtained by the acceleration sensor 215, the magnetic sensor 218, and the gyroscope 217; however, the embodiments are not limited to this example. The traveling method may be conjectured by using a detection result obtained by at least one of the acceleration sensor 215, the magnetic sensor 218, and the gyroscope 217. For example, the controller 210 conjectures the traveling method by comparing an acceleration pattern obtained from a detection result of the acceleration sensor 215 with data of patterns stored in the traveling state data 92C. In another example, the controller 210 conjectures the traveling method by comparing data of magnetism in the surroundings obtained from a detection result of the magnetic sensor 218 with data of patterns stored in the traveling state data 92C. The controller 210 may conjecture the traveling method of the user by using the detection results obtained by the acceleration sensor 215, the magnetic sensor 218, and the gyroscope 217. For example, the controller 210 may detect a traveling route on the basis of position information detected through a position information detecting process and map data to conjecture the traveling method from among traveling methods that enable the user to travel on the traveling route.

The process at Step S22, more specifically, an example of the process of determining whether or not the device is immersed in water will be explained, with reference to FIGS. 32 and 33. The controller 210 determines, at Step S52, whether the device is immersed in water on the basis of the detection result obtained by the atmospheric pressure sensor 219. As illustrated in FIG. 33, the value detected by the atmospheric pressure sensor 219 increases when the smartphone (terminal) 200 is immersed in water. The controller 210 determines whether or not the device is immersed in water, on the basis of the data stored in the atmospheric pressure data 92B and a change in the value of the atmospheric pressure. For example, when the change in the atmospheric pressure occurring during a time interval that is set is equal to or larger than a threshold value that is set, the controller 210 determines that the device has transitioned from the state of not being immersed in water to the state of being immersed in water.

At Step S54, the controller 210 determines whether the device is immersed in water, on the basis of the result obtained by the atmospheric pressure sensor 219. When it is determined that the device is immersed in water (Yes at Step S54), the controller 210 proceeds to Step S62. When it is determined that the device is not immersed in water (No at Step S54), the controller 210 determines, at Step S56, whether the device is immersed in water, on the basis of the state of the touch screen 202B. The controller 210 determines whether the device is immersed in water on the basis of contact points detected by the touch screen 202B and the output values at the contact points. When it is determined that the device is immersed in water (Yes at Step S58), the controller 210 proceeds to Step S62. When it is determined that the device is not immersed in water (No at Step S58), the controller 210 outputs a determination result indicating that the device is not immersed in water, at Step S60. When the result is Yes at Step S54 or at Step S58, the controller 210 outputs a determination result indicating that the device is immersed in water at Step S62.

Further, the controller 210 may repeatedly perform the process at Step S58 for a predetermined period of time. Another example of the process at Step S22 will be explained, with reference to FIG. 34. At Step S52, the controller 210 determines whether the device is immersed in water, on the basis of the detection result obtained by the atmospheric pressure sensor 219. After determining whether the device is immersed in water on the basis of the result obtained by the atmospheric pressure sensor 219, the controller 210 determines, at Step S54, whether the device is immersed in water. When it is determined that the device is immersed in water (Yes at Step S54), the controller 210 proceeds to Step S62. When it is determined that the device is not immersed in water (No at Step S54), the controller 210 determines, at Step S56, whether the device is immersed in water on the basis of the state of the touch screen 202B. The controller 210 determines whether the device is immersed in water, on the basis of contact points detected by the touch screen 202B and the output values at the contact points. When it is determined that the device is immersed in water (Yes at Step S58), the controller 210 proceeds to Step S62. When it is determined that the device is not immersed in water (No at Step S58), the controller 210 determines whether a period of time that is set has elapsed (Step S72). When it is determined that the period of time that is set has not elapsed (No at Step S72), the controller 210 returns to Step S56. When it is determined that the period of time that is set has elapsed (Yes at Step S72), the controller 210 outputs, at Step S60, a determination result indicating that the device is not immersed in water. When the result is Yes at Step S54 or at Step S58, the controller 210 outputs, at Step S62, a determination result indicating that the device is immersed in water.

As explained above, the controller 210 determines whether the device is immersed in water on the basis of the traveling method of the user and the detection result obtained by the atmospheric pressure sensor 219. The controller 210 is able to avoid the situation where a change in the atmospheric pressure caused by traveling is mistakenly determined as a water immersion. By stopping the water immersion determining process when the user is traveling by vehicle, the smartphone 200 is able to refrain from determining that the device is immersed in water even when, for example, the value detected by the atmospheric pressure sensor 219 exhibits a change due to changing of altitude or entering a tunnel or the like while traveling by vehicle. The smartphone 200 is thus able to reduce erroneous determination results where the device is mistakenly determined to be immersed in water while the device is actually not immersed in water.

In the aspect of the embodiments described above, the example is explained in which the traveling state (the traveling method) is conjectured to determine whether or not the determining process based on the result of the atmospheric pressure sensor 219 should be performed; however, the embodiments are not limited to this example. The smartphone 200 may determine whether the device is immersed in water on the basis of the determining process based on the atmospheric pressure sensor 219 and subsequently determines the traveling state to cancel the determination result indicating that the device is immersed in water when the user is traveling by vehicle.

As illustrated in FIG. 30, the controller 210 is able to conjecture whether or not the traveling method is one that has a possibility of having the smartphone 200 immersed in water, by determining whether or not the traveling method is the traveling on foot by the user. With this arrangement, when the traveling method is the traveling on foot by the user with a high possibility for the smartphone 200 of being immersed in water and without a significant change in the atmospheric pressure during the traveling, it is possible to determine whether or not the smartphone 200 is immersed in water with a high level of precision, on the basis of changes in the atmospheric pressure.

As illustrated in FIG. 31, by determining whether or not the traveling method is traveling by vehicle, the controller 210 is able to conjecture whether or not the traveling method is one that has a low possibility of having the smartphone 200 immersed in water. With this arrangement, when the traveling method is traveling by vehicle with a low possibility for the smartphone 200 of being immersed in water and with a possibility of exhibiting a significant change in the atmospheric pressure during the traveling, it is possible to avoid the situation where the smartphone 200 is mistakenly determined to be immersed in water by stopping the water immersion determining process for the smartphone 200 based on changes in the atmospheric pressure. Further, when the vehicle is one expected to go into water, it is possible to determine whether or not the smartphone 200 is immersed in water for the traveling method around water in which and that the smartphone 200 has a possibility of being immersed in water by determining whether or not the smartphone 200 is immersed in water on the basis of changes in the atmospheric pressure.

As illustrated in FIG. 32, by determining whether or not the device is immersed in water, by also using the detection result obtained by the touch screen 202B in addition to the detection result obtained by the atmospheric pressure sensor 219, the controller 210 is able to determine whether or not the smartphone 200 is immersed in water with an even higher level of precision. Further, in the present aspect of the embodiments, the example is explained in which the detecting process using the touch screen 202B is performed when the detection result from the atmospheric pressure sensor 219 indicates that the device is not immersed in water; however, the condition used for the detecting process and the order in which the determining processes are performed are not limited to those in this example.

By repeatedly performing the determining process that uses the detection result obtained by the touch screen 202B for the predetermined period of time as illustrated in FIG. 34, the controller 210 is able to determine whether or not the smartphone 200 is immersed in water, with an even higher level of precision.

In the aspect of the embodiments described above, the controller 210 stops the water immersion determining process for the smartphone 200 when the traveling method is traveling by vehicle; however, another arrangement is also acceptable in which the water immersion determining process for the smartphone 200 is performed, when the traveling method is traveling by vehicle and it is determined that an accident or the like has occurred. Further, it is also acceptable to shorten the time history for the data used for detecting the traveling method in such a manner that, when the vehicle is stopped, it is determined that the traveling method is the traveling on foot by the user.

For example, any of the programs illustrated in FIG. 28 may be divided into a plurality of modules or may be joined with any other program.

In the aspect of the embodiments described above, the smartphone 200 is explained as an example of a device provided with a touch screen; however, the device set forth in the accompanying claims is not limited to the smartphone 200. The device set forth in the accompanying claims may be a mobile electronic device other than smartphones. Examples of the mobile electronic device include, but are not limited to, a mobile phone, a tablet, a mobile personal computer, a digital camera, a media player, an electronic book reader, a navigator, and a game machine.

To comprehensively and clearly disclose the technical features set forth in the accompanying claims, some characteristics embodiments have thus been explained; however, the accompanying claims are not limited to the embodiments described above and are intended to be carried out in every modification example and substitutable configuration that are conceivable for a person skilled in the art in the relevant technical field within the scope of the fundamental features set forth in the present specification.

What is claimed is:

1. A mobile device, comprising:
an atmospheric pressure sensor configured to measure a value of atmospheric pressure;
a touch screen; and
at least one controller configured to
conjecture that the mobile device is immersed in water in response to the value of the atmospheric pressure satisfying a condition,
in response to conjecturing that the mobile device is immersed in water based on the value of the atmospheric pressure, obtain a detection result from the touch screen, and
conjecture whether the mobile device, that has been conjectured based on the value of the atmospheric pressure to be immersed in water, is out of the water on the basis of the detection result obtained by the touch screen.

2. The mobile device according to claim 1, wherein the at least one controller is configured to periodically conjecture whether the mobile device, that has been conjectured based on the value of the atmospheric pressure to be immersed in water, is out of the water on the basis of detection results obtained by the touch screen.

3. The mobile device according to claim 1, wherein after conjecturing that the mobile device, that has been conjectured based on the value of the atmospheric pressure to be immersed in water, is out of the water on the basis of the detection result obtained by the touch screen, the at least one controller is configured to conjecture whether the mobile device is again immersed in water on the basis of a detection result obtained by the touch screen.

4. The mobile device according to claim 1, wherein the at least one controller is configured to conjecture whether the mobile device, that has been conjectured based on the value of the atmospheric pressure to be immersed in water, is out of the water on the basis of output values at detection points on the touch screen.

5. The mobile device according to claim 1, further comprising a housing, wherein
the atmospheric pressure sensor is positioned on an inside of the housing,
the housing includes:
a hole configured to connect a space on the inside of the housing in which the atmospheric pressure sensor is positioned to an outside of the housing; and
a ventilation valve provided at a boundary between the hole and the outside of the housing, and
the ventilation valve has a water retention function to retain water.

6. The mobile device according to claim 5, wherein
the ventilation valve includes a member made of cloth, and
the ventilation valve has the water retention function realized by the member made of cloth.

7. A mobile device comprising:
an atmospheric pressure sensor configured to detect a value of atmospheric pressure;
a touch screen; and
at least one controller configured to use the value of the atmospheric pressure in an application being executed thereby and to input predetermined data into the application when having determined that the mobile device is immersed in water on the basis of contact points detected by the touch screen and output values at the contact points.

8. The mobile device according to claim 7, wherein the predetermined data includes at least one of data indicating that the mobile device is immersed in water, data indicating that a value of water pressure is exhibited, and data indicating that the value of the atmospheric pressure is not exhibited.

9. The mobile device according to claim 8, wherein the at least one controller is configured to use the value of the atmospheric pressure in the application being executed thereby and to discontinue using the value of the atmospheric pressure in the application when having determined that the mobile device is immersed in water on the basis of the contact points detected by the touch screen and the output values at the contact points.

10. The mobile device according to claim 7, wherein the at least one controller is configured to use the value of the atmospheric pressure in the application being executed thereby and to use, in the application, a value that is not dependent on the detected value of the atmospheric pressure when having determined that the mobile device is immersed in water on the basis of the contact points detected by the touch screen and the output values at the contact points.

11. The mobile device according to claim 7, wherein
in response to determining that the mobile device is immersed in water on the basis of the contact points detected by the touch screen and the output values at the contact points, the at least one controller is configured to input the predetermined data into the application being executed thereby, and
in response to determining that the mobile device is not immersed in water on the basis of a change in the value of the atmospheric pressure, the at least one controller is configured to input the value of atmospheric pressure into the application being executed thereby.

* * * * *